US011245967B2

(12) United States Patent
Christie et al.

(10) Patent No.: US 11,245,967 B2
(45) Date of Patent: Feb. 8, 2022

(54) TV SIDE BAR USER INTERFACE

(71) Applicant: Apple Inc., Cupertino, CA (US)

(72) Inventors: Gregory N. Christie, San Jose, CA (US); Alessandro Sabatelli, San Francisco, CA (US); William M. Bachman, San Jose, CA (US); Imran Chaudhri, San Francisco, CA (US); Jeffrey Robbin, Los Altos, CA (US); Jim Young, Livermore, CA (US); Joe Howard, San Jose, CA (US); Marcel Van Os, San Francisco, CA (US); Patrick L. Coffman, San Francisco, CA (US); Stephen O. Lemay, Palo Alto, CA (US); Jeffrey Ma, Redwood City, CA (US); Lynne Kress, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/108,519

(22) Filed: Aug. 22, 2018

(65) Prior Publication Data

US 2019/0058921 A1 Feb. 21, 2019

Related U.S. Application Data

(63) Continuation of application No. 14/267,671, filed on May 1, 2014, now Pat. No. 10,200,761, which is a
(Continued)

(51) Int. Cl.
*H04N 21/482* (2011.01)

(52) U.S. Cl.
CPC .............................. *H04N 21/482* (2013.01)

(58) Field of Classification Search
CPC ....... H04N 21/27; H04N 21/47; H04N 21/482
(Continued)

(56) References Cited

U.S. PATENT DOCUMENTS

| 4,672,677 A | 6/1987 | Yamakawa |
| 5,029,223 A | 7/1991 | Fujisaki |

(Continued)

FOREIGN PATENT DOCUMENTS

| AU | 2009255409 B2 | 7/2012 |
| AU | 2016100476 A4 | 5/2016 |

(Continued)

OTHER PUBLICATIONS

Bohn, D. (Jan. 6, 2014). "Rebooting webOS: how LG rethought the smart TV," located at: http://www.theverge.com/2014/1/6/5279220/rebooting-webos-how-lg-rethought-the-smart-tv, last visited: Feb. 24, 2014, seven pages.

(Continued)

*Primary Examiner* — Dominic D Saltarelli
(74) *Attorney, Agent, or Firm* — Kubota & Basol LLP

(57) ABSTRACT

Systems and methods for a media content user interface. A media content provider includes storage for storing and serving video content to subscribers. The media content provider records and or otherwise stores video content from around the world. Subscribers are provided a user interface to the system that includes a side bar. The side bar includes multiple elements representing different categories of video content. By selecting a given category, available content is filtered according to the selected category and presented. Content which is presented may include live broadcast video for multiple channels on multiple television networks or other content providers. The side bar may further include a collection category specific to a given viewer. Selection of such a category may display video content within the (Continued)

collection. Subcategories in the side bar may be selected for further filtering of available content.

51 Claims, 59 Drawing Sheets

Related U.S. Application Data continuation of application No. 14/104,854, filed on Dec. 12, 2013, now abandoned.

(60) Provisional application No. 61/800,715, filed on Mar. 15, 2013, provisional application No. 61/737,080, filed on Dec. 13, 2012.

(58) Field of Classification Search
USPC .......................................................... 725/43
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,596,373 A | 1/1997 | White et al. |
| 5,621,456 A | 4/1997 | Florin et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,028,600 A | 2/2000 | Rosin et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,694,231 B2 | 4/2010 | Kocienda et al. |
| 7,712,051 B2 | 5/2010 | Chadzelek et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda et al. |
| 8,145,617 B1 | 3/2012 | Verstak et al. |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,416,217 B1 | 4/2013 | Eriksson et al. |
| 8,418,202 B2 | 4/2013 | Ahmad-taylor et al. |
| 8,424,048 B1 | 4/2013 | Lyren et al. |
| 8,479,122 B2 | 7/2013 | Hotelling et al. |
| 8,495,499 B1 | 7/2013 | Denise |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer et al. |
| 8,613,015 B2 | 12/2013 | Gordon et al. |
| 8,613,023 B2 | 12/2013 | Narahara et al. |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng et al. |
| 8,990,857 B2 | 3/2015 | Yong et al. |
| 9,007,322 B1 | 4/2015 | Young |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,532,111 B1 | 12/2016 | Christie et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,602,566 B1 | 3/2017 | Lewis et al. |
| 9,639,241 B2 | 5/2017 | Penha et al. |
| 9,652,448 B2 | 5/2017 | Pasquero et al. |
| 9,658,740 B2 | 5/2017 | Chaudhri et al. |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |

(56) References Cited

U.S. PATENT DOCUMENTS

| | | |
|---|---|---|
| 9,913,142 B2 | 3/2018 | Folse et al. |
| 9,933,937 B2 | 4/2018 | Lemay et al. |
| 9,973,800 B2 | 5/2018 | Yellin et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-Sang et al. |
| 10,209,866 B2 | 2/2019 | Johnston et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,521,188 B1 | 12/2019 | Christie et al. |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,795,490 B2 | 10/2020 | Chaudhri et al. |
| 2002/0015024 A1 | 2/2002 | Westerman et al. |
| 2002/0026637 A1 | 2/2002 | Markel et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0167471 A1 | 9/2003 | Roth et al. |
| 2003/0177498 A1 | 9/2003 | Ellis et al. |
| 2003/0221191 A1 | 11/2003 | Khusheim |
| 2003/0234804 A1 | 12/2003 | Parker et al. |
| 2004/0070573 A1 | 4/2004 | Graham |
| 2004/0090463 A1 | 5/2004 | Celik et al. |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254958 A1 | 12/2004 | Volk |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0091597 A1 | 4/2005 | Ackley |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0033724 A1 | 2/2006 | Chaudhri et al. |
| 2006/0053449 A1 | 3/2006 | Gutta |
| 2006/0071905 A1 | 4/2006 | Varanda |
| 2006/0080352 A1 | 4/2006 | Boubez et al. |
| 2006/0097991 A1 | 5/2006 | Hotelling et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0271968 A1 | 11/2006 | Zellner |
| 2006/0282856 A1 | 12/2006 | Errico et al. |
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0028267 A1 | 2/2007 | Ostojic et al. |
| 2007/0038957 A1 | 2/2007 | White |
| 2007/0092204 A1 | 4/2007 | Wagner et al. |
| 2007/0150802 A1 | 6/2007 | Wan et al. |
| 2007/0154163 A1 | 7/2007 | Cordray |
| 2007/0157220 A1 | 7/2007 | Cordray et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0229465 A1 | 10/2007 | Sakai et al. |
| 2007/0244902 A1 | 10/2007 | Seide et al. |
| 2008/0046928 A1 | 2/2008 | Poling et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0155475 A1 | 6/2008 | Duhig |
| 2008/0189742 A1 | 8/2008 | Ellis et al. |
| 2008/0216020 A1 | 9/2008 | Plummer |
| 2008/0222677 A1 | 9/2008 | Woo et al. |
| 2008/0235588 A1 | 9/2008 | Gonze et al. |
| 2008/0243817 A1 | 10/2008 | Chan et al. |
| 2008/0260252 A1 | 10/2008 | Borgaonkar et al. |
| 2008/0270886 A1 | 10/2008 | Gossweiler et al. |
| 2008/0276279 A1 | 11/2008 | Gossweiler et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1* | 2/2009 | Jeon .................. H04N 21/4667 |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0165054 A1 | 6/2009 | Rudolph |
| 2009/0174679 A1 | 7/2009 | Westerman |
| 2009/0177989 A1 | 7/2009 | Ma et al. |
| 2009/0178083 A1 | 7/2009 | White et al. |
| 2009/0228491 A1 | 9/2009 | Malik |
| 2009/0239587 A1 | 9/2009 | Negron et al. |
| 2009/0256807 A1 | 10/2009 | Nurmi |
| 2009/0288079 A1 | 11/2009 | Zuber et al. |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0031162 A1 | 2/2010 | Wiser et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153999 A1 | 6/2010 | Yates |
| 2010/0159898 A1 | 6/2010 | Krzyzanowski et al. |
| 2010/0162172 A1 | 6/2010 | Aroner |

(56) References Cited

U.S. PATENT DOCUMENTS

| | | |
|---|---|---|
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0269145 A1 | 10/2010 | Ingrassia et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0047513 A1 | 2/2011 | Onogi et al. |
| 2011/0054649 A1 | 3/2011 | Sarkis et al. |
| 2011/0055870 A1 | 3/2011 | Yum et al. |
| 2011/0071977 A1 | 3/2011 | Nakajima et al. |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0119715 A1 | 5/2011 | Chang et al. |
| 2011/0131607 A1 | 6/2011 | Thomas et al. |
| 2011/0154305 A1 | 6/2011 | Leroux et al. |
| 2011/0157029 A1 | 6/2011 | Tseng |
| 2011/0163971 A1 | 7/2011 | Wagner et al. |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289531 A1 | 11/2011 | Moonka et al. |
| 2011/0296351 A1 | 12/2011 | Ewing, Jr. et al. |
| 2011/0302532 A1 | 12/2011 | Missig |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054797 A1 | 3/2012 | Skog et al. |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0105367 A1 | 5/2012 | Son et al. |
| 2012/0110616 A1 | 5/2012 | Kilar et al. |
| 2012/0110621 A1 | 5/2012 | Gossweiler, III |
| 2012/0114303 A1 | 5/2012 | Chung et al. |
| 2012/0117584 A1 | 5/2012 | Gordon |
| 2012/0139938 A1 | 6/2012 | Khedouri et al. |
| 2012/0144003 A1 | 6/2012 | Rosenbaum et al. |
| 2012/0158524 A1 | 6/2012 | Hintz et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0233640 A1 | 9/2012 | Odryna et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0266069 A1 | 10/2012 | Moshiri et al. |
| 2012/0272261 A1 | 10/2012 | Reynolds et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0324504 A1 | 12/2012 | Archer et al. |
| 2012/0327125 A1 | 12/2012 | Kutliroff et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0067366 A1 | 3/2013 | Almosnino |
| 2013/0097009 A1 | 4/2013 | Akadiri |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0205312 A1 | 8/2013 | Huang |
| 2013/0247105 A1 | 9/2013 | Jovanovski et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283317 A1* | 10/2013 | Guntupalli ....... H04N 21/47214 725/44 |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332960 A1 | 12/2013 | Young et al. |
| 2013/0340006 A1* | 12/2013 | Kwan ................ H04N 5/445 725/39 |
| 2013/0347044 A1 | 12/2013 | Lee et al. |
| 2014/0006635 A1 | 1/2014 | Braness et al. |
| 2014/0006951 A1 | 1/2014 | Hunter |
| 2014/0013283 A1 | 1/2014 | Matas et al. |
| 2014/0024341 A1 | 1/2014 | Johan |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059635 A1 | 2/2014 | Sirpal et al. |
| 2014/0071068 A1 | 3/2014 | Shih et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0104646 A1 | 4/2014 | Nishiyama |
| 2014/0109204 A1 | 4/2014 | Papillon et al. |

(56) References Cited

U.S. PATENT DOCUMENTS

| | | |
|---|---|---|
| 2014/0111416 A1 | 4/2014 | Sugiura |
| 2014/0129232 A1 | 5/2014 | Jones et al. |
| 2014/0130097 A1 | 5/2014 | Londero |
| 2014/0136946 A1 | 5/2014 | Matas |
| 2014/0137030 A1 | 5/2014 | Matas |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0173660 A1 | 6/2014 | Correa et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1* | 9/2014 | Lee .................. H04N 21/8358 725/110 |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0333530 A1 | 11/2014 | Agnetta et al. |
| 2014/0340358 A1 | 11/2014 | Martinoli |
| 2014/0341109 A1 | 11/2014 | Cartmell et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0365479 A1 | 12/2014 | Lyons et al. |
| 2014/0365481 A1 | 12/2014 | Novosel et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0039685 A1 | 2/2015 | Lewis et al. |
| 2015/0067582 A1 | 3/2015 | Donnelly et al. |
| 2015/0067724 A1 | 3/2015 | Johnson et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0113429 A1 | 4/2015 | Edwards et al. |
| 2015/0134653 A1 | 5/2015 | Bayer et al. |
| 2015/0153571 A1 | 6/2015 | Ballard et al. |
| 2015/0169975 A1 | 6/2015 | Kienzle et al. |
| 2015/0189347 A1 | 7/2015 | Oztaskent et al. |
| 2015/0195624 A1* | 7/2015 | Gossweiler, III .. H04N 21/4826 725/40 |
| 2015/0205591 A1 | 7/2015 | Jitkoff et al. |
| 2015/0296072 A1 | 10/2015 | Zhou et al. |
| 2015/0301729 A1 | 10/2015 | Wang et al. |
| 2015/0312603 A1 | 10/2015 | Singh et al. |
| 2015/0317343 A1 | 11/2015 | Cselle et al. |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0382047 A1 | 12/2015 | Van Os et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0035119 A1 | 2/2016 | Lee et al. |
| 2016/0036897 A1 | 2/2016 | Kim et al. |
| 2016/0041702 A1 | 2/2016 | Wang |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |
| 2016/0357352 A1 | 12/2016 | Matas et al. |
| 2016/0357366 A1 | 12/2016 | Migos et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0242913 A1 | 8/2017 | Tijssen et al. |
| 2017/0245017 A1 | 8/2017 | Chaudhri et al. |
| 2017/0251257 A1 | 8/2017 | Obrien |
| 2017/0300151 A1 | 10/2017 | Lue-Sang et al. |
| 2017/0339443 A1 | 11/2017 | Lue-Sang et al. |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2018/0011580 A1 | 1/2018 | Lebowitz et al. |
| 2018/0041814 A1 | 2/2018 | Christie et al. |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0113579 A1 | 4/2018 | Johnston et al. |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0367834 A1 | 12/2018 | Carpenter et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0129588 A1 | 5/2019 | Johnston et al. |
| 2019/0258373 A1 | 8/2019 | Davydov et al. |

(56) References Cited

U.S. PATENT DOCUMENTS

| | | |
|---|---|---|
| 2019/0272853 A1 | 9/2019 | Moore |
| 2019/0354264 A1 | 11/2019 | Van Os et al. |
| 2019/0373320 A1 | 12/2019 | Balsamo |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0363934 A1 | 11/2020 | Van Os et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0168424 A1 | 6/2021 | Sharma |
| 2021/0181901 A1 | 6/2021 | Johnston et al. |

FOREIGN PATENT DOCUMENTS

| | | |
|---|---|---|
| AU | 2017101431 A4 | 11/2017 |
| CN | 101436110 A | 5/2009 |
| CN | 101465993 A | 6/2009 |
| CN | 101719125 A | 6/2010 |
| CN | 102098537 A | 6/2011 |
| CN | 102325144 A | 1/2012 |
| CN | 102890615 A | 1/2013 |
| CN | 103546816 A | 1/2014 |
| CN | 103562848 A | 2/2014 |
| CN | 104508618 A | 4/2015 |
| CN | 104822098 A | 8/2015 |
| CN | 105264479 A | 1/2016 |
| CN | 105812849 A | 7/2016 |
| CN | 105955520 A | 9/2016 |
| CN | 105955607 A | 9/2016 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2642402 A2 | 9/2013 |
| EP | 2672703 A1 | 12/2013 |
| EP | 2704032 A2 | 3/2014 |
| EP | 2725531 A1 | 4/2014 |
| EP | 2879398 A1 | 6/2015 |
| JP | 2000-163031 A | 6/2000 |
| JP | 2001-197445 A | 7/2001 |
| JP | 2002-342033 A | 11/2002 |
| JP | 2003-99452 A | 4/2003 |
| JP | 2003-534737 A | 11/2003 |
| JP | 2004-62237 A | 2/2004 |
| JP | 2006-31219 A | 2/2006 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-260947 A | 11/2009 |
| JP | 2010-28437 A | 2/2010 |
| JP | 2010-509684 A | 3/2010 |
| JP | 2010-114733 A | 5/2010 |
| JP | 2011-512701 A | 4/2011 |
| JP | 2011-154455 A | 8/2011 |
| JP | 2011-205562 A | 10/2011 |
| JP | 2011-257930 A | 12/2011 |
| JP | 2012-095123 A | 5/2012 |
| JP | 2012-123685 A | 6/2012 |
| JP | 2012-208622 A | 10/2012 |
| JP | 2013-8369 A | 1/2013 |
| JP | 2013-223150 A | 10/2013 |
| JP | 2014-81740 A | 5/2014 |
| JP | 2014-102660 A | 6/2014 |
| JP | 2015-50655 A | 3/2015 |
| KR | 2001-0005939 A | 1/2001 |
| KR | 10-2010-0039194 A | 4/2010 |
| KR | 10-2011-0061811 A | 6/2011 |
| KR | 10-2012-0076682 A | 7/2012 |
| KR | 10-2012-0124445 A | 11/2012 |
| KR | 10-2013-0058034 A | 6/2013 |
| KR | 10-2013-0137969 A | 12/2013 |
| KR | 10-2014-0041939 A | 4/2014 |
| TW | 200622893 A | 7/2006 |
| TW | 200719204 A | 5/2007 |
| TW | 201337717 A | 9/2013 |
| TW | 201349049 A | 12/2013 |
| TW | 201351261 A | 12/2013 |
| WO | 1994/009438 A2 | 4/1994 |
| WO | 1999/040728 A1 | 8/1999 |
| WO | 2005/050652 A1 | 6/2005 |
| WO | WO-2007/078623 A2 | 7/2007 |
| WO | 2008/005135 A1 | 1/2008 |
| WO | 2008/060486 A2 | 5/2008 |
| WO | 2009/016607 A2 | 2/2009 |
| WO | 2009/148781 A1 | 12/2009 |
| WO | 2011/095693 A1 | 8/2011 |
| WO | 2012/012446 A2 | 1/2012 |
| WO | 2012/061760 A2 | 5/2012 |
| WO | 2013/000741 A1 | 1/2013 |
| WO | 2013/149128 A2 | 10/2013 |
| WO | 2013/169849 A2 | 11/2013 |
| WO | 2013/149128 A3 | 2/2014 |
| WO | 2014/105276 A1 | 7/2014 |
| WO | 2014/144908 A1 | 9/2014 |
| WO | 2014/177929 A2 | 11/2014 |
| WO | 2014/200730 A1 | 12/2014 |
| WO | 2015/200228 A1 | 12/2015 |
| WO | 2015/200537 A2 | 12/2015 |
| WO | WO-2015/200227 A1 | 12/2015 |
| WO | 2016/048308 A1 | 3/2016 |
| WO | 2016/048310 A1 | 3/2016 |
| WO | 2016/111065 A1 | 7/2016 |
| WO | 2017/008079 A1 | 1/2017 |
| WO | 2017/124116 A1 | 7/2017 |
| WO | 2017/200923 A1 | 11/2017 |
| WO | 2017/218104 A1 | 12/2017 |
| WO | 2018/081157 A1 | 5/2018 |

OTHER PUBLICATIONS episodecalendar.com, (May 17, 2014). "Keep track of your favorite TV shows!—TV Episode Calendar", retrieved from internet on Oct. 12, 2017, URL: https://web.archive.org/web/20140517060612/ https://episodecalendar.com/, published on May 17, 2014 as per Wayback Machine.

Final Office Action dated Jul. 16, 2018, for U.S. Appl. No. 14/746,095, filed Jun. 22, 2015, 32 pages.

Grey, M. (Jun. 11, 2013). "Comcast's newX2 platform moves your DVR recordings from the box to the cloud," located at: http://www.engadget.com/2013/06/11/comcast-x2-platform/ last visited: Feb. 24, 2014, fifteen pages.

International Search Report dated Sep. 28, 2015 for PCT Application No. PCT/US2015/037027, filed Jun. 22, 2015, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Dec. 1, 2017, for U.S. Appl. No. 14/746,095, filed Jun. 22, 2015, 33 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

(56) References Cited

OTHER PUBLICATIONS

TW Search Report dated Nov. 25, 2016, for TW Application No. 104120385, with English translation, two page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Corrected Notice of Allowance received for U.S. Appl. No. 14/267,671, dated Nov. 29, 2018, 3 pages.
Decision to Refuse received for European Patent Application No. 15739075.8, dated Apr. 25, 2019, 18 pages.
Final Office Action received for U.S. Appl. No. 14/267,671, dated May 23, 2018, 17 pages.
Final Office Action received for U.S. Appl. No. 14/267,671, dated Oct. 26, 2016, 21 pages.
Non-Final Office Action received for U.S. Appl. No. 14/267,671, dated Apr. 1, 2016, 16 pages.
Non-Final Office Action received for U.S. Appl. No. 14/267,671, dated Dec. 1, 2017, 18 pages.
Non-Final Office Action received for U.S. Appl. No. 14/267,671, dated May 26, 2017, 18 pages.
Non-Final Office Action received for U.S. Appl. No. 14/746,095, dated Jul. 25, 2019, 33 pages.
Notice of Allowance received for U.S. Appl. No. 14/267,671, dated Sep. 19, 2018, 8 pages.
Notice of Allowance received for U.S. Appl. No. 14/746,095, dated Dec. 31, 2019, 8 pages.
Office Action received for Australian Patent Application No. 2018250384, dated Mar. 16, 2020, 3 pages.
Office Action received for Australian Patent Application No. 2018250384, dated May 23, 2019, 5 pages.
Office Action received for Australian Patent Application No. 2018250384, dated Oct. 28, 2019, 5 Pages.
Office Action received for Chinese Patent Application No. 201580028385.5, dated Mar. 27, 2020, 6 pages (Official Copy only).
Office Action received for Chinese Patent Application No. 201580028385.5, dated Sep. 3, 2019, 13 pages (6 pages Official Copy and 7 pages English Translation).
Advisory Action received for U.S. Appl. No. 15/167,801, dated Feb. 16, 2018, 4 pages.
Applicant Initiated Interview Summary received for U.S. Appl. No. 15/167,801, dated Apr. 23, 2018, 3 pages.
Applicant Initiated Interview Summary received for U.S. Appl. No. 15/167,801, dated Jul. 29, 2019, 3 pages.
Corrected Notice of Allowance received for U.S. Appl. No. 14/242,575, dated Dec. 15, 2016, 7 pages.
Corrected Notice of Allowance received for U.S. Appl. No. 14/242,575, dated Nov. 16, 2016, 7 pages.
Corrected Notice of Allowance received for U.S. Appl. No. 14/255,664, dated Aug. 29, 2017, 4 pages.
Corrected Notice of Allowance received for U.S. Appl. No. 14/749,288, dated Sep. 21, 2017, 5 pages.
Corrected Notice of Allowance received for U.S. Appl. No. 15/276,633, dated Sep. 10, 2019, 7 pages.
Corrected Notice of Allowance received for U.S. Appl. No. 15/695,880, dated Jun. 11, 2018, 6 pages.
Corrected Notice of Allowance received for U.S. Appl. No. 15/714,904, dated Sep. 7, 2018, 5 pages.
Corrected Notice of Allowance received for U.S. Appl. No. 16/010,280, dated Aug. 6, 2019, 2 pages.
Corrected Notice of Allowance received for U.S. Appl. No. 16/036,810, dated Nov. 19, 2018, 6 pages.
Examiner Initiated Interview Summary received for U.S. Appl. No. 15/390,377, dated Oct. 30, 2017, 2 pages.
Examiner's Answer to Appeal Brief received for U.S. Appl. No. 15/876,715, dated Aug. 18, 2020, 16 pages.
Extended European Search Report received for European Patent Application No. 17813728.7, dated Feb. 11, 2019, 8 pages.
Final Office Action received for U.S. Appl. No. 14/255,664, dated Oct. 17, 2016, 16 pages.
Final Office Action received for U.S. Appl. No. 14/271,179, dated Dec. 15, 2016, 10 pages.
Final Office Action received for U.S. Appl. No. 14/271,179, dated Jun. 20, 2019, 15 pages.
Final Office Action received for U.S. Appl. No. 14/271,179, dated Jun. 21, 2018, 14 pages.
Final Office Action received for U.S. Appl. No. 14/746,662, dated Apr. 24, 2017, 8 pages.
Final Office Action received for U.S. Appl. No. 14/746,662, dated Jun. 27, 2017, 9 pages.
Final Office Action received for U.S. Appl. No. 15/167,801, dated Apr. 5, 2019, 18 pages.
Final Office Action received for U.S. Appl. No. 15/167,801, dated May 28, 2020, 17 pages.
Final Office Action received for U.S. Appl. No. 15/167,801, dated Nov. 29, 2017, 12 pages.
Final Office Action received for U.S. Appl. No. 15/235,000, dated Dec. 19, 2018, 33 pages.
Final Office Action received for U.S. Appl. No. 15/235,000, dated Mar. 13, 2018, 31 pages.
Final Office Action received for U.S. Appl. No. 15/272,393, dated Mar. 25, 2019, 54 pages.
Final Office Action received for U.S. Appl. No. 15/272,397, dated Mar. 7, 2017, 23 pages.
Final Office Action received for U.S. Appl. No. 15/276,633, dated Jul. 26, 2017, 15 pages.
Final Office Action received for U.S. Appl. No. 15/276,633, dated Oct. 29, 2018, 12 pages.
Final Office Action received for U.S. Appl. No. 15/390,377, dated Nov. 9, 2017, 18 pages.
Final Office Action received for U.S. Appl. No. 15/507,229, dated Jul. 15, 2020, 20 pages.
Final Office Action received for U.S. Appl. No. 15/507,229, dated Sep. 18, 2019, 15 pages.
Final Office Action received for U.S. Appl. No. 15/719,404, dated Aug. 8, 2019, 19 pages.
Final Office Action received for U.S. Appl. No. 15/876,715, dated Nov. 5, 2018, 15 pages.
Final Office Action received for U.S. Appl. No. 16/126,962, dated Apr. 8, 2020, 20 pages.
Final Office Action received for U.S. Appl. No. 16/136,005, dated Mar. 9, 2020, 9 pages.
Final Office Action received for U.S. Appl. No. 16/144,077, dated Jul. 12, 2019, 22 pages.
Final Office Action received for U.S. Appl. No. 16/584,790, dated May 27, 2020, 27 pages.
International Search Report received for PCT Patent Application No. PCT/US2014/057272, dated May 28, 2015, 4 pages.
International Search Report received for PCT Patent Application No. PCT/US2014/057280, dated May 27, 2015, 4 pages.
International Search Report received for PCT Patent Application No. PCT/US2015/037030, dated Dec. 10, 2015, 7 pages.
International Search Report received for PCT Patent Application No. PCT/US2015/037520, dated Mar. 7, 2016, 6 pages.
International Search Report received for PCT Patent Application No. PCT/US2017/029448, dated Jul. 13, 2017, 3 pages.
International Search Report received for PCT Patent Application No. PCT/US2017/031764, dated Aug. 7, 2017, 2 pages.
International Search Report received for PCT Patent Application No. PCT/US2017/058132, dated Mar. 27, 2018, 6 pages.
Non-Final Office Action received for U.S. Appl. No. 14/208,099, dated Jun. 25, 2015, 12 pages.
Non-Final Office Action received for U.S. Appl. No. 14/242,575, dated Mar. 21, 2016, 12 pages.
Non-Final Office Action received for U.S. Appl. No. 14/255,664, dated Apr. 1, 2016, 15 pages.
Non-Final Office Action received for U.S. Appl. No. 14/262,435, dated Feb. 22, 2016, 22 pages.
Non-Final Office Action received for U.S. Appl. No. 14/271,179, dated May 29, 2015, 25 pages.

(56) References Cited

OTHER PUBLICATIONS

Non-Final Office Action received for U.S. Appl. No. 14/271,179, dated Oct. 5, 2018, 15 pages.
Non-Final Office Action received for U.S. Appl. No. 14/271,179, dated Sep. 21, 2017, 12 pages.
Non-Final Office Action received for U.S. Appl. No. 14/746,620, dated Jan. 11, 2017, 16 pages.
Non-Final Office Action received for U.S. Appl. No. 14/746,662, dated Aug. 9, 2016, 8 pages.
Non-Final Office Action received for U.S. Appl. No. 14/749,288, dated Oct. 12, 2016, 11 pages.
Non-Final Office Action received for U.S. Appl. No. 15/167,801 dated Mar. 24, 2017, 12 Pages.
Non-Final Office Action received for U.S. Appl. No. 15/167,801, dated Aug. 30, 2018, 15 pages.
Non-Final Office Action received for U.S. Appl. No. 15/167,801, dated Sep. 26, 2019, 18 pages.
Non-Final Office Action received for U.S. Appl. No. 15/224,370, dated Oct. 3, 2017, 14 pages.
Non-Final Office Action received for U.S. Appl. No. 15/235,000, dated Jul. 14, 2017, 31 pages.
Non-Final Office Action received for U.S. Appl. No. 15/235,000, dated Jul. 25, 2018, 31 pages.
Non-Final Office Action received for U.S. Appl. No. 15/235,000, dated Jun. 26, 2019, 31 pages.
Non-Final Office Action received for U.S. Appl. No. 15/272,393, dated Oct. 2, 2018, 52 pages.
Non-Final Office Action received for U.S. Appl. No. 15/272,397, dated Nov. 22, 2016, 20 pages.
Non-Final Office Action received for U.S. Appl. No. 15/276,633, dated Feb. 23, 2018, 12 pages.
Non-Final Office Action received for U.S. Appl. No. 15/276,633, dated Mar. 5, 2019, 16 pages.
Non-Final Office Action received for U.S. Appl. No. 15/276,633, dated Nov. 17, 2016, 12 pages.
Non-Final Office Action received for U.S. Appl. No. 15/390,377, dated Apr. 5, 2017, 17 pages.
Non-Final Office Action received for U.S. Appl. No. 15/414,493, dated Oct. 6, 2017, 15 pages.
Non-Final Office Action received for U.S. Appl. No. 15/507,229, dated Feb. 27, 2020, 16 pages.
Non-Final Office Action received for U.S. Appl. No. 15/507,229, dated Jun. 3, 2019, 14 pages.
Non-Final Office Action received for U.S. Appl. No. 15/674,992, dated May 11, 2018, 8 pages.
Non-Final Office Action received for U.S. Appl. No. 15/719,404, dated Dec. 14, 2018, 14 pages.
Non-Final Office Action received for U.S. Appl. No. 15/719,404, dated Oct. 16, 2020, 18 pages.
Non-Final Office Action received for U.S. Appl. No. 15/798,092, dated Dec. 20, 2017, 20 pages.
Non-Final Office Action received for U.S. Appl. No. 15/876,715, dated Jun. 4, 2018, 12 pages.
Non-Final Office Action received for U.S. Appl. No. 15/876,715, dated Sep. 10, 2019, 13 pages.
Non-Final Office Action received for U.S. Appl. No. 15/990,327, dated Jul. 31, 2018, 8 pages.
Non-Final Office Action received for U.S. Appl. No. 16/010,280, dated Mar. 7, 2019, 5 pages.
Non-Final Office Action received for U.S. Appl. No. 16/126,962, dated Aug. 25, 2020, 22 pages.
Non-Final Office Action received for U.S. Appl. No. 16/126,962, dated Sep. 3, 2019, 16 pages.
Non-Final Office Action received for U.S. Appl. No. 16/136,005, dated Sep. 9, 2020, 10 pages.
Non-Final Office Action received for U.S. Appl. No. 16/136,005, dated Sep. 18, 2019, 9 pages.
Non-Final Office Action received for U.S. Appl. No. 16/142,635, dated Jun. 8, 2020, 19 pages.
Non-Final Office Action received for U.S. Appl. No. 16/144,077, dated Feb. 19, 2019, 24 pages.
Non-Final Office Action received for U.S. Appl. No. 16/144,077, dated Nov. 27, 2019, 40 pages.
Non-Final Office Action received for U.S. Appl. No. 16/233,990, dated Jun. 18, 2020, 17 pages.
Non-Final Office Action received for U.S. Appl. No. 16/392,467, dated Sep. 27, 2019, 5 pages.
Non-Final Office Action received for U.S. Appl. No. 16/584,790, dated Dec. 26, 2019, 24 pages.
Non-Final Office Action received for U.S. Appl. No. 16/682,443, dated Sep. 23, 2020, 10 pages.
Non-Final Office Action received for U.S. Appl. No. 16/697,090, dated Jul. 6, 2020, 14 pages.
Non-Final Office Action received for U.S. Appl. No. 16/865,172, dated Aug. 20, 2020, 19 pages.
Notice of Allowance received for U.S. Appl. No. 14/208,099, dated Feb. 3, 2016, 10 pages.
Notice of Allowance received for U.S. Appl. No. 14/242,575, dated Oct. 27, 2016, 11 pages.
Notice of Allowance received for U.S. Appl. No. 14/255,664, dated May 5, 2017, 7 pages.
Notice of Allowance received for U.S. Appl. No. 14/262,435, dated Aug. 16, 2016, 6 pages.
Notice of Allowance received for U.S. Appl. No. 14/746,620, dated Sep. 25, 2017, 8 pages.
Notice of Allowance received for U.S. Appl. No. 14/746,662, dated Sep. 25, 2017, 7 pages.
Notice of Allowance received for U.S. Appl. No. 14/749,288, dated May 25, 2017, 8 pages.
Notice of Allowance received for U.S. Appl. No. 15/272,393, dated Jan. 15, 2020, 7 pages.
Notice of Allowance received for U.S. Appl. No. 15/272,393, dated Sep. 18, 2019, 10 pages.
Notice of Allowance received for U.S. Appl. No. 15/272,397, dated Oct. 18, 2017, 8 pages.
Notice of Allowance received for U.S. Appl. No. 15/276,633, dated Aug. 26, 2019, 8 pages.
Notice of Allowance received for U.S. Appl. No. 15/390,377, dated Jul. 2, 2018, 9 pages.
Notice of Allowance received for U.S. Appl. No. 15/414,493, dated Mar. 14, 2018, 7 pages.
Notice of Allowance received for U.S. Appl. No. 15/674,992, dated Oct. 1, 2018, 7 pages.
Notice of Allowance received for U.S. Appl. No. 15/695,880, dated Feb. 28, 2018, 10 pages.
Notice of Allowance received for U.S. Appl. No. 15/695,880, dated Oct. 18, 2017, 9 pages.
Notice of Allowance received for U.S. Appl. No. 15/714,904, dated May 22, 2018, 8 pages.
Notice of Allowance received for U.S. Appl. No. 15/798,092, dated Jun. 7, 2018, 9 pages.
Notice of Allowance received for U.S. Appl. No. 15/798,092, dated Oct. 9, 2018, 5 pages.
Notice of Allowance received for U.S. Appl. No. 15/833,618, dated Mar. 14, 2018, 9 pages.
Notice of Allowance received for U.S. Appl. No. 15/990,327, dated Jan. 11, 2019, 7 pages.
Notice of Allowance received for U.S. Appl. No. 16/010,280, dated Jul. 29, 2019, 7 pages.
Notice of Allowance received for U.S. Appl. No. 16/036,810, dated Oct. 31, 2018, 9 pages.
Notice of Allowance received for U.S. Appl. No. 16/144,077, dated May 8, 2020, 15 pages.
Notice of Allowance received for U.S. Appl. No. 16/392,467, dated Mar. 23, 2020, 9 pages.
Notice of Allowance received for U.S. Appl. No. 16/827,942, dated Oct. 5, 2020, 10 pages.
Restriction Requirement received for U.S. Appl. No. 14/208,099, dated Feb. 24, 2015, 5 pages.
Search Report received for Chinese Patent Application No. 201580028382.1, dated Oct. 12, 2018, 5 pages (2 pages of English Translation & 3 pages of Official copy).

(56) References Cited

OTHER PUBLICATIONS

Search Report received for Danish Patent Application No. PA 201670581, dated Apr. 4, 2017, 2 pages.
Search Report received for Danish Patent Application No. PA 201670581, dated Feb. 5, 2018, 1 page.
Search Report received for Danish Patent Application No. PA 201670581, dated Nov. 3, 2016, 1 page.
Search Report received for Danish Patent Application No. PA 201870354, dated Sep. 26, 2018, 4 pages.
Search Report received for Danish Patent Application No. PA201670582, dated Feb. 9, 2017, 1 pages.
Search Report received for Danish Patent Application No. PA201670582, dated Mar. 6, 2018, 2 pages.
Search Report received for Danish Patent Application No. PA201670582, dated Oct. 28, 2016, 4 pages.
Search Report received for Danish Patent Application No. PA201770200, Completed on Jul. 12, 2017, 4 pages.
Search Report received for Taiwanese Patent Application No. 104120369, dated Aug. 8, 2016, 2 Pages (1 page of official copy & 1 page of English translation).
Supplemental Notice of Allowance received for U.S. Appl. No. 15/798,092, dated Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, 2017, 8 pages.
Alvarez Edgar, "Sling TV Redesign Makes It Easy To Find Your Favorite Content", Engadget, Available online at: <https://www.engadget.com/2016/01/05/sling-tv-major-redesign/>, May 1, 2016, pp. 1-12.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Fingas Roger, "Walmart's Vudu to get Native Apple TV", AppleInsider, 2017, pp. 1-4.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Ng Gary, "New Netflix User Interface Coming This Month, First Redesign in Four Years", iPhone in Canada, Available online at: <https://www.iphoneincanada.ca/news/new-netflix-user-interface/>, Jun. 1, 2015, 3 pages.
Panzarino Matthew, "Apple Announces Voice Activated Siri Assistant Feature For iOS 5, Integrates Wolfram Alpha And Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, Mar. 10, 2016, pp. 1-4.
Non-Final Office Action received for U.S. Appl. No. 16/827,926, dated Oct. 29, 2020, 45 pages.
Supplemental Notice of Allowability received for U.S. Appl. No. 16/827,942, dated Nov. 4, 2020, 3 pages.
Cover Flow—Wikipedia, Available online at: <https://en.wikipedia.org/w/index.php?t%20itle=Cover%20Flow&oldid=879285208>, Jan. 20, 2019, 3 pages.
Extended European Search Report received for European Patent Application No. 20190698.9, dated Oct. 30, 2020, 6 pages.
Final Office Action received for U.S. Appl. No. 16/142,635, dated Feb. 3, 2021, 23 pages.
Final Office Action received for U.S. Appl. No. 16/233,990, dated Jan. 11, 2021, 17 pages.
Final Office Action received for U.S. Appl. No. 16/682,443, dated Mar. 9, 2021, 9 pages.
Final Office Action received for U.S. Appl. No. 16/697,090, dated Jan. 27, 2021, 18 pages.
Final Office Action received for U.S. Appl. No. 16/865,172, dated Feb. 12, 2021, 29 pages.
Final Office Action received for U.S. Appl. No. 16/827,926, dated Mar. 17, 2021, 44 pages.
International Search Report received for PCT Patent Application No. PCT/US2019/034921, dated Nov. 19, 2019, 5 pages.
International Search Report received for PCT Patent Application No. PCT/US2020/024452, dated Aug. 6, 2020, 6 pages.
International Search Report received for PCT Patent Application No. PCT/US2020/024485, dated Aug. 3, 2020, 6 pages.
International Search Report received for PCT Patent Application No. PCT/US2020/024486, dated Aug. 11, 2020, 6 pages.
International Search Report received for PCT Patent Application No. PCT/US2020/024492, dated Aug. 10, 2020, 6 pages.
International Search Report received for PCT Patent Application No. PCT/US2020/035423, dated Oct. 13, 2020, 4 pages.
Invitation to Pay Additional Fees received for PCT Patent Application No. PCT/US2019/034921, dated Sep. 24, 2019, 12 pages.
Invitation to Pay Additional Fees received for PCT Patent Application No. PCT/US2020/024452, dated Jun. 15, 2020, 13 pages.
Invitation to Pay Additional Fees received for PCT Patent Application No. PCT/US2020/024485, dated Jun. 8, 2020, 11 pages.
Invitation to Pay Additional Fees received for PCT Patent Application No. PCT/US2020/024486, dated Jun. 3, 2020, 11 pages.
Invitation to Pay Additional Fees received for PCT Patent Application No. PCT/US2020/024492, dated Jun. 8, 2020, 10 pages.
Non-Final Office Action received for U.S. Appl. No. 15/167,801, dated Dec. 11, 2020, 18 pages.
Non-Final Office Action received for U.S. Appl. No. 16/584,790, dated Dec. 23, 2020, 30 pages.
Non-Final Office Action received for U.S. Appl. No. 16/827,918, dated Dec. 10, 2020, 28 pages.
Non-Final Office Action received for U.S. Appl. No. 16/827,931, dated Mar. 3, 2021, 24 pages.
Non-Final Office Action received for U.S. Appl. No. 16/888,478, dated Feb. 8, 2021, 24 pages.
Non-Final Office Action received for U.S. Appl. No. 17/065,387, dated Jan. 28, 2021, 28 pages.
Notice of Allowance received for U.S. Appl. No. 16/136,005, dated Feb. 24, 2021, 8 pages.
Notice of Allowance received for U.S. Appl. No. 16/827,942, dated Jan. 22, 2021, 5 pages.
Search Report received for Chinese Patent Application No. 201910469185.3, dated Feb. 23, 2021, 6 pages (3 pages of English Translation and 3 pages of Official Copy).
Xiaoshan et al., "Modern Communication (Journal of Communication University of China), Issue 11", iPlayer Comparative study on user interface of three network TV stations, Nov. 5, 2010, 3 pages. See attached Communication 37 CFR § 1.98(a)(3).
Extended European Search Report received for European Patent Application No. 20199219.5, dated Apr. 22, 2021, 8 pages.
Final Office Action received for U.S. Appl. No. 15/719,404, dated Mar. 30, 2021, 19 pages.
Final Office Action received for U.S. Appl. No. 16/175,565, dated Nov. 12, 2020, 40 pages.
Final Office Action received for U.S. Appl. No. 16/584,790, dated Jun. 15, 2021, 30 pages.
Final Office Action received for U.S. Appl. No. 16/827,918, dated Jul. 8, 2021, 31 pages.
Non-Final Office Action received for U.S. Appl. No. 16/142,635, dated Jun. 11, 2021, 23 pages.
Non-Final Office Action received for U.S. Appl. No. 16/233,990, dated Jul. 9, 2021, 18 pages.
Non-Final Office Action received for U.S. Appl. No. 16/697,090, dated Aug. 3, 2021, 16 pages.
Non-Final Office Action received for U.S. Appl. No. 16/827,910, dated Jun. 17, 2021, 16 pages.
Non-Final Office Action received for U.S. Appl. No. 16/865,172, dated Jun. 29, 2021, 29 pages.
Non-Final Office Action received for U.S. Appl. No. 16/872,274, dated Jul. 9, 2021, 19 pages.
Non-Final Office Action received for U.S. Appl. No. 16/888,453, dated Jun. 4, 2021, 37 pages.
Non-Final Office Action received for U.S. Appl. No. 16/945,724, dated Jul. 19, 2021, 8 pages.
Non-Final Office Action received for U.S. Appl. No. 17/065,387, dated Jun. 1, 2021, 25 pages.

(56) References Cited

OTHER PUBLICATIONS

Non-Final Office Action received for U.S. Appl. No. 17/133,550, dated Jun. 8, 2021, 23 pages.
Non-Final Office Action received for U.S. Appl. No. 16/175,565, dated Mar. 4, 2020, 36 pages.
Notice of Allowance received for U.S. Appl. No. 16/136,005, dated Jun. 9, 2021, 7 pages.
Notice of Allowance received for U.S. Appl. No. 16/682,443, dated Aug. 20, 2021, 7 pages.
Notice of Allowance received for U.S. Appl. No. 16/726,179, dated Jun. 17, 2021, 9 pages.
Notice of Allowance received for U.S. Appl. No. 16/827,942, dated Apr. 28, 2021, 5 pages.
Patent Board Decision received for U.S. Appl. No. 15/876,715, dated Aug. 3, 2021, 8 pages.
Search Report received for Chinese Patent Application No. 201780033590.X, dated Mar. 24, 2021, 4 pages (2 page of English Translation and 2 pages of Official Copy).
Cheredar, Tom, "Verizon's Viewdini lets you watch Netflix, Comcast, & Hulu videos from a single app", venturebeat.com. May 22, 2012, 6 pages.
Kaijser, Martijn, "Mimic skin for Kodi 15.x: Installation and showcase", Time 2:23-2:28, Available online at: <https://www.youtube.com/watch?v=RGfpbUWVkgQ&t=143s>, Aug. 3, 2015, 1 page.
Non-Final Office Action received for U.S. Appl. No. 15/167,801, dated Sep. 3, 2021, 17 pages.

\* cited by examiner

MADMEN
aMC

Seasons | Extras — 3812 | Cast | Related

Featured Videos

MADMEN pic/video
Janie Bryant
Costume Designer
Janie Bryant on costumes
9/25/2012
Janie Bryant lays out her . . . — 3830
— 3820 pic/video
Elisabeth Moss
Peggy Olson
Elisabeth Moss on her role
9/12/2012
Elisabeth describes . . . — 3831
— 3821 pic/video
Bryan Batt
Salvatore Romano
Bryan Batt on his role
9/25/2012
Bryan describes . . . — 3832
— 3822 pic/video
Christina Hendricks
Joan Harris
Christina Hendricks on her role
9/01/2012
Christina discusses . . . — 3833
— 3823

*FIG. 38*

SATURDAY
NIGHT
LIVE

Saturday Night Live
Season 37

Seasons — 4610

Extras    Cast    Related pic/video — Will Ferrel, Episode 723, Usher — 4601 pic/video — Eli Manning, Episode 722, Rihanna — 4601 pic/video — Josh Brolin, Episode 721, Gotye — 4601

Mick Jagger, Episode 724, Foo Fighters, Arcade Fire — 4601

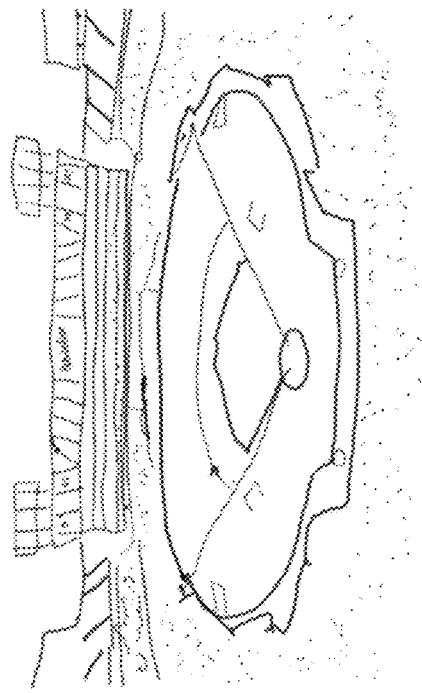
| Game | Players | Schedule | Highlights | Standings | More Games |
|---|---|---|---|---|---|
| 30 | 1 vs. Rangers W 0-2 | 2 vs. Rangers L 0-2 | 3 vs. Rangers L 0-3 | 4 | 5 | 6 |
| 7 | 8 | 9 | 10 | 11 | 12 | 13 |
October 2012 — 5102
FIG. 51

TV SIDE BAR USER INTERFACE

CROSS-REFERENCE TO RELATED APPLICATIONS

This application is a continuation of U.S. patent application Ser. No. 14/267,671, filed May 1, 2014, which is a continuation of U.S. patent application Ser. No. 14/104,854, filed Dec. 12, 2013, which claims benefit of U.S. Provisional Patent Application No. 61/800,715, filed Mar. 15, 2013, and claims benefit of U.S. Provisional Patent Application No. 61/737,080, filed Dec. 13, 2012, the entire disclosures of which are incorporated herein by reference for all purposes.

BACKGROUND OF THE INVENTION

Field of the Invention

This invention relates to multimedia systems, and more particularly, to delivery of media content.

Description of the Relevant Art

For many years, broadcast television was the sole provider of video content to viewer's homes across the globe. As time has passed, and particularly with the advent of the Internet, numerous other sources of video content have arisen. In addition to broadcast television, cable television and satellite based television providers have begun providing access to video on demand and other audio and video content. In addition, special purpose set-top boxes, such as that provided by Roku®, provided a gateway for viewer's to access other sources of video content not provided by their television service provider. With such boxes, viewers were able to connect to these other content providers in order to obtain desired video content. At present, there are countless video providers in the marketplace. In addition, music and other audio content is available through various communication channels. Many are subscription based services, and some provide free content. While the explosion of video content providers in the marketplace may seem a boon for viewer's, the large number of choices and providers complicates the viewing experience.

In view of the above, improved media content delivery systems, methods and mechanisms are desired.

SUMMARY OF EMBODIMENTS

Systems and methods for a media content delivery service are contemplated.

A media content delivery service is contemplated that includes a data store for storing and serving video content to subscribers. Such a data store may comprise one or more data stores, distributed storage, peer-to-peer based storage, cloud based storage or otherwise. In various embodiments, the media content provider is configured to continually record and or otherwise acquire media content from around the world for storage. Video and audio content stored in the data store will generally correspond to a large number of other content providers, such as cable television operators, Internet based content providers, television networks, and so on. The media content provider also maintains metadata regarding the video content in the data store. In addition to including information concerning the media content content itself—such as format, duration, compression particulars, and so on, the metadata also includes information that associates the video content with the other video content providers. For example, a stored episode of a series shown on the HBO network will be identifiable as corresponding to the HBO network.

In various embodiments, detecting selection of a given element of displayed content in a user interface causes the display of a landing page dedicated to content associated with the given element. In various embodiments, the additional content includes access to multiple seasons and episodes of a television series. In other embodiments, the additional content includes access to multiple games for a sports team. The landing page further provide access to additional content representing selected portions of larger video content, where the selected portions have been identified through crowdsourcing The side bar may further include a collection category specific to a given viewer. Selection of such a category may display video content within the collection. Subcategories in the side bar may be selected for further filtering of available content.

These and other embodiments are contemplated and will be appreciated upon reference to the following description and drawings.

BRIEF DESCRIPTION OF THE DRAWINGS

FIG. 26 depicts one embodiment of a video display and user interface.

FIG. 27 depicts one embodiment of a video display and user interface.

FIG. 38 depicts one embodiment of a channel bar animation.

FIG. 46 depicts one embodiment of a video display and user interface.

FIG. 50 depicts one embodiment of a video display and user interface.

FIG. 51 depicts one embodiment of a video display and user interface.

FIG. 53 depicts one embodiment of a video display and user interface.

FIG. 58 depicts one embodiment of a video display and user interface.

Figure 1:
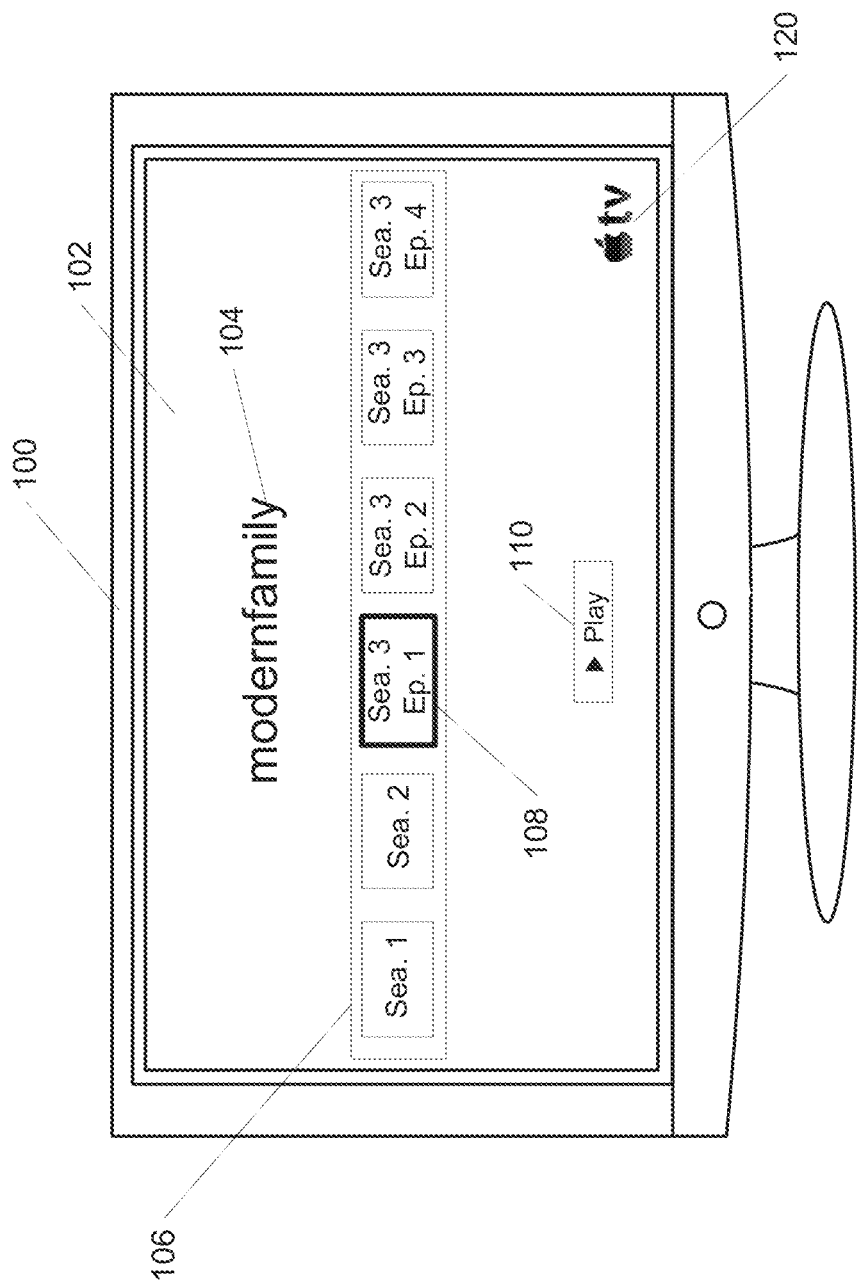
FIG. 1 depicts one embodiment of a video display.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a television 100 and television display 102 is shown. In the example shown, the television display 102 is displaying video content related to a television show. In particular, the title 104 of a television show is depicted along with an episode bar 106 and play icon 110. In the embodiment shown, the content depicted by the display 102 is provided according to a subscription a viewer has with a television subscription service. In one embodiment, this television subscription service is an Apple TV® service indicated by the icon 120. In various embodiments, the title 104, bar 106, and icon 110 may be generated as an overlay on top of another image, such as a still picture, video content, animation, or otherwise. Such overlays may be produced by a set-top box, a program executing on, or logic incorporated into circuitry incorporated into the television 100 itself, or by a provider of video content (e.g., the Apple TV service). In other embodiments, rather than an overlay, the title 104, bar 106, and/or 110 may be integrally generated as part of an image or video displayed on the display portion 102 of the television. As used herein, "overlay" is intended to include not only the generation of overlays on top of other content, by the content that is integrally generated as part of the video content as well.

As shown in the example, bar 106 includes six images which correspond to subject matter related to the show titled 104 above. As shown, subject matter corresponding to three seasons of the show ("modernfamily") are depicted. In particular, images corresponding to season 1 (Sea. 1), season 2 (Sea. 2), and season 3 (Sea. 3) are shown. For season 3, separate images are shown to correspond to particular episodes of season 3; namely, episodes 1-4 (Ep. 1-Ep. 4). In various embodiments, the images depicted within the bar 106 may be still images or video corresponding to the related season or episode, movie, or other media content.

Also shown in FIG. 1, one of the particular images 108 is indicated to have "focus". As is understood by those skilled in the art, "focus" generally refers to the selection of a graphical element on a display in order to display information related to the selected item, prepare the item for further selection in order to further traverse a graphical user interface, and so on. In this example, focus is illustrated by the use of a broader outline on image 108 than is used for the other images within bar 106. Numerous other alternative ways for indicating focus are known in the art, such as the use of different lighting, colors, animations, etc. All such alternatives are contemplated. Focus in this case may be used to identify a particular image within bar 106 which is intended as a target when the play icon 110 is selected by a user. In this manner, selecting play 110 while image 108 is selected (i.e., has focus) may result in episode 1 of season 3 of the modernfamily television series being played on the display 102.

While FIG. 1 depicts seasons and episodes of a television series available for viewing, what is not shown to the television viewer in this example is that the content corresponding to the images in bar 106 has been aggregated from multiple sources corresponding to multiple subscriptions. As used herein, subscriptions to these multiple services may be referred to as secondary subscriptions, while a subscription to the service corresponding to the display 102 (e.g., the Apple TV service) may be referred to as the primary subscription. In various embodiments, the primary subscription may be to Apple TV (or iTunes or a similar service) in which case Apple TV may be referred to as the "primary provider", and the other multiple service providers may be referred to as "secondary providers". It is noted that in some cases, a secondary provider may not provide all of the content to which it provides access. In some embodiments, a subscription with a secondary provider simply gives a viewer the right to access the data from a different provider. Various such alternatives are possible and are contemplated. In contrast to the scenario depicted in FIG. 1, in a typical scenario a viewer may have a subscription to a service such as the NETFLIX® service which provides television, movie, and other video content. When displaying available content for viewing, the NETFLIX service displays content available from NETFLIX. Alternatively, a service such as the TIVO® service may depict content available from multiple sources corresponding to multiple subscriptions. However, when accessing such content, the viewer accesses a particular service provider in order to obtain the desired content assuming the viewer has a subscription. In such a case, the TIVO service simply points the viewer to a service which provides content. The viewer then connects to that service to obtain content. In contrast to the above, not only does bar 106 in FIG. 1 identify content corresponding to multiple providers which may require multiple secondary subscriptions, all of the corresponding content has been aggregated by the provider of the service that corresponds to the primary subscription (e.g., Apple TV).

Figure 2:
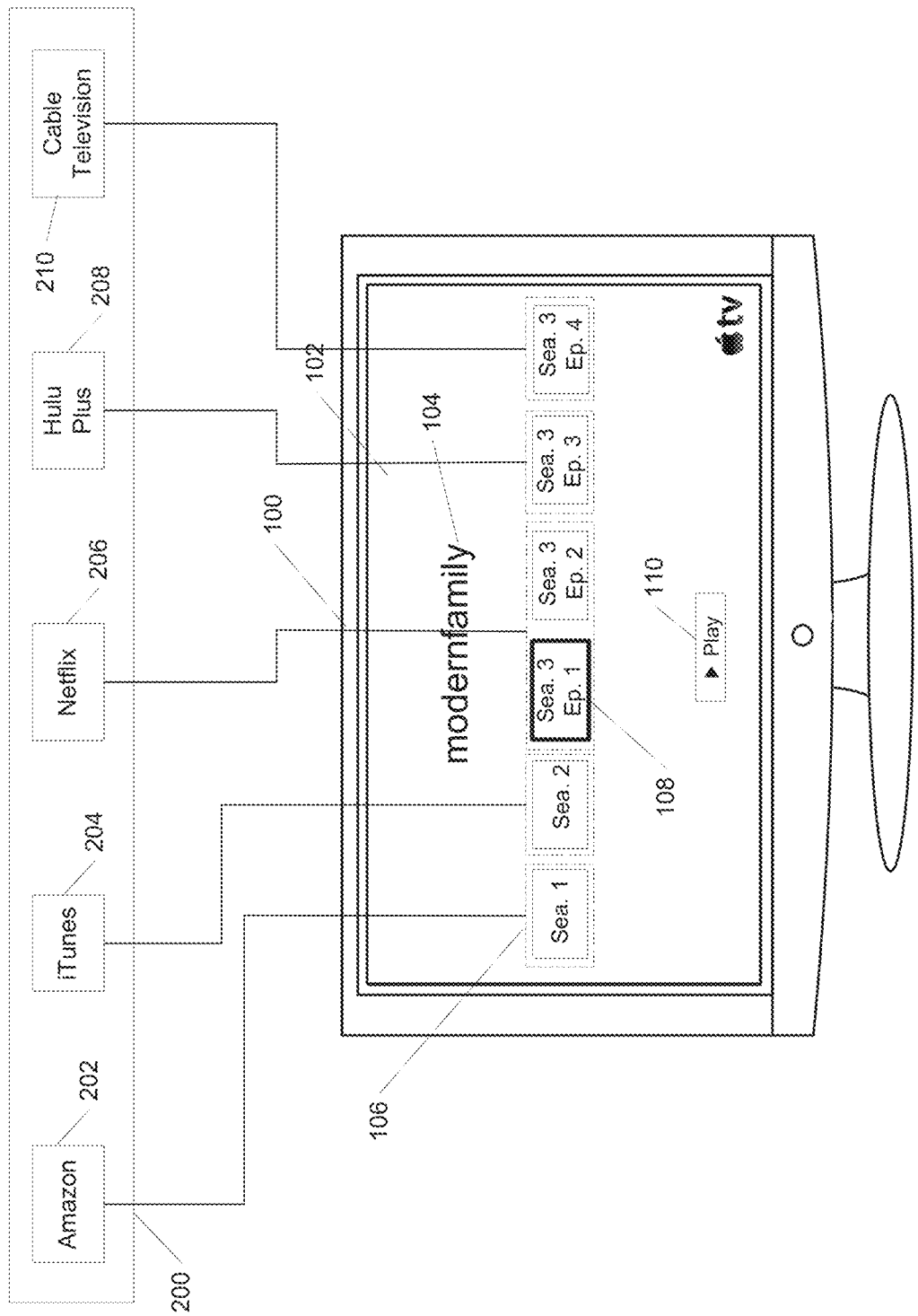
FIG. 2 depicts one embodiment of a video display and secondary sources.

For example, FIG. 2 illustrates the television 100 and display 102 of FIG. 1 with like items having identical reference numerals. FIG. 2 illustrates that the content identified within bar 106 corresponds to different subscription based services 200. For example, season 1 (Sea. 1) is available from the Amazon® service 202, season 2 (Sea. 2) is available from the Apple iTunes® service 204, episodes 1 and 2 of season 3 are available from the Netflix® service 206, episode 3 of season 3 is available from the Hulu Plus® service 208, and episode 4 of season 4 is available from a cable television service 210. In the example shown, a viewer of the display 102 has a subscription to a service provided by the source of the display 102. For example, the viewer may have a subscription to an Apple TV® service (the primary subscription). In various embodiments, the Apple TV service has recorded or otherwise obtained and aggregated content corresponding to all of the sources/providers shown in block 200. Such content may have been obtained directly from the providers themselves, or otherwise. In such an embodiment, whether the viewer selects to view episode 3 or episode 4 of season 3 (each of which corresponds to a different provider and subscription), or any of the other content shown in block 106, the content will be provided by the Apple TV service.

Figure 3:
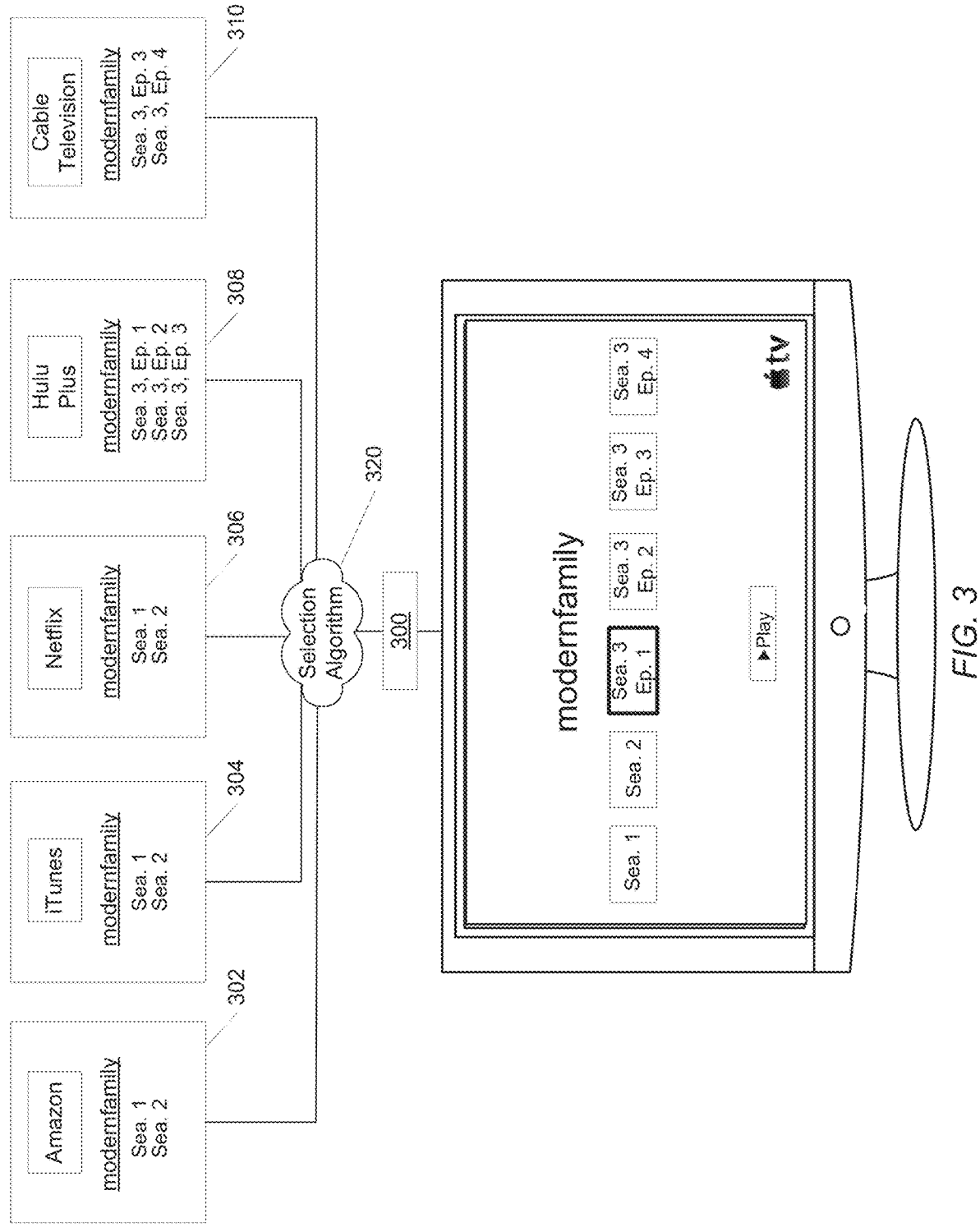
FIG. 3 depicts one embodiment of a video display and secondary sources.

FIG. 3 illustrates one embodiment in which a selection algorithm is used for determining what content is shown as available. Such an algorithm(s) may also be used to select particular content for display when multiple options are available. For example, as shown in FIG. 3, each of the services/providers (302, 304, 306, 308, 310) depict relevant content available corresponding to the modernfamily television series. As can be seen, there is significant duplication among the services in available content. As such, a selection algorithm 320 may be used to select from among the available content. Also, shown in this example is a set-top box 300 coupled to the television. In various embodiments, selection algorithm may include hardware and/or software based processes performed at a server(s) (not shown in FIG. 3), in the set-top box or television itself, at a content provider, or any combination thereof. For example, there may be multiple options available for the episode 1, season 3, e.g., episode 1 of season 3 may be available from multiple sources. This particular episode is available from both provider 308 and provider 310. In addition, each of these providers may have this particular episode available in high definition (HD), or standard definition (SD) or both. Other options may be available as well. Given the various options, duplicate versions of content are possible. In some embodiments, all versions may be displayed to a viewer as being available. In other embodiments, it may not be desirable to always show all versions currently available. In such embodiments, determining which version(s) of particular content to display as being available for selection may need to be made. Alternatively, if selecting "play" by the viewer causes the episode to immediately begin playing automatically, then a selection algorithm may be needed to determine which source is used to provide the content. Whichever option is selected, it will have been stored by the primary subscription service and provided by this primary subscription service (e.g., Apple TV) rather than one of the services/providers (302, 204, 306, 308, 310). Further details regarding the above mentioned selection algorithms will be discussed in greater detail below.

Figure 4:
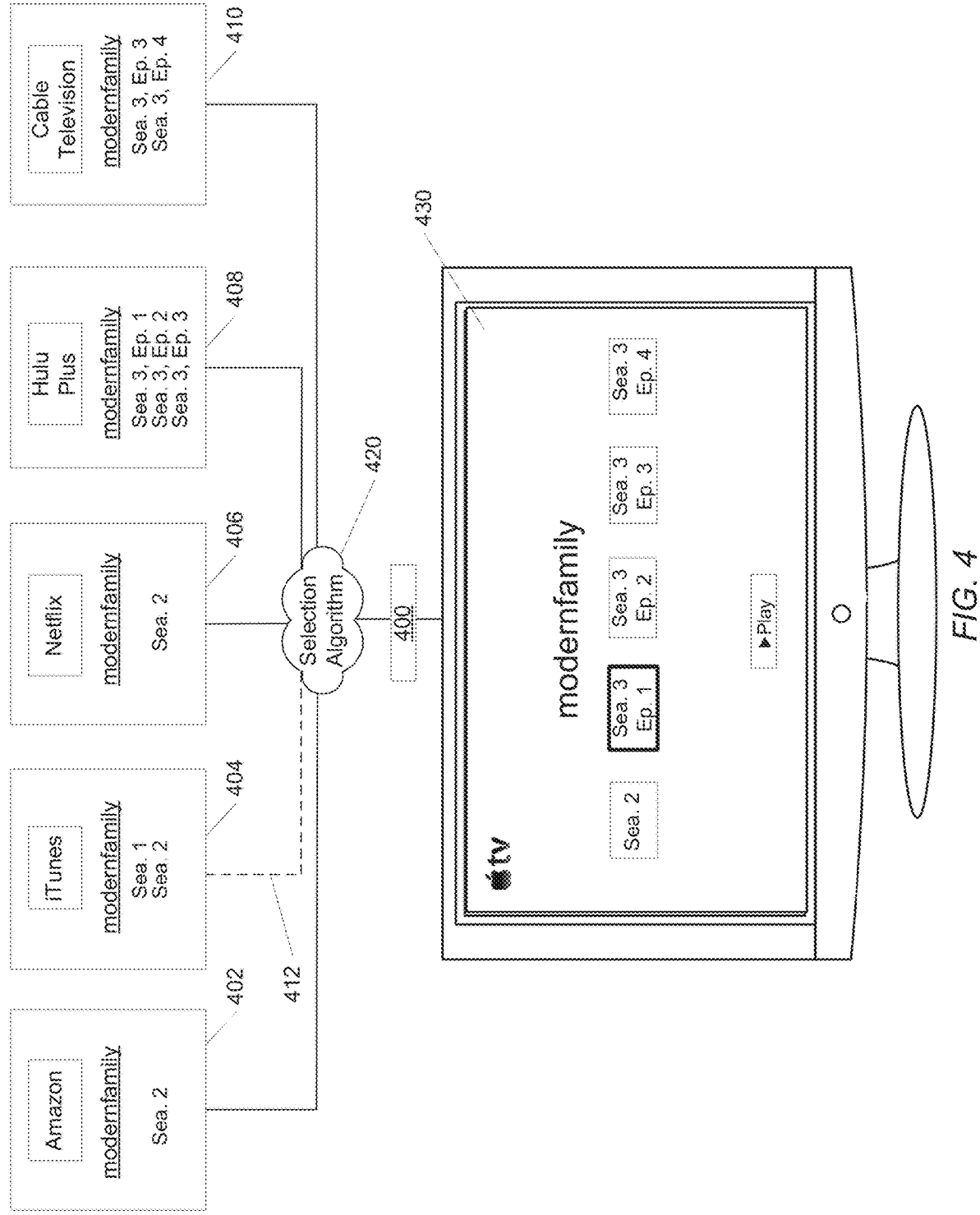
FIG. 4 depicts one embodiment of a video display and secondary sources.

In various embodiments, the content shown as being available in block 106 may also be based upon content that is available for viewing (irrespective of whether the viewer has a current subscription for the content), or content that is available based on the viewer's current subscription(s). The approach used to choose what is shown as being available may be programmable (e.g., based on user settings in a set-top box, based on a service provider's preferences, or otherwise) and may be a combination of the above approaches. FIG. 4 depicts an embodiment in which the content shown as being available is based on whether or not the viewer has a secondary subscription to an available service. In various embodiments, a viewer may be able to view and manage their various primary and secondary subscriptions using interfaces provided by the primary provider on the display. In the example shown in FIG. 4, providers 402-410, selection algorithm 420, set-top box 400 and display 430 are shown. Each of the providers 402-410 are shown coupled to the algorithm 420 by a line. In the embodiment shown, a line coupled from a provider 402-410 to the selection algorithm indicates that the primary subscription based service (Apple TV) provides content corresponding to the given provider (e.g., based on an agreement between the primary subscription service provider and the secondary subscription service provider). A solid line in this case is used to indicate that the viewer has a subscription to the corresponding provider/service and a dashed line indicates the viewer does not have a subscription to the provider/service.

Figure 5:
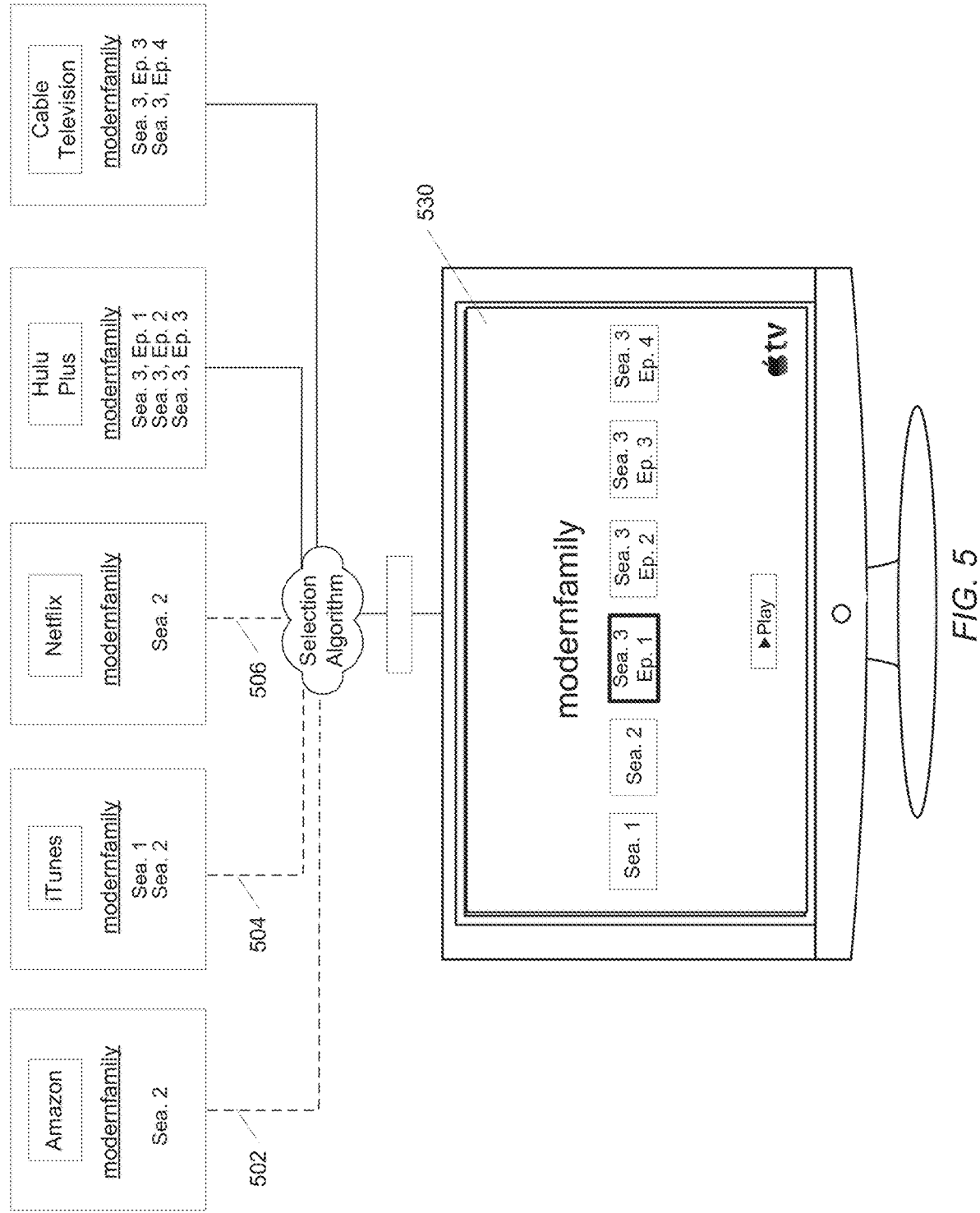
FIG. 5 depicts one embodiment of a video display and secondary sources.

As seen in FIG. 4, the iTunes service is the only provider of season 1 (Sea. 1) of the modernfamily television series. As shown by the dashed line 412, the viewer, which corresponds to the subscription displayed on the display, 430 does not have a currently valid subscription to this service. Consequently, season 1 (Sea. 1) does not show up as being available on the display 430. As an example, a viewer may not want content displayed when a subscription is not available in order to reduce the amount of content displayed. FIG. 5 illustrates the approach wherein content is shown to the viewer as being available irrespective of whether or not the viewer has a (secondary) subscription for the content. In the example of FIG. 5, lines 502, 504, and 506 show the viewer does not have a subscription to the Amazon, iTunes, or Netflix services. Nevertheless, all content is shown as being available to the viewer on the display 530. Having briefly described a television service with primary and secondary subscriptions, and the aggregation of all content by the primary subscription service, we now turn to a discussion of the system in general.

Figure 6:
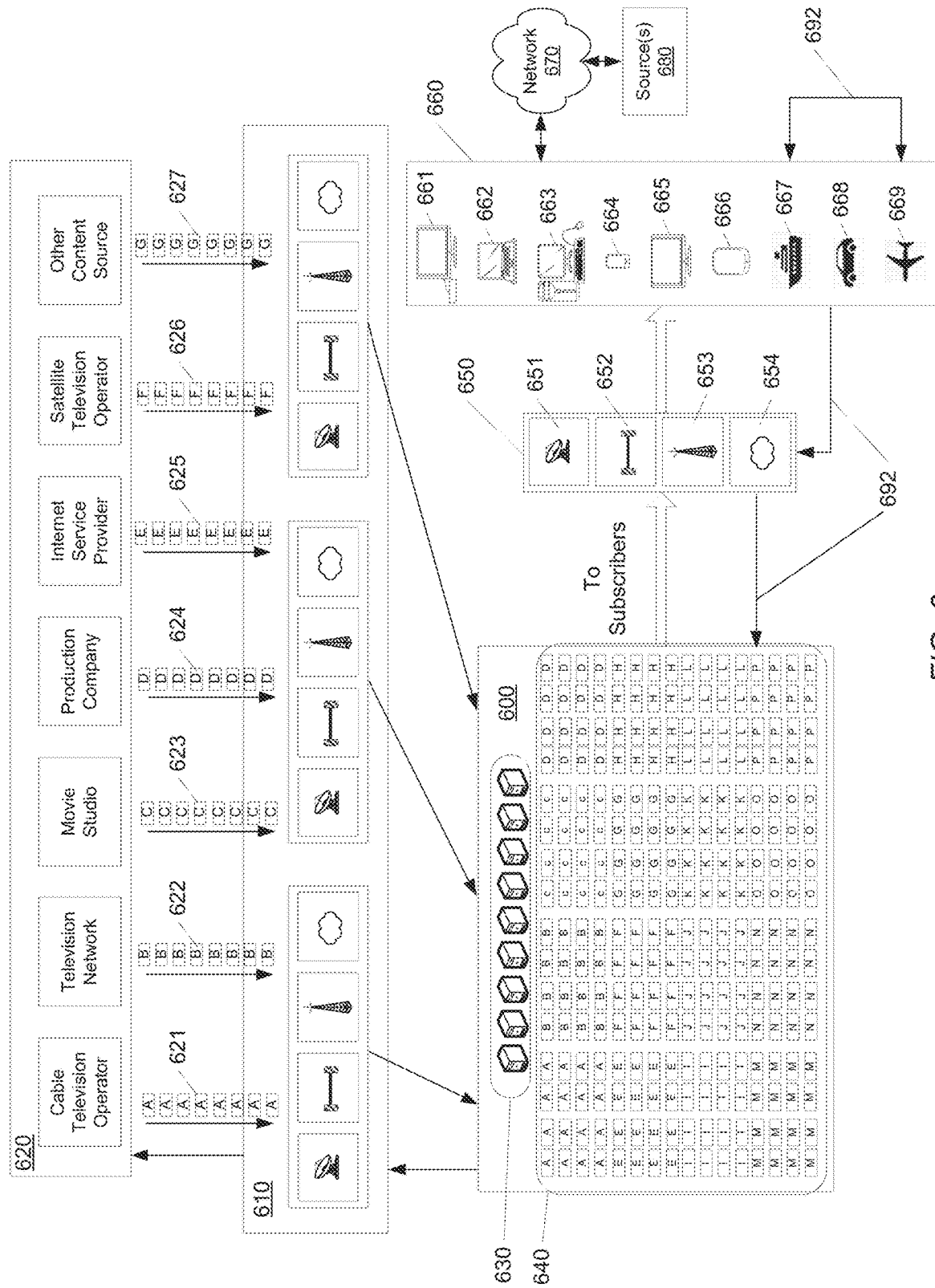
FIG. 6 depicts one embodiment of a portion of a television system.

FIG. 6 illustrates one embodiment of a system corresponding to the above description. In the embodiment shown, a "data store" 600 is shown that includes a large number of servers 630 and a data store 640. In various embodiments, the data store 600 corresponds to a cloud based service whereby content and services are delivered over a network such as the Internet. Also shown are multiple content providers 620 coupled to the data store 600 via multiple communication pathways 610. In various embodiments, providers 620 may include subscription-based providers, which provide paid and/or free content. In various embodiments, the purchase of an application (app) may provide access to particular content. For example, the purchase of a major league baseball app may provide access to content related to major league baseball. In a sense, the purchase of the app effectively serves as a subscription. The application may then be executable (e.g., by the set-top box) to provide an enhanced viewing experience for baseball related viewing. Data store 600 is also shown coupled to convey content to subscribers 660 via multiple pathways 650. Transmission pathways 650 may include satellite-based transmission 651, cable-based systems 652, terrestrial or broadband radio service (BRS) based systems 653, the Internet and/or other networks 654, a combination of these systems, or some other appropriate system of transmission. In the embodiment shown, providers 620 includes cable television operators, television networks, movie studios, production companies, Internet service providers, satellite television operators, and other providers/sources of content. In various embodiments, one or more of the providers 620 corresponds to a subscription-based service whereby subscribers are entitled to gain access to video content.

Also shown in FIG. 6 is the conveyance of content 621-627 by each of the providers 620 via one or more pathways 610 to data store 600. It is noted that while the term data store—singular—is used, in various embodiments the data store 600 is in fact multiple farms that are distributed, as will be discussed shortly. Similar to pathways 650, pathways 610 may include any of a variety of transmission media and may include a variety of transmission protocols. Content 621-627 may generally include video content and related metadata, which describes the content and/or other particular regarding the content. Such metadata can be delivered using protocols or formats such as XML, JSON and the like. Such other particulars may include information regarding licensing related information, subscriber information, pricing information, or otherwise. Appropriate secure or encrypted forms of data transmission can be used to protect commercial and proprietary information related to a provider or personally identifying information related to a user. For ease of illustration, the content 621-627 is shown with a corresponding designation A-G that serves to indicate the content corresponds to a given provider. For example, content 621, which is conveyed by a Cable Television Operator, includes the designation "A". Corresponding data within the data store 600 data store 640 includes the designation "A" as well. In various embodiments, designation "A" for data within data store 640 may serve to indicate that a subscription to the Cable Television Operator includes access to this data. It is noted that such designations for use in relation to data within the data store 640 will form part of the metadata maintained by the data store 600. While content within the data store 640 is shown with a given designation for ease of illustration, in various embodiments particular data in the data farm 600 may be associated with multiple providers 620 and multiple subscriptions. Accordingly, particular content such as an episode of a television show would be associated with multiple providers 620 and metadata maintained by the data store 600 would indicate as much. Therefore, while the illustration of FIG. 6 may depict content as being segregated by provider or subscription (A-P), in various embodiments such segregation or identification is merely logical based on metadata. In various embodiments, data storage reduction techniques such as deduplication and single instance storage will be used for the data store 640.

The previous figures have discussed the television system in terms of conveying content for display on a television. As shown in FIG. 6, the target 660 of video content conveyed by data store 600 may be any of various different types of targets. Exemplary targets 660 shown in FIG. 6 included a set-top box coupled to a television 661, a laptop computer 662, a desktop computer 663, a smart phone, cellular phone, wearable portable device (e.g., a wristwatch type display), other handheld mobile device 664, a television, a tablet computer, a cruise ship for distribution as part of an on-board video system, an automobile (e.g., for display on an integrated video screen), or aircraft for individual distribution to passengers or broader distribution as part of an on-board video system. Other targets capable of displaying video content are possible and are contemplated. Moreover, the content may be movie content that is provided by multiple secondary providers and to which aspects of the description relating to seasons, episodes, channels, that are more relevant to typical television programming may not apply. In addition, in some embodiments, the system and its interface may be used to allow a user to browse and select non-video content such as music or audio content including podcasts that may be presented or played back using the audio output capabilities of the system, or applications that may execute with content displayed on a television such as interactive games.

FIG. 6 also illustrates that targets 660 may communicate with data store 600 via paths 692. Such communication may include requests for video content, receiving device performance related information, viewer profile related information, or otherwise. Also shown is a communication path 692 that illustrates target devices may communicate with other target devices. Such communication may be peer-to-peer based type communication or otherwise. FIG. 6 also shows targets 660 coupled via a network 670 coupled to other sources 680. These other sources 680 may provide access to other sources of video content, Internet based content, or content directly provided by one or more of providers 620.

As discussed above, in various embodiments a viewer may have a primary subscription and one or more second subscriptions. For example, in FIG. 6 a viewer corresponding to one of the targets 660 may have a primary subscription to Apple TV, which in the example shown corresponds to server 600 and related operations. In such an embodiment, the primary subscription may be based on monthly fee, annual fee, or other periodic fee. Alternatively, the primary subscription may be based on the purchase of a set-top box or television with integrated components to support the primary subscription service. Still further, the primary subscription may be based on a combination of a periodic fee, the purchase of equipment, per item purchases, and/or otherwise. Whichever approach is used in a given case for the subscription, the primary subscription generally provides access by the viewer to content maintained within the data store of the primary subscription service provider (e.g., Apple TV). While content available to the viewer is maintained and provided by the primary subscription service provider, which content is available to the viewer according to the primary subscription is based upon one or more secondary subscriptions of the viewer.

As an example, a viewer may have a cable television subscription (secondary subscription). In addition, the viewer may have a subscription to the service provider associated with the data store (e.g., an iTunes account or similar subscription). The cable television operator (e.g., as shown as a provider 620) broadcasts video content, such as live television and video-on-demand content, 24 hours a day. Data store 600 is configured to record and/or otherwise capture all content broadcast/provided by the cable television operator and store the content as part of the data store 640. For example, data designated "A" in data store 640 may represent video content broadcast and/or otherwise provided or available from the cable television operator. Given the viewer's secondary subscription to the cable television operator service, the viewer's primary subscription to Apple TV (data store 600) entitles the viewer to access all of the content in the data store 640 that corresponds to the cable operator. Consequently, the viewer may view live television broadcasts of the cable television operator, which are provided by the data store 600 rather than the cable television operator. Additionally, as the data store 600 is constantly recording/gathering all of the cable operator content, the viewer may have access to content which was broadcast by the cable television operator a week ago, a month ago, or even a year ago, depending on how long the data store maintains the data and/or has rights to convey the data. It is noted, that as used herein, the term broadcast is not limited to a television broadcast in the traditional sense. Rather, broadcast may refer to conveyance of media content from any content provider or delivery system including Internet based providers, satellite based providers, conveyance of content in a viewer's own media store, or otherwise. Additionally, broadcast may be used to encompass multicast and point-to-point communication as well.

In various embodiments, the data store 600 is in principle generally configured to record all video data everywhere all of the time. In other words, the data store 600 operator may seek to store all video content available for viewing globally. Of course as a practical matter, it may not be possible to capture video content in such an all-encompassing manner. As such, the data store operator may generally seek to capture as much media content (audio and/or video, applications, images, etc.) as possible based on subscriber interests and other factors. Such an approach may seek to include storing all previously available video content anywhere in the world and continuously recording newly available video content that is deemed worthy of capture for business or other purposes. Acquisition of video content may generally necessitate license agreements with various copyright holders and providers. As noted earlier, particular content that has been acquired and resides in the data store 600 may be associated with multiple providers. However, while multiple providers may provide subscribers access to particular video content, it generally will not be the case that the data store 600 operator will need agreements with all such providers in order to acquire the content. Rather, in most cases, video content will have been acquired and stored as part of the content 640. The data store 600 operator will then form agreements with providers 620 which will entitle subscribers with primary subscriptions to the data store service 600 and a given secondary subscription to another service 620 to access secondary subscription available content from the data store 600. Depending on a viewer's secondary subscriptions, content within the data store 600 that is accessible to the viewer will vary. In various embodiments, rather than subscribing to all of a secondary provider's content, viewer's may be able to subscribe to a subset of the content offered by a secondary provider, or to combinations of subsets of content offered by multiple secondary providers. For example, a viewer may subscribe to only a particular network, a particular television series, a particular night of the week (e.g., the Thursday night lineup), subscribe according to varying durations (e.g., just the next two weeks), all shows of a particular genre across multiple secondary content providers (e.g. medical dramas; reality shows; etc.) or all content featuring a particular actor (e.g. all Alec Baldwin content), and so on. Numerous such alternatives are possible and are contemplated.

Figure 7:
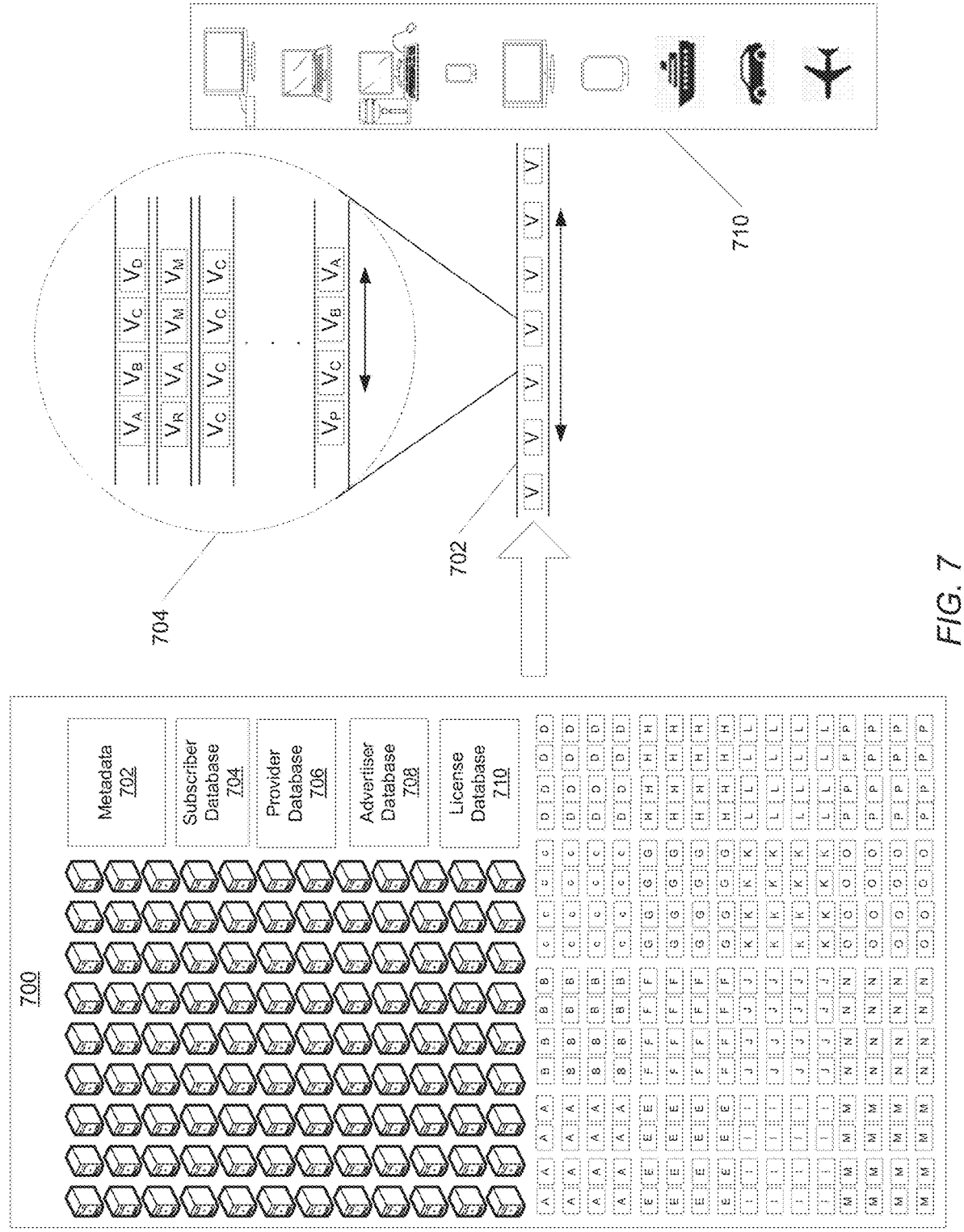
FIG. 7 depicts one embodiment of a portion of a television system.

While the embodiment of FIG. 6 contemplates a primary subscription provider and multiple secondary subscription providers 620, the viewing experience provided to the viewer is generally managed solely by the primary subscription provider. FIG. 7 illustrates a primary subscription based data store 700 coupled to provide video content to targets 710. As previously discussed, data store 700 stores data associated with multiple secondary subscription providers. By having a suitable secondary subscription, a viewer gains access to data in the data store 600 that represents data also provided by the secondary subscription provider. However, the secondary subscription provider does not provide the content to the viewer. Rather, the content is provided by the primary subscription provider. In some embodiments, the viewer may be able to receive content from a secondary provider. In some embodiments, responsive to a purchase by a viewer, the primary provider may obtain content from the secondary provider (assuming the primary provider does not already have the content) and convey/forward the content to the viewer. Conveying/forwarding the content in such a case may include reformatting and/or modifying associated metadata to conform to the primary provider's system requirements.

Additionally, the video environment within which the video content is provided (e.g., via a set-top box provided by the primary subscription provider, etc.) is controlled by the primary subscription provider. Such an approach eliminates or minimizes the viewer's need to navigate or otherwise deal with disparate secondary provider environments. To further enhance the viewer's experience, complications associated with managing secondary subscriptions may be managed through the primary subscription. For example, the primary subscription provider may identify content available to a viewer via a secondary subscription. Should the viewer wish to subscribe to the secondary provider, this may be done through the primary subscription service and may even be billed as part of the primary subscription service billing. This may be accomplished via the primary subscription service interface using a consistent visual/graphical approach. In such a manner, the system provides the viewer with a consistent interface and viewing experience.

As illustrated in FIG. 7, data store 700 includes multiple databases configured to store data associated with the stored video content. These databases include metadata 702, subscriber databases 704, provider databases 706, advertiser databases 708, and license databases 710. Metadata 702 may generally include data that identifies the nature of video content—type, size, title, duration, cast, secondary providers, etc. Subscriber databases 704 may include information regarding primary subscriptions and perhaps secondary subscriptions. Provider databases 706 may include information regarding secondary subscription providers. Advertiser databases 708 may include information regarding advertisers, advertisements, and corresponding agreements. License databases 708 may include license data related to stored content. It is noted that these databases are exemplary only. Numerous other and/or alternative databases may be maintained. Additionally, any suitable storage and/or transmission format for metadata and content may be utilized, such as XML, JSON, or otherwise. As shown, data store 700 conveys video data to targets 710 via a path 702. As depicted, the video content and associated metadata along path is conveyed in a manner to provide a consistent viewing experience—visually illustrated as "V"—which generally seeks to eliminate viewing experience differences generally associated with different video content providers. View 704 illustrates that differences associated with the video content regarding secondary subscriptions or otherwise are subjugated (e.g., identified via the metadata) to the larger viewing presentation. In this manner, viewers can access all content they are entitled to according to secondary subscriptions with one or more providers from a single provider via a single provider interface. Additionally, as all content is stored—the viewer may access content which was at one time provided by the secondary provider but is no longer provided by that provider. In various embodiments, the viewing experience is controlled by the primary provider by providing the hardware and/or software with which subscribers access the video content, or by controlling specifications of the hardware and/or software used by the subscribers.

Figure 8:
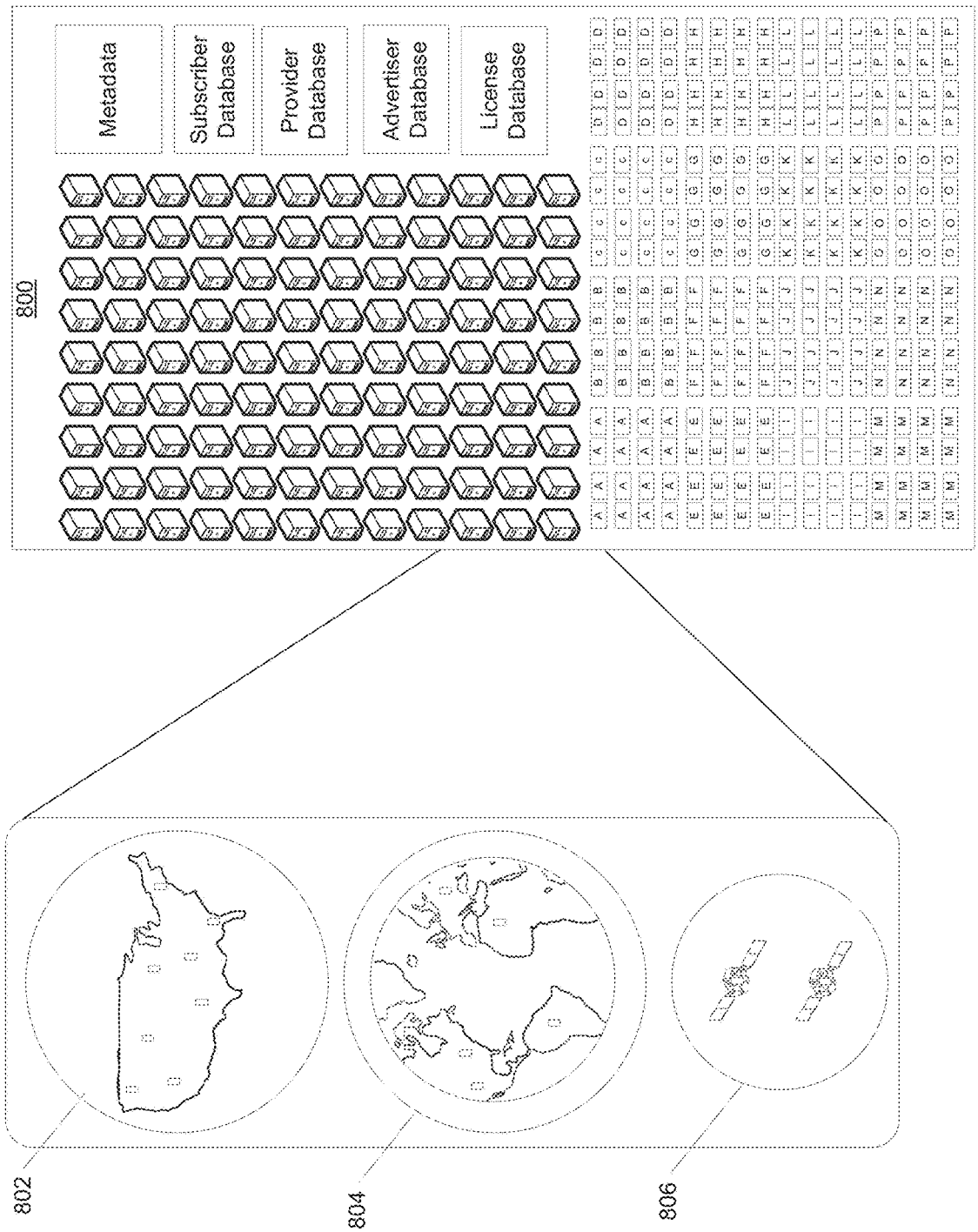
FIG. 8 depicts one embodiment of the distribution of video server farm.

Turning now to FIG. 8, one embodiment of a data store 800 as previously discussed is shown. Generally speaking, data store 800 is distributed throughout a particular geographic region 802, strategically distributed throughout the globe 804, and may also include distributed portions in satellite based systems. Additionally, embodiments are contemplated in which peer-to-peer storage techniques may be used. In some embodiments, subscriber devices themselves may serve (at least in part) as storage for a distributed storage system. In this manner, data may be served to particular regions throughout the globe in a relatively efficient manner compared to having one or only a small number of server sites.

Figure 9:
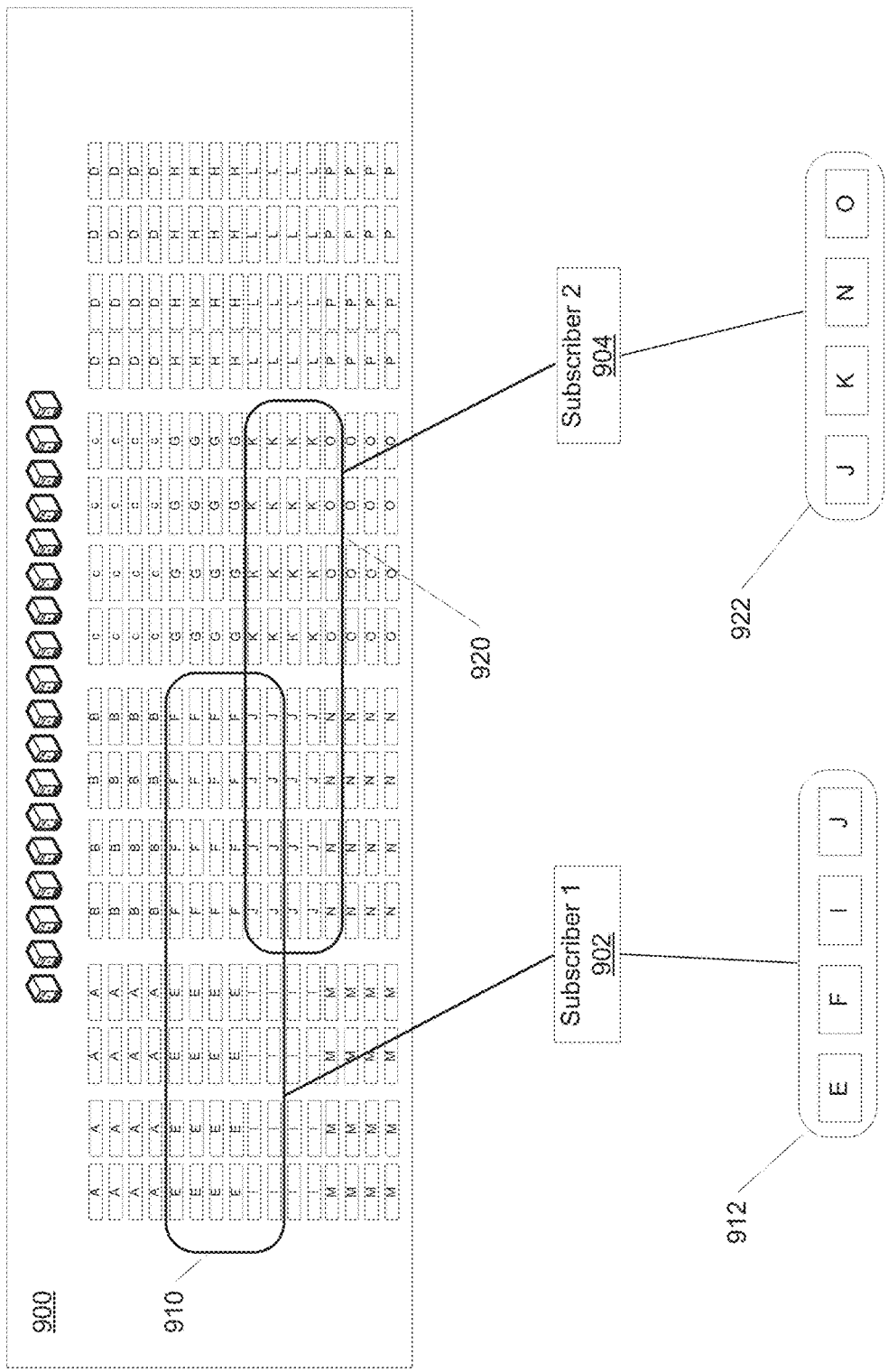
FIG. 9 depicts one embodiment of subscribers and video content.

Generally speaking in the prior art, a television subscription, such as a cable television subscription, is associated with one or more particular devices (set-top boxes). Such devices are uniquely identified by the cable television operator and communication is established with the device which enables the device to receive programming from the cable operator. In contrast, in various embodiments, primary subscriptions as described herein may be associated with particular subscribers rather than particular devices. Given such an approach, the subscriber's content may follow the subscriber wherever they or their devices may go. The following discussion illustrates these features. FIG. 9 depicts data store 900 including video content that corresponds to multiple secondary subscriptions/providers. A first subscriber 902 has four secondary subscriptions 912 E, F, I and J. This entitles subscriber 1 902 access (e.g., viewing privileges) to the E, F, I and J content 910 stored as part of the content associated with farm 900. A second subscriber, subscriber 2 904, has secondary subscriptions 922 J, K, N and O. This entitles subscriber 2 904 access to the J, K, N and O content 920 stored as part of the content associated with farm 900. In this example, both subscribers have secondary subscriptions providing access to the content J.

Figure 10:
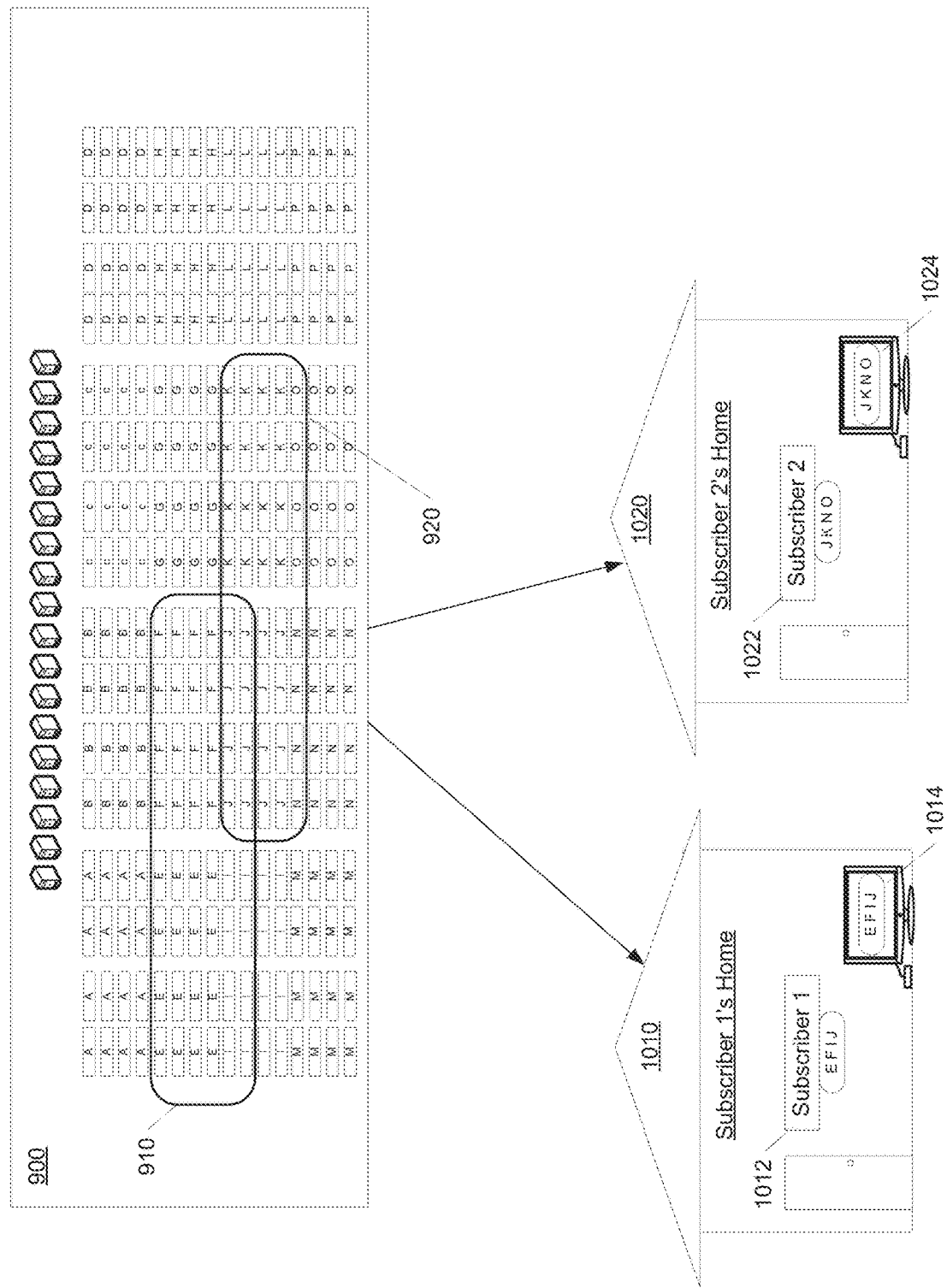
FIG. 10 depicts one embodiment of subscribers and video content.
Figure 11:
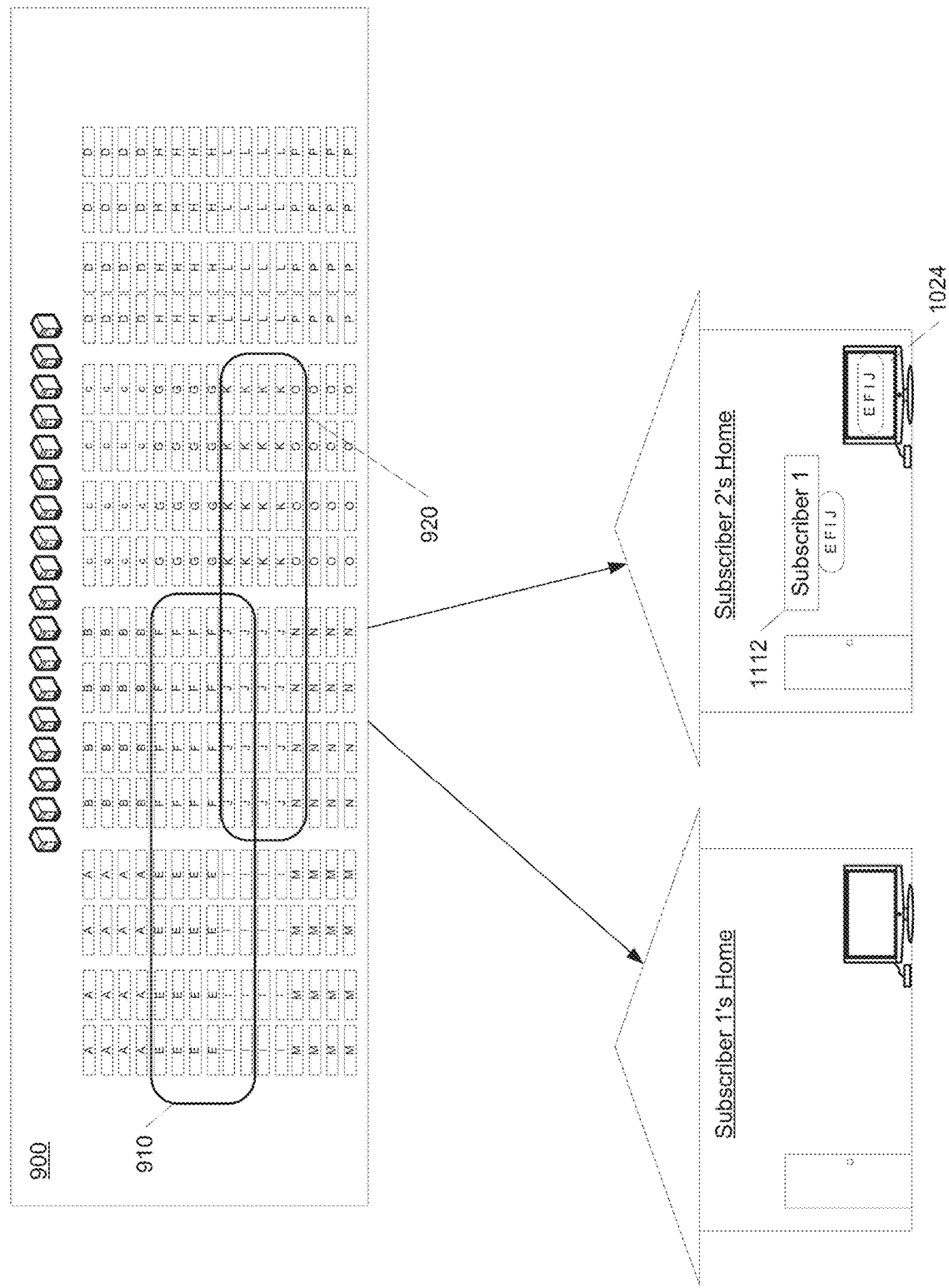
FIG. 11 depicts one embodiment of subscribers and video content.

Turning to FIG. 10, the homes of subscriber 1 1010 and the home of subscriber 2 102 are shown. Subscriber 1 1012 is shown to be present in the home 1010, and subscriber 2 1022 is shown to be present in home 1020. Subscriber 1 1012 is shown to have access to content E, F, I and J and the corresponding content is viewable on the television 1014. Subscriber 2 1022 is shown to have access to content J, K, N and O, and the corresponding content is viewable on the television 1024. FIG. 11 illustrates subscriber 1 1112 has now moved to subscriber 2's home. As subscriber 1's primary subscription is associated with subscriber 1 and is not viewable on a specific device, subscriber 1's content E, F, I and J is viewable in subscriber 2's home television 1024. Various embodiments for how subscriber 1's subscription follows the subscriber in this manner are contemplated. In one embodiment, subscriber 1's use of a remote control device in subscriber 2's home is recognized by the remote control and/or other video content display devices. For example, the remote control used with a set-top box may include biometric recognition capability to recognize a fingerprint, voice, or other characteristic of the person using the remote control. This biometric data could then be communicated to the set-top box and conveyed to the primary subscription provider for analysis. Identification of a particular subscriber may cause conveyance of particular codes or entitlement data to the set-top box, which then enables it to receive subscriber 1's content.

In other embodiments, password or other login type information may be entered via a remote control device. Authorization may result in codes or entitlement data being conveyed similar to that discussed above. Still further, in other embodiments, subscribers may have particular mobile devices associated with their subscription. For example, a subscriber's smart phone may be associated with the subscription. In some cases, the smart phone itself may itself be authorized to receive and display subscription based video content. Additionally, the smart phone may be useable as a remote control for a television system. In such an embodiment, the smart phone may be configured to communicate with a television, set-top box, or other video system component. Based on such communication, the set-top box or other device may convey the smart phone data to the primary subscription service provider. If the smart phone is identified as being associated with a valid subscription, then entitlement/authorization type data may be conveyed to the set-top, television, or otherwise, which enables it to receive subscriber 1's subscription based content. Such embodiments would enable the viewing of one's own subscription content at a friend's house. Alternatively, subscription content could follow a subscriber to a hotel room during travel. Numerous such scenarios are possible and are contemplated.

Figure 12:
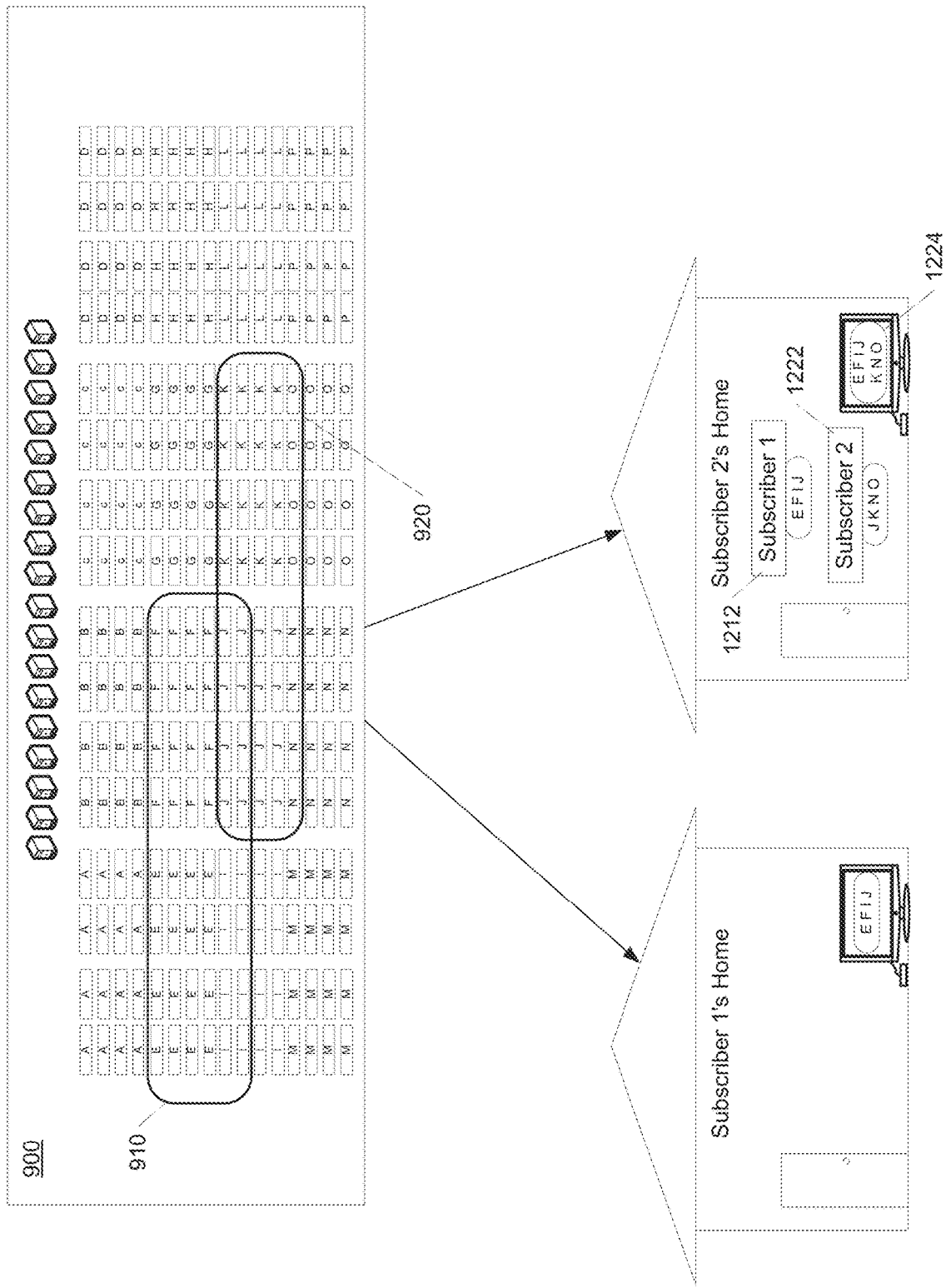
FIG. 12 depicts one embodiment of subscribers and video content.

FIG. 12 illustrates an embodiment in which subscription content for both subscriber 1 1212 and subscriber 2 1222 is concurrently available on the television 1224 in subscriber 2's home. In such an embodiment, a device such as a set-top box detects the presence of both subscribers and authorizes access to their combined content. In various embodiments, such as the smart phone embodiment described above, the detection and identification of the smart phone triggers the authorization mechanism for the subscriber content. In such an embodiment, the smart phone may have a setting that enables or disables the mechanism. For example, in one embodiment the mechanism may be enabled and have a broadcast mode in which the subscriber needn't take any action to cause the authorization to take place. The mere presence, such as walking in to the home, results in the set-top box being authorized to receive the subscription-based content. In such an embodiment, simply walking into a neighbor's home may result in the same authorization. If such authorization is not desired, then the smart phone (or other mobile device) may have a setting that disables the automatic authorization mechanism.

In some embodiments, the feature of having a subscriber's content follow the subscriber and be displayed on another device (e.g., a friend's television or a hotel room television) may be a feature that is provided at an additional cost (e.g., a small monthly fee). Additionally, such a feature (which may be referred to as a "follow me" mode) may be enabled or disabled. For example, in some embodiments, when subscription content follows a subscriber to another location where it is then viewed, that content is not simultaneously viewable in the subscriber's home. In various embodiments, such a mode may be controllable by both a set-top box in the subscriber's home as well as by the subscriber while not at home. If desired, primacy may be given to the set-top box at home. In this manner, content may follow the subscriber away from home, but when someone at the home wishes to access particular subscription based content it is permitted and the follow me mode is temporarily disabled. Numerous such alternatives are possible and are contemplated.

Figure 13:
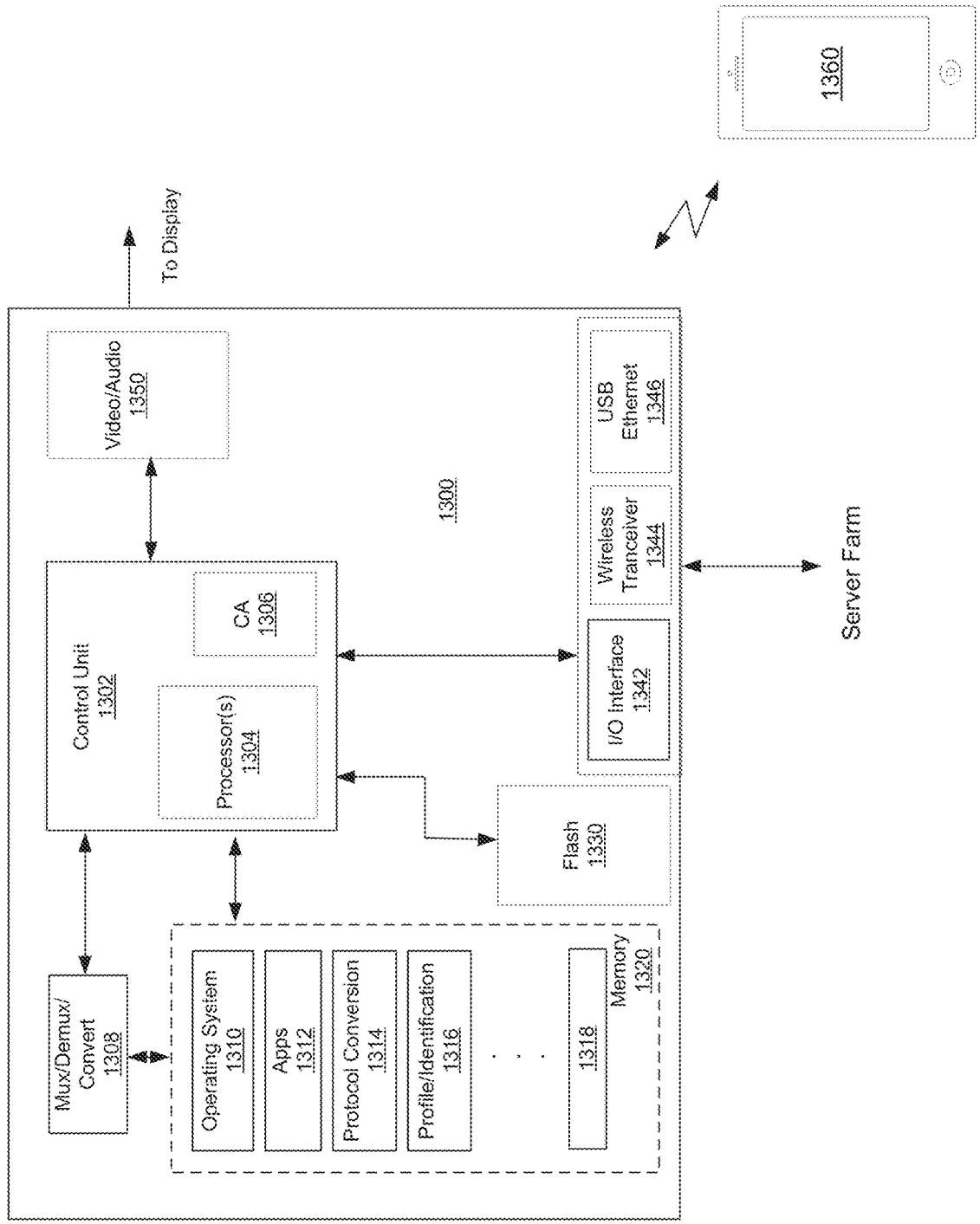
FIG. 13 depicts one embodiment of a receiver and mobile device.

Turning now to FIG. 13, a general block diagram illustrating one embodiment of a set-top box 1300 and mobile device 1360 is shown. Set-top box 1300 is shown to include a control unit 1302 including processor(s) 1304 and conditional access (CA) type unit 1306. Set-top box 1300 includes memory 1320, persistent memory (Flash) 1330, I/O interfaces 1342, wireless transceiver 1344 configured to support WiFi, Bluetooth, or any other wireless communication protocol, and USB, MoCA, and Ethernet, and other interfaces including, for example the Apple Thunderbolt interface 1346. A mux/demux/convert unit is included which may be configured to receive, demultiplex, and convert the formats of receive signals. A video/audio unit 1350 is included to convey audio and video data to a display device. Such audio and video data includes audio/video content received by the set-top box and also includes any overlays or other graphic elements generated by the set-top box 1300. Also included are operating system components 1310, applications (apps) 1312 executable by the processor(s) 1304, components 1314 for use in converting between communication protocols, viewer profile/identification 1316 related components, and any other 1318 suitable components. In various embodiments, the set-top box can optionally exclude tuners in the conventional sense. In other words, the set-top box can have no QAM or ATSC tuners. Rather, in various embodiments, the set-top box receives video content via a network interface such as an interface coupled to the Internet.

In various embodiments, the set-top box 1300 can optionally exclude mass storage (such as a disk drive or similar DVR type mass storage device) and is not configured to provide access to locally attached mass storage. Rather, sufficient storage for some video buffering, operating system and application memory resident operations, and so on, may be all that is provided. In such an embodiment, the set-top box 1300 is generally configured for video streaming and not video storage. Other embodiments could include or provide access to local mass storage. Mobile device 1360 may be a dedicated remote control device, smart phone, or other device that is configured to communicate with the set-top box 1300. As discussed above, in various embodiments the device 1360 may be identifiable as being associated with a subscriber. Responsive to such identification (e.g., using identification component 1316 and communication with a subscription service), the set-top box may be authorized to receive subscriber content. In other embodiments, biometric data may be entered to the device 1360 (e.g., a fingerprint or voice sample) which is then used for authentication/authorization. Various such embodiments are possible and are contemplated as per the discussion above.

Figure 14:
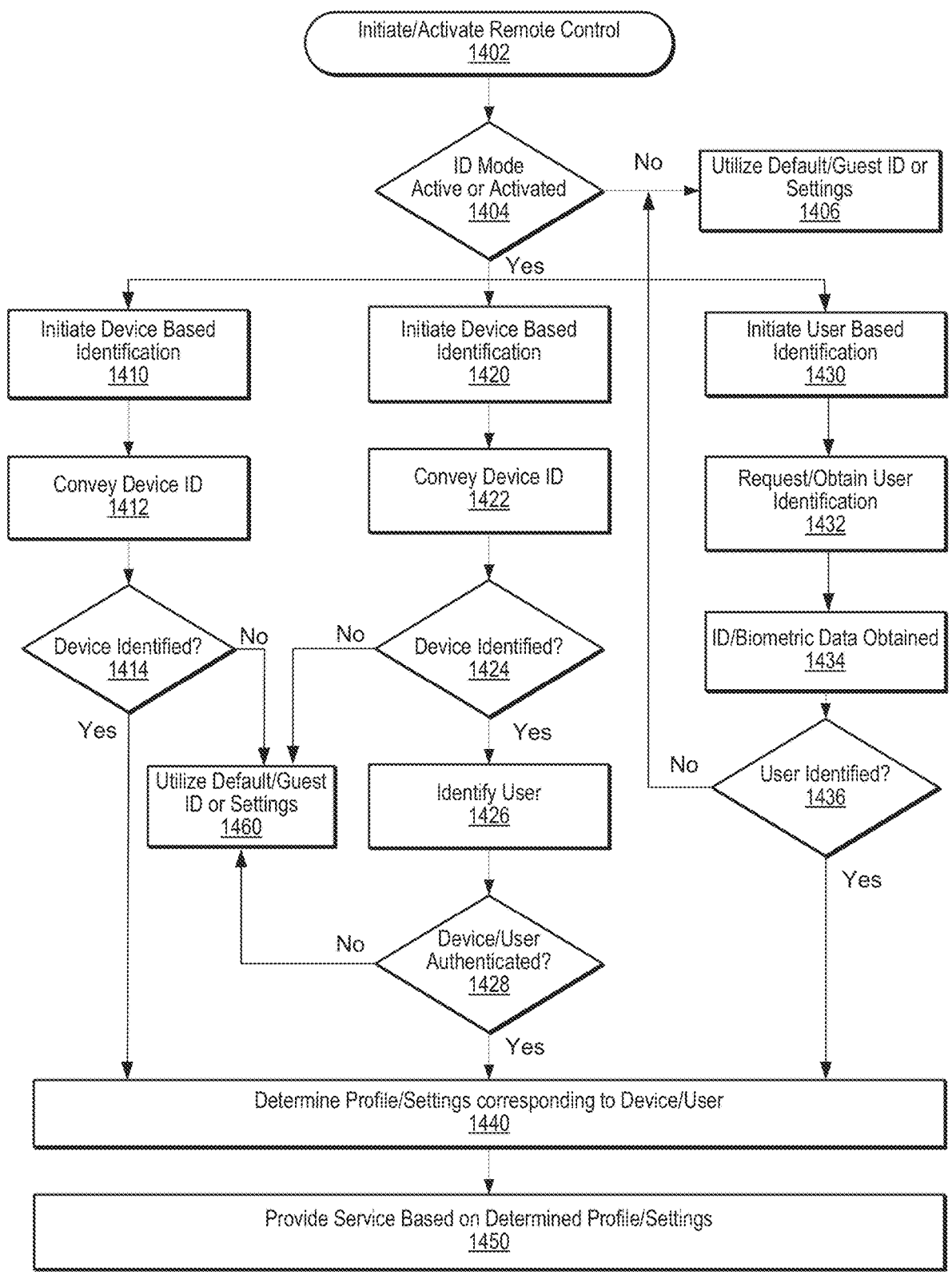
FIG. 14 depicts one embodiment of a method for identifying a subscriber.

FIG. 14 illustrates one embodiment of a method for use in identifying a subscriber and authorizing the receipt of subscriber content at a particular device. In the method shown, a remote control or other handheld device is used to initiate or activate the procedure (block 1402). In various embodiments, such activation may be initiated by starting a particular app on a smart phone, detecting movement of a remote control via an accelerometer or similar device, pushing a button on a remote control, detecting and optionally identifying a fingerprint of a finger resting on a touch pad of a remote control, recognition of a voice in response to the receipt of a voice command, and so on. In an embodiment in which the identification mode may be enabled and disabled, if the mode is disabled (decision block 1404), default settings or guest ID type settings (1406) may be used for the set-top box, television, or other associated video display device. For example, by default a set-top box may be configurable by a viewer to display particular content (for example, content that corresponds to the owner of the home in which the set-top box is located). If ID mode is activated (decision block 1404), then an identification/authorization procedure is initiated. For ease of discussion, three different embodiments are illustrated in FIG. 14. Block 1410 corresponds to an embodiments in which identification is based on the mobile device being used to communicate with the set-top box (e.g., the smart phone based example described above). A second embodiment proceeds with block 1430 is represents a biometric or other approach that is not based on the particular mobile device being used. Finally, a third embodiment begins with block 1420, which represents a combination of device and user identification. Depending on the embodiment, one of these three paths will be chosen. In various embodiments, only one such path/embodiment is available. In other embodiments, multiple such paths/embodiments are available and may be selected as a preferred method by configuring the set-top box or other receiving device accordingly.

Beginning with block 410, device based identification is initiated. In this embodiment, an identification of the mobile device 1412 is received by the set-top box from the mobile device. While a set-top box is described as the receiving device for purposes of discussion, it is to be understood that the receiving device may be a television with supporting circuitry, a game console with supporting circuitry, or otherwise. Having received the device identifier, an effort to identify the device is undertaken (decision block 1414). Such identification may include communication with the subscription provider which accesses a subscriber database or otherwise to determine if the mobile device is associated with a subscription. In other embodiments, the set-top box may store device identifiers for a certain period of time (e.g., 24 hours) with associated authorization information. In such an embodiment, re-authorization would only be needed once per day or according to some other time interval. In such embodiments, the subscription provider may be able to invalidate such set-top box data at will in order to require re-authorization. If the device is not successfully identified, then default or guest settings 1450 may be used. If the device is successfully identified and it is associated with a valid subscription, then settings that correspond to the subscription may be obtained (e.g., settings for the set-top box environment, settings for the particular user, etc.) (block 1410), and access to the subscription based content is authorized (block 1450).

Alternatively, the path may begin with block 1430 where user based authentication is initiated. In such an embodiment, user identification may be requested by the remote control/mobile device (block 1432). In response, a viewer provides biometric or login type data (block 1432). If the user identification is successful (block 1436), then the method continues with block 1440. Otherwise, default or guest settings may be used (block 1406). User identification may include a process similar to that described in association with block 1414.

Finally, the third approach begins with block 1420 where device based identification is initiated. In this embodiment, the device is first identified (blocks 1422 and 1424). If the device is successfully identified, then an attempt to identify the user is made (block 1426). This may be used to verify that the remote control/mobile device is being used by the rightful owner or otherwise expected user. If both the device and user are properly identified as corresponding to a valid subscription (decision block 1428), then the method proceeds with block 1440. Otherwise, default or guest settings may be used (block 1406). In each of the embodiments, default settings may be configurable and may include disabling access completely, conveying a communication (email, text message, etc.) that indicates the failed attempt, or otherwise.

Figure 15:
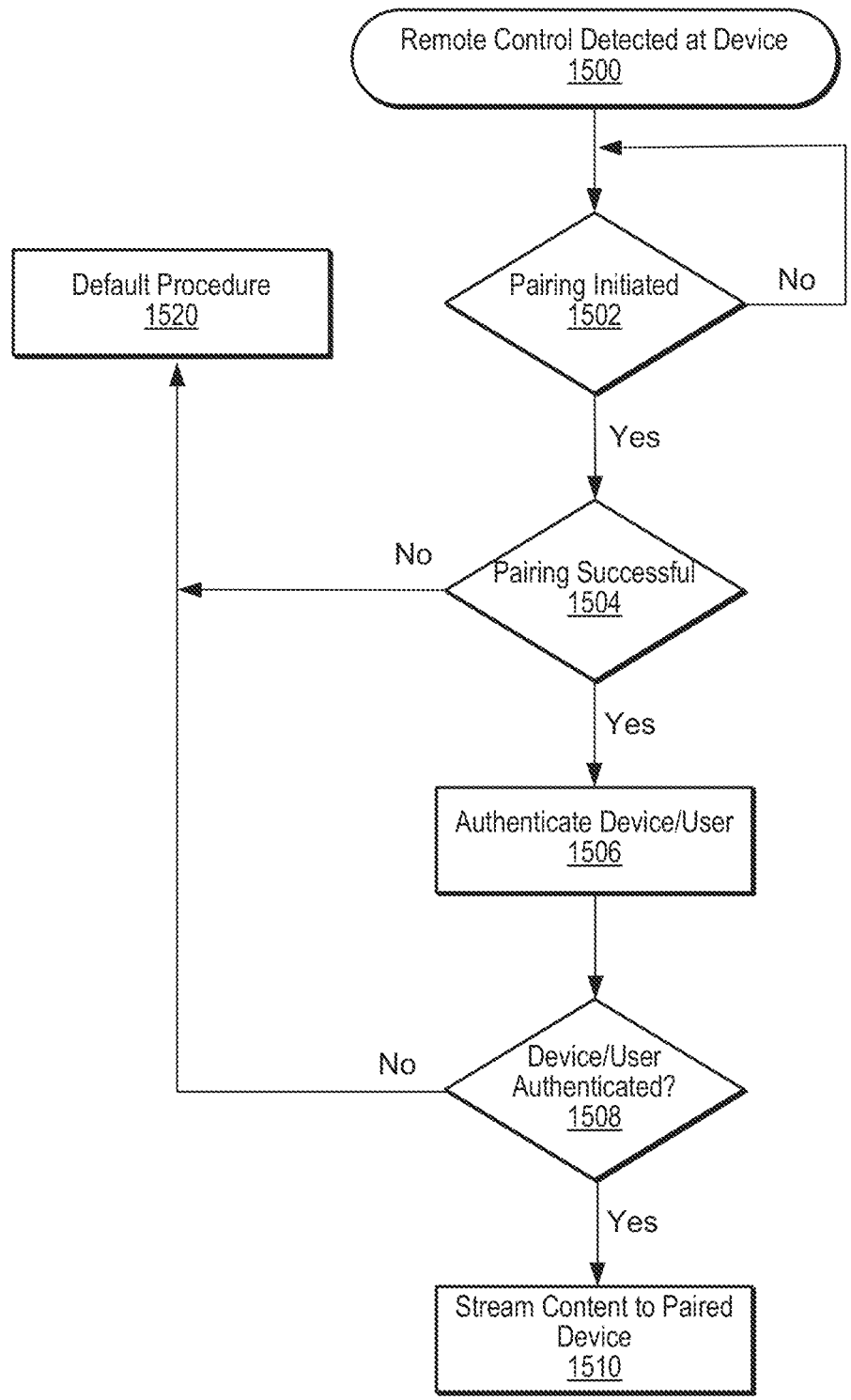
FIG. 15 depicts one embodiment of a method for pairing a television and mobile device.

Turning now to FIG. 15, one embodiment of a method for pairing a remote control or other mobile device with a set-top box or other video display device is shown. In various embodiments, a remote control or other device may use Bluetooth or any other suitable wireless communication protocol to establish communication with a set-top box or other device. In the example shown, a remote control device is detected (block 1500). This detection may be pursuant to an explicitly initiated detection procedure, or could be based on a constant broadcast and detection mechanism. Responsive to detecting a device, a pairing attempt may be initiated (decision block 1502). If pairing of the remote control with the set-top box is successful (decision block 1504), then device and/or user authentication is initiated (block 1506). This authentication may correspond to the various embodiments discussed in relation to FIG. 14. If authentication is successful (decision block 1508), then streaming of the subscription based content to the paired device (e.g., set-top box) is authorized. If authentication is not successful (decision block 1508), then a default procedure may be used (block 1520). This default procedure may include disabling access to the set-top box, using default or guest settings, or any other procedure deemed suitable.

Figure 16:
FIG. 16 depicts one embodiment of a video display.

As discussed above, the primary provider will generally have a great deal of content available for viewing by a given subscriber. The content that is available may be determined in part based on secondary subscriptions of the viewer. As noted, there may be duplication among the secondary subscriptions and/or primary subscription as to available content. Additionally, particular content may be available in many forms. FIG. 16 illustrates some of the various forms that content may take.

In the example shown, content may differ as to cost 1602 (viewable for free or viewable for payment of a fee) and quality (HD or SD) 1604. In addition, presentation of content may include presentation with advertisements (ADs) or without ADs 1606. With only these variables, given content may correspond to one of eight different forms/presentations as shown by the tree 1610. In this case, the eight possibilities are:

1. Free, HD, with ADs
2. Free, HD, without ADs
3. Free, SD, with ADs
4. Free, SD, without ADs
5. Paid, HD, with ADs
6. Paid, HD, without ADs
7. Paid, SD, with ADs
8. Paid, SD, without ADs Given these possibilities, a viewer may have various preferences regarding how the given content is prioritized when either being presented as being available or when being selected for viewing. For example, a viewer may give a higher priority to free content over paid content. Also, HD content may be given priority over SD content, and so on. Using such preferences, selections from available content may be made for presentation to the viewer or when particular content is selected for viewing. In addition to such preferences, additional factors 1608 may be used to determine which content is provided to a viewer. For example, bandwidth considerations may affect the selection of content. If it is determined that the bandwidth to the viewer's device is limited, HD content may be disfavored (at least temporarily) until the condition eases. In such a case, the options indicated by 1620 and 1622 in FIG. 16 may be eliminated. Additionally, a viewer's preferences may generally indicate a preference for HD content. However, on a particular occasion, the viewer's target device may have a very small display which may not generally reveal significant differences between SD and HD content. In such a case, SD may be preferentially conveyed.

Figure 17:
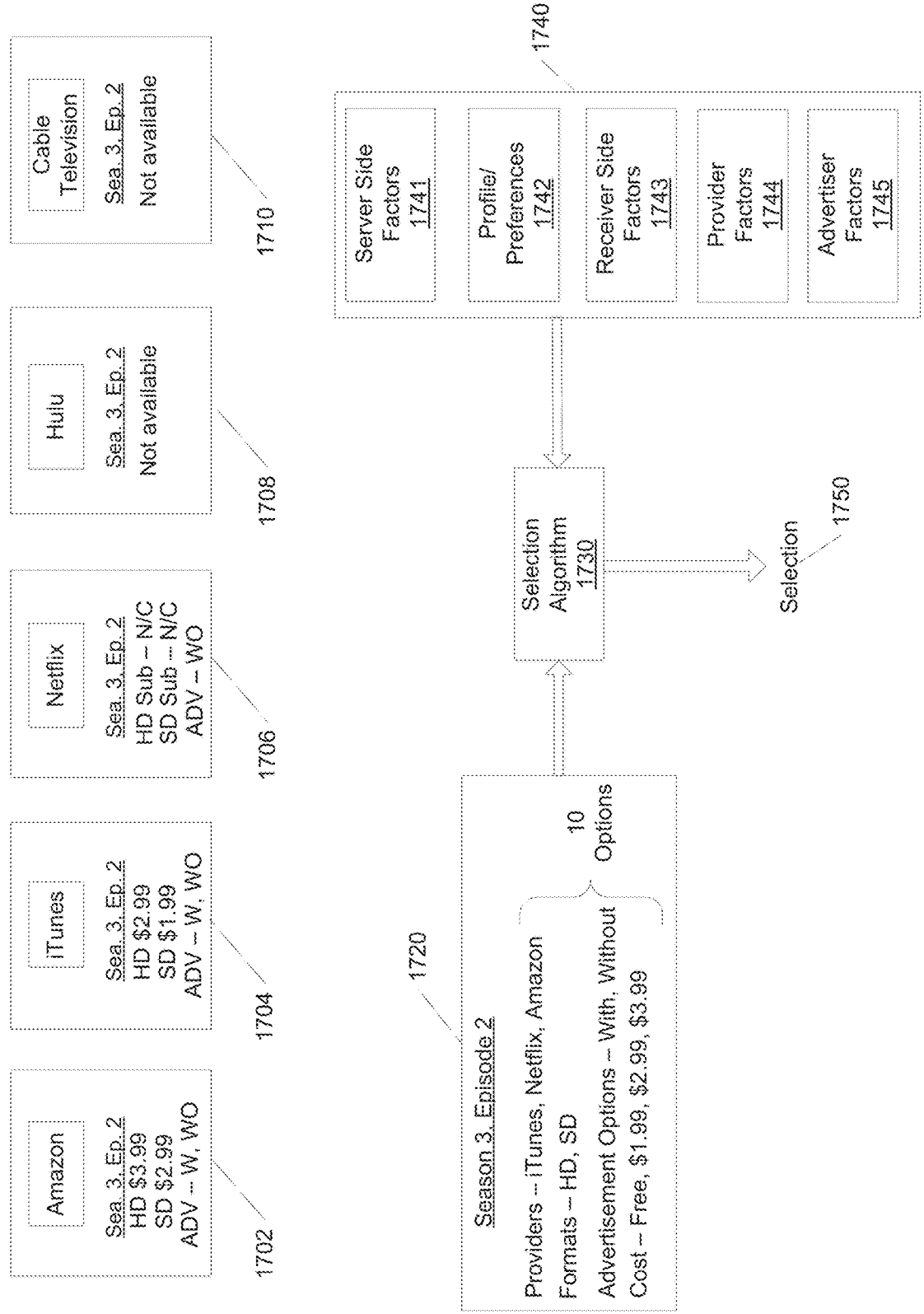
FIG. 17 depicts one embodiment of a video display.

FIG. 17 depicts one embodiment in which multiple options for content are available. In the example shown, five secondary providers 1702, 1704, 1706, 1708 and 1710 are shown. The particular content in question is Season 3, Episode 2 of a given series. For this given episode, box 1720 shows there are 10 different selections available. There are three secondary providers of the particular content available—iTunes, Netflix, and Amazon. The content is available in both HD and SD. The content is available for free (Netflix subscription—no additional charge N/C), at a cost of $1.99, $2.99, and $3.99. Finally, the content is available with or without advertisements. All 10 options serve as input to a selection algorithm 1730. Also serving as input to the selection algorithm are server side factors 1741, viewer profile/preferences 1742, receiver side factors 1743, provider factors 1744, and advertiser factors 1745 (collectively factors 1740). Viewer profile/preferences 1742 may include information based on a viewer's viewing habits and activities, explicitly entered viewer preferences or information, profile and/or preference information related to other viewers, or any combination of these. Such profile and/or preference information may generally be referred to as a viewer "profile" herein. Server side factors 1741 may include processing and bandwidth considerations. Profile/Preferences 1742 have been discussed. Receiver side factors 1743 may include information received from a target device regarding processing, memory, or other condition that may affect performance. Provider factors 1744 may include agreements with secondary providers regarding how content is to be provided. Finally, advertiser factors 1745 may include agreements with advertisers how advertisements are to be presented. As may be appreciated, many other factors are possible and are contemplated.

Given the available content options and factors 1740, the algorithm 1730 selects one or more of the options for presentation to the viewer. Such a process may be repeated as need to generate a plurality of items for presentation to a viewer (e.g., a number of episodes of a given series).

In the following discussion, various embodiments of the operation of a receiving device and interface are shown. Generally speaking, the embodiments described in the following figures are configured to operate with the embodiments in the foregoing description. It is further noted that the following described embodiments may be implemented in association with other video content delivery systems. For example, the following embodiments may be utilized in association with traditional cable or satellite television systems, special purpose set top boxes (e.g., Roku type boxes), Internet video providers, and so on. All such embodiments are contemplated.

Figure 18:
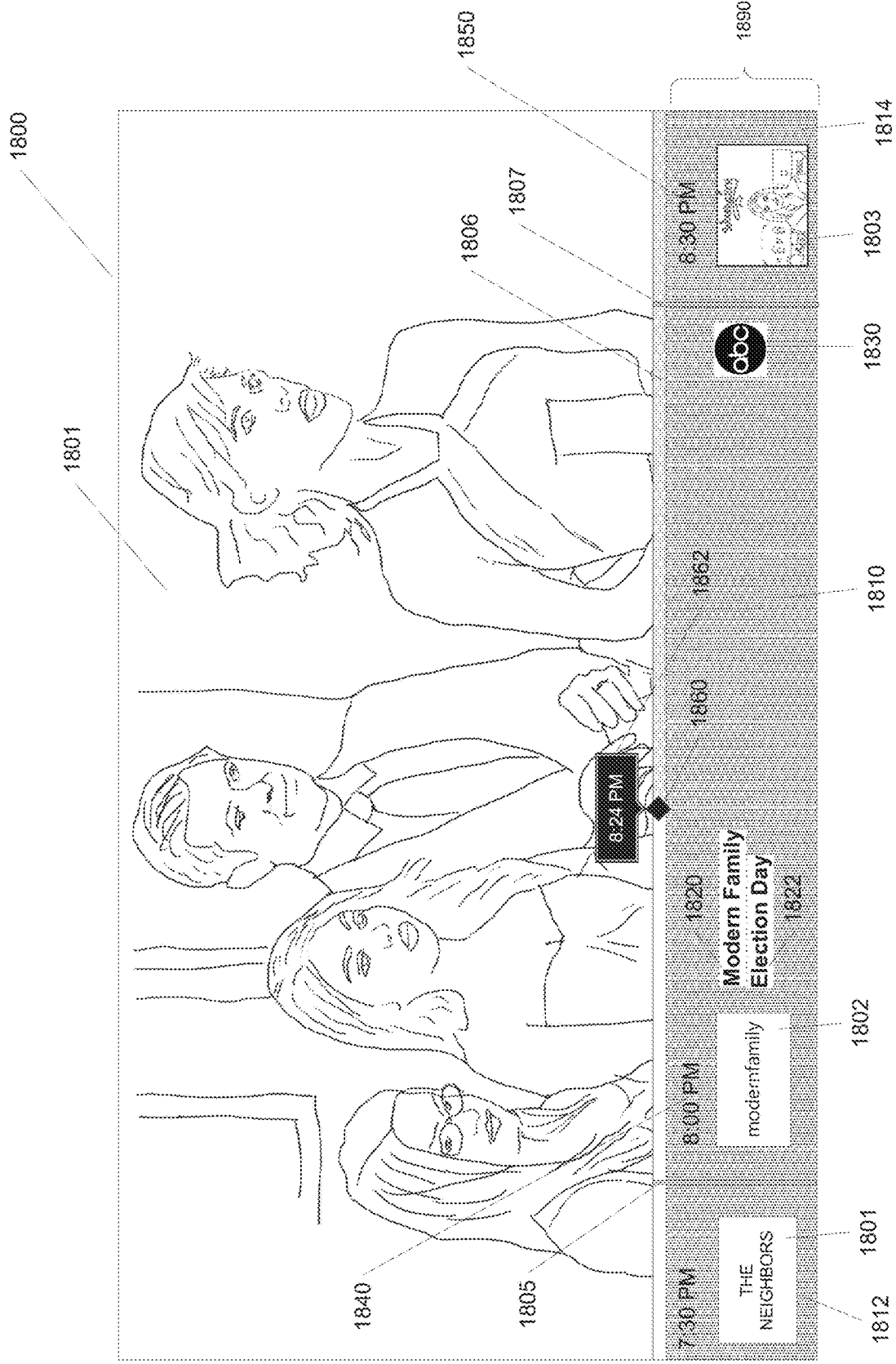
FIG. 18 depicts one embodiment of a video display and channel bar.

FIG. 18 illustrates one embodiment of a display with user interface channel bar. Display 1800 is shown displaying video content 1801 that may be streamed from a subscription based service provider (e.g., Apple TV). In various embodiments of the systems and methods described herein, a channel bar 1890 similar to that shown in FIG. 18 may be automatically displayed when a viewer turns on a television (or television and set top box) for viewing. The particular channel displayed may correspond to the last channel being watched when the television was turned off, a particular favorite channel that has been identified either explicitly or implicitly (e.g., based on viewing history), a channel with a particular program airing that is predicted to be of interest to the viewer (e.g., based on viewing history, past purchases, etc.), or otherwise.

Also shown in the lower portion of the display 1800 is a "scrubber" bar 1806 and channel bar 1890. In various embodiments, scrubber bar 1806 and channel bar 1810 are graphic overlay elements generated by a set-top box on top of the video content 1801. In the example shown, channel bar 1810 includes a central portion or element which corresponds to the currently displayed video content (an episode of the Modern Family television episode). This central portion includes a title 1820 for the currently depicted television series (Modern Family), and title 1822 of the currently depicted episode (Election Day). Also included in the central portion is a small image 1802 that corresponds to the currently depicted video content. In various embodiments, this image 1802 may be a still image, video content, animation, or otherwise corresponding to the television series or the particular episode. Also shown in the central portion is a beginning time indicator 1840 (8:00 PM) for the currently depicted video content. The central portion also includes an identification 1830 of the channel to which the currently displayed channel bar corresponds.

The central portion 1810 of the channel bar is separated from a first portion 1812 by a first separator 1805, and a second portion 1814 by a second separator 1807. The first portion includes the designation "Previous" and includes an image 1801 of a television program which immediately preceded the currently displayed content on the channel identified by the indicator 1830 (the same channel as the currently displayed content). The second portion 1814 includes an image 1803 that corresponds to the television program that immediately follows the currently displayed content on the identified channel 1830. The second portion also includes a time indicator 1850 (8:30 PM) which indicates at what time the television program identified in the second portion 1814 begins. In general, these time indications may serve to indicate the duration of the corresponding video content. Other embodiments may include an explicit duration indication in the channel bar for each element/show depicted. The scrubber bar 1806 includes a current position indicator 1860 that is used to indicate the current position of the displayed content 1801 within the television program identified in the central portion 1890 of the channel bar. Also shown is a time indicator 1862 that corresponds to the current position indicator 1860. In the present example, the video content 1801 is that of a live television broadcast. As such, the scrubber bar to the left of the position indicator 1860 has a different appearance from that of the scrubber bar to the right of the position indicator 1860. The lighter colored portion to the left of the indicator 1860 indicates already broadcast content. As the content has already been broadcast, it is possible to rewind back into that content. The darker colored portion of the scrubber bar to the right of the position indicator 1860 indicates content which has not yet been broadcast. Consequently, it is generally not possible to fast forward to such (future) content. However, in various embodiments as will be discussed later, such "future" content may be immediately viewable.

In various embodiments, the display shown in FIG. 18 is presented as a uniform presentation to the viewer. In other words, the viewer is not provided any indication that any element of the presentation corresponds to other than a single subscription (e.g., a cable television subscription). However, in embodiments according to the primary and secondary subscriptions as discussed above, the primary subscription based provider of the content displayed in FIG. 18 has aggregated and stored video content corresponding to numerous secondary subscription based providers. Accordingly, while a viewer may perceive the content displayed in FIG. 18 as representing that corresponding to a cable television subscription (for example), in fact the primary subscription provider provides the content in a manner that is agnostic with regard to its associated source. In other words, the viewer may have a cable television subscription with a given cable television operator.

Figure 19:
FIG. 19 depicts one embodiment of a video display and channel bar.

A viewer's secondary subscription entitles the viewer to access particular content stored in the primary provider's server farm that represents the cable television subscription content. The content actually provided to the viewer may not have been obtained from the cable television operator—it is of no importance to the primary provider. The content in this case is fungible as to its source. Similarly, the content depicted as the previous television program 1812 and the content depicted as the next television program 1814 are likewise fungible as to source. If the viewer rewinds into the "Previous" content 1812, the content displayed may in fact be video content that was recorded and stored in the server farm a year ago (e.g., assuming the episode was a rerun and was originally broadcast at least a year ago). From the perspective of the viewer, they had simply rewound to buffered content that was broadcast within the last hour. Additionally, the content itself may have actually been acquired from a cable television or other operator other than the one to which the viewer has a subscription. In each case, the original source of the video content is unimportant to the primary provider. All content is provided directly by the primary provider, and sources of content are relevant to the extent that they are used to identify content available according to a given secondary subscription. Similarly, the next television program 1814 may be obtained by the primary provider from a source other than the subscribed cable television operator. In the embodiment of FIG. 18, the central portion of the channel bar 1890 is made the largest portion of the channel bar. This central portion corresponds to the video content currently displayed and provides additional space for inclusion of details and information concerning the currently displayed content. In addition, the portion of the scrubber 1806 that corresponds to this central portion is likewise enlarged. The portions (1812, 1814) at either end of the channel bar 1890 are smaller in comparison to the central portion. FIG. 19 illustrates an embodiment of the display 1900 shown in FIG. 18 when the channel bar 1890 has either been dismissed by the viewer, or has been removed due to a timeout condition (e.g., viewer inactivity for at least a given period of time). Here, the video content 1901 continues on the display 1900.

Figure 20:
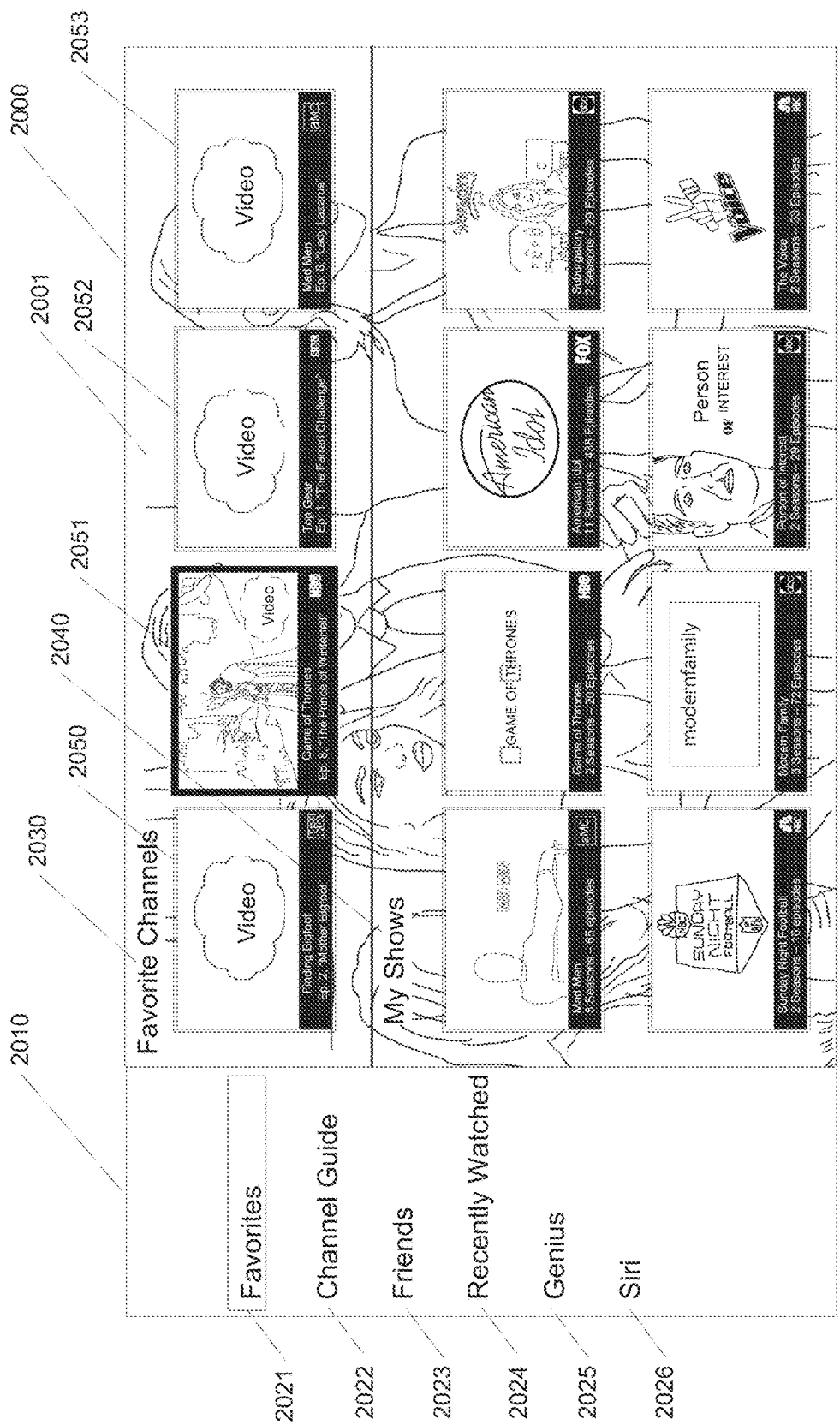
FIG. 20 depicts one embodiment of a video display and user interface.

Turning now to FIG. 20, one embodiment of a display 2000 is shown with the presentation of video content 2001. However, in this example, one embodiment of a "side bar" 2010 is presented with other content that will be described. It is noted that while the "side bar" is described as such for purposes of discussion, in various embodiments, the side bar may in fact be presented along the top, bottom, opposite side, center, or otherwise. For example, an embodiment in which the side bar is presented in the center may have related content displayed surrounding the bar. All such embodiments are contemplated. In various embodiments, the side bar 2010 and/or related elements are generated (e.g., by a set-top box) as overlays. However, as with all overlays discussed herein, presentation as integrated video elements is possible as well.

As shown in FIG. 20, the side bar 2010 includes multiple elements 2021-2026 that may be highlighted and/or selected by a viewer (e.g., using input via a remote control device). In this example, the displayed elements generally correspond to categories including Favorites 2021, Channel Guide 2022, Friends 2023, Recently Watched 2024. Also shown is a Genius category 2025 that may be selected to provide recommendations based on other content the viewer has watched, liked, purchased, rented, and so on. Further, a Siri category 2026 is included which may be selected for use in providing voice input to the system (e.g., directives, queries, etc.). Overlaying the remainder of the display are other side bar related elements. In this example, the Favorites element 2021 has been highlighted or selected by a viewer. In response to such a selection, video and/or other media content that the viewer has indicated are favorites of the viewer are displayed to the right. In this example, the favorite content includes Favorite Channels 2030 and favorite shows termed My Shows 2040.

In the Favorite Channels 2030 portion of the display, four channel elements 2050-2053 ("channels") are displayed—each showing video content for the corresponding channel. The display of the channels is that of a miniature display with an aspect ratio that corresponds to a typical television. As may be appreciated, the size and aspect ratio of the depicted channels may differ from that shown. Additionally, the number of "channels" shown may be more than four, or fewer than four. For example, a large number of such channels may be depicted by making each of the channel depictions smaller. It is also noted that not all such channel depictions need be the same size. In various embodiments, some may be larger than the others. All such alternative embodiments are contemplated. The video content being shown for each channel may be live broadcast video, for example, or otherwise.

In the embodiment shown, each channel depiction includes not only video content for the corresponding channel, but also a description at the lower part of the depiction which identifies the television series to which the video content corresponds, an episode number for the television show, a title for the particular television show, and an identification of the channel. For example, channel element 2051 provides the series title Game of Thrones, with episode 8 (Ep. 8) entitled "The Prince of Winterfell" currently being displayed. The channel identifier identifies the corresponding channel as HBO. It is noted that in this discussion, and elsewhere in the described embodiments, various embodiments may permit the viewer to configure the system such that video may or may not be displayed. For example, in some cases, it may not be desirable to have video displayed which would include "spoilers". In various embodiments, the system may be configured so that only animations, still pictures, or "innocuous" (non-spoiling) video is displayed. In some cases, it may be configurable based on category. For example, the viewer may not wish to see video displayed for sports events which may give away the winner/winning team. In other embodiments, the viewer may wish to see the video for multiple sporting events at a time so that all may be watched simultaneously. All such embodiments are contemplated.

In the My Shows 2040 portion of the display, eight television show elements are depicted. In this example, the television shows are depicted in a manner similar to that of the channels discussed above, and may vary in their depictions according to the above discussion as well. In the embodiment shown, each of the favorite shows depicts artwork for the corresponding show. However, as above, video or other content may be displayed. For each of the eight shows depicted, the lower portion of the depicted show includes descriptive information including a title of the show, how many seasons of the show (television series) are available for viewing, how many total episodes are available for viewing, and an identifier for the channel which carries the show. For example, the show in the upper left portion of My Shows 2040 depicts the Mad Men television show. Artwork representative of the television show is depicted. The title "Mad Men" is provided along with an indication that 5 seasons and 65 episodes are available for viewing. The identified channel in this case is AMC.

It is noted that while the example of FIG. 20 depicts four channels and eight shows, they could be divided differently. For example, a larger number of channels than shows could be depicted. In various embodiments, the viewer may scroll or page through each category (Channels and Shows) of elements to view different channels and/or shows. Additionally, the viewer may use a remote control to dynamically change how many elements are depicted at once. For example, a viewer may zoom in on a single show to enlarge its depiction. Alternatively, a viewer may effectively zoom out to increase the number of shows depicted to twelve, sixteen, or some other number of elements. In addition, in various embodiments, the underlying video content 2001 may be the content being displayed at the time the viewer caused the side bar 2010 to be displayed. In various embodiments, the viewer may cause the audio for one of the elements 2050-2053 (or one of the shows) to be presented by moving the focus to that corresponding element. For example, in FIG. 20 the bold outline indicates element 2051 has focus and the audio for Game of Thrones may then be presented. In some embodiments, moving focus to an element may cause the corresponding channel or show to be displayed as the underlying content 2001. All such embodiments are contemplated.

Figure 21:
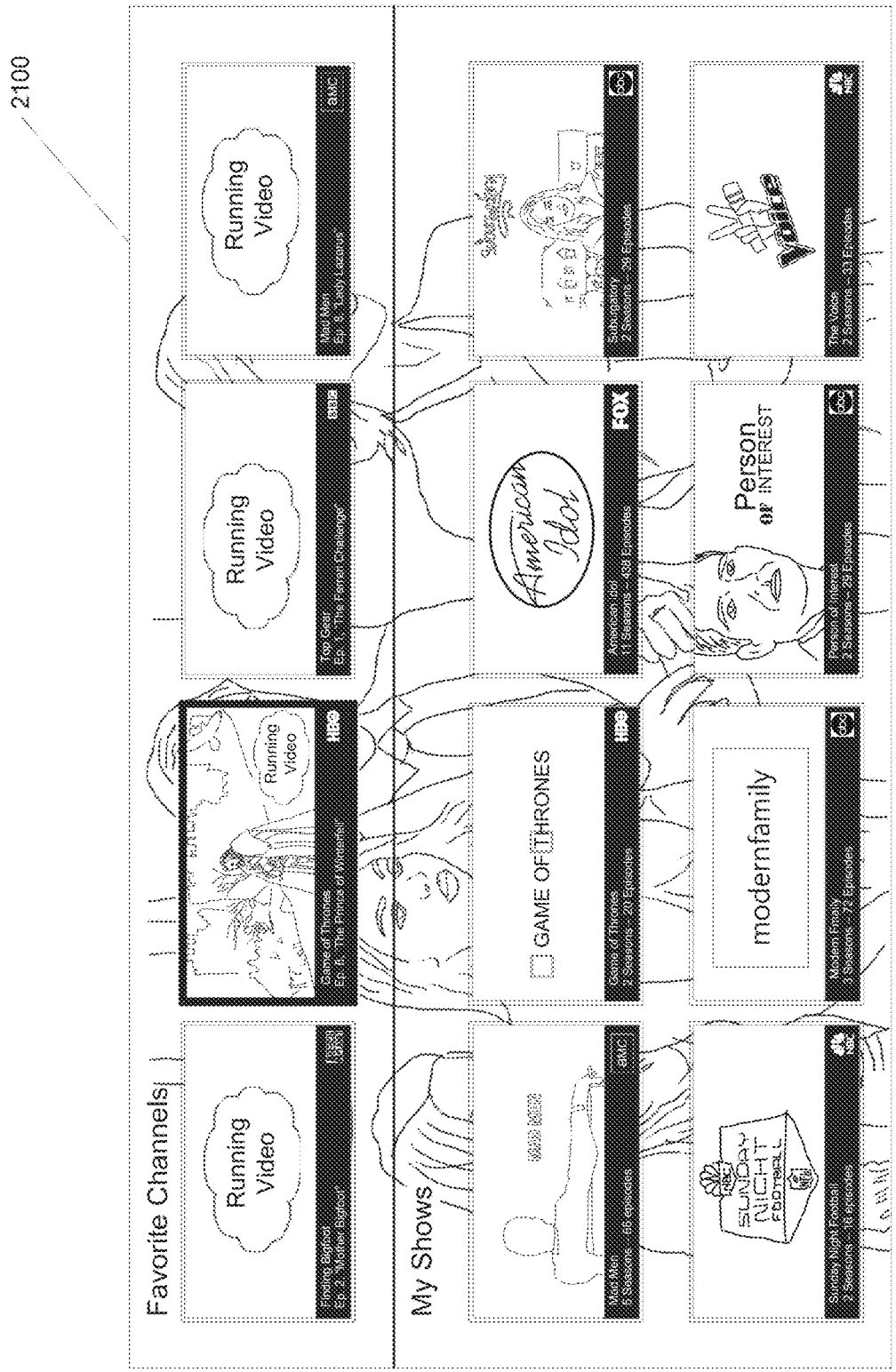
FIG. 21 depicts one embodiment of a video display and user interface.
Figure 22:
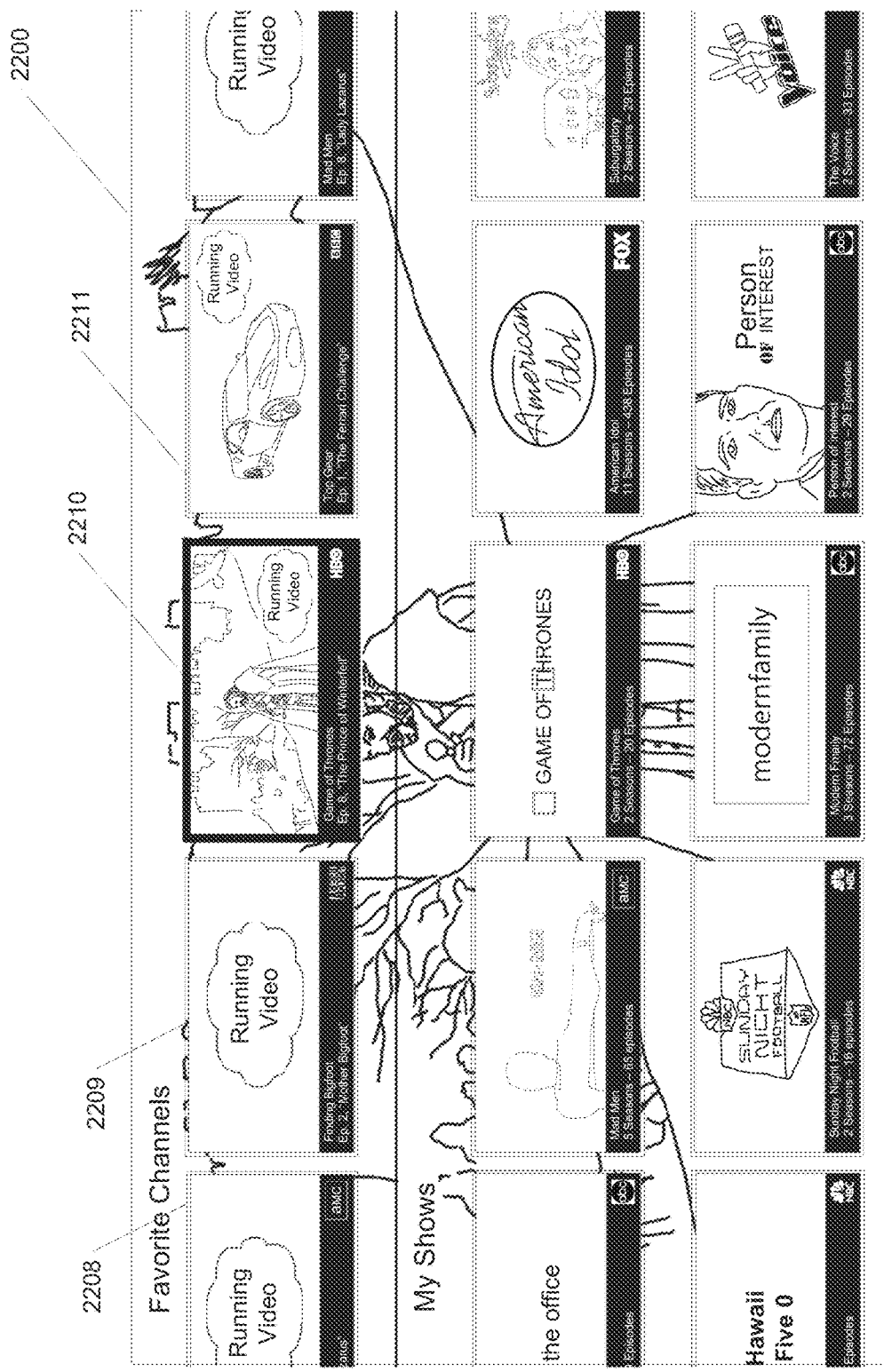
FIG. 22 depicts one embodiment of a video display and user interface.

FIG. 21 depicts a display 2100 the shows the side bar content of FIG. 20 without the side bar itself. In various embodiments, a viewer may use an input device to display or not display the side bar. Another input may be used to cause the side bar content to be removed entirely so that the underlying content is displayed in an unobstructed manner. FIG. 22 illustrates an alternative embodiment of the side bar content. In the display 2200 shown, the side bar content as before is depicted. However, in this embodiment, the content is clearly organized in a left to right/right to left scrolling manner. Additional content "extends" (in effect) off the edges of the screen. In this manner, it is intuitive to the viewer as to how the additional content may be viewed (e.g., by moving right or left).

Figure 23:
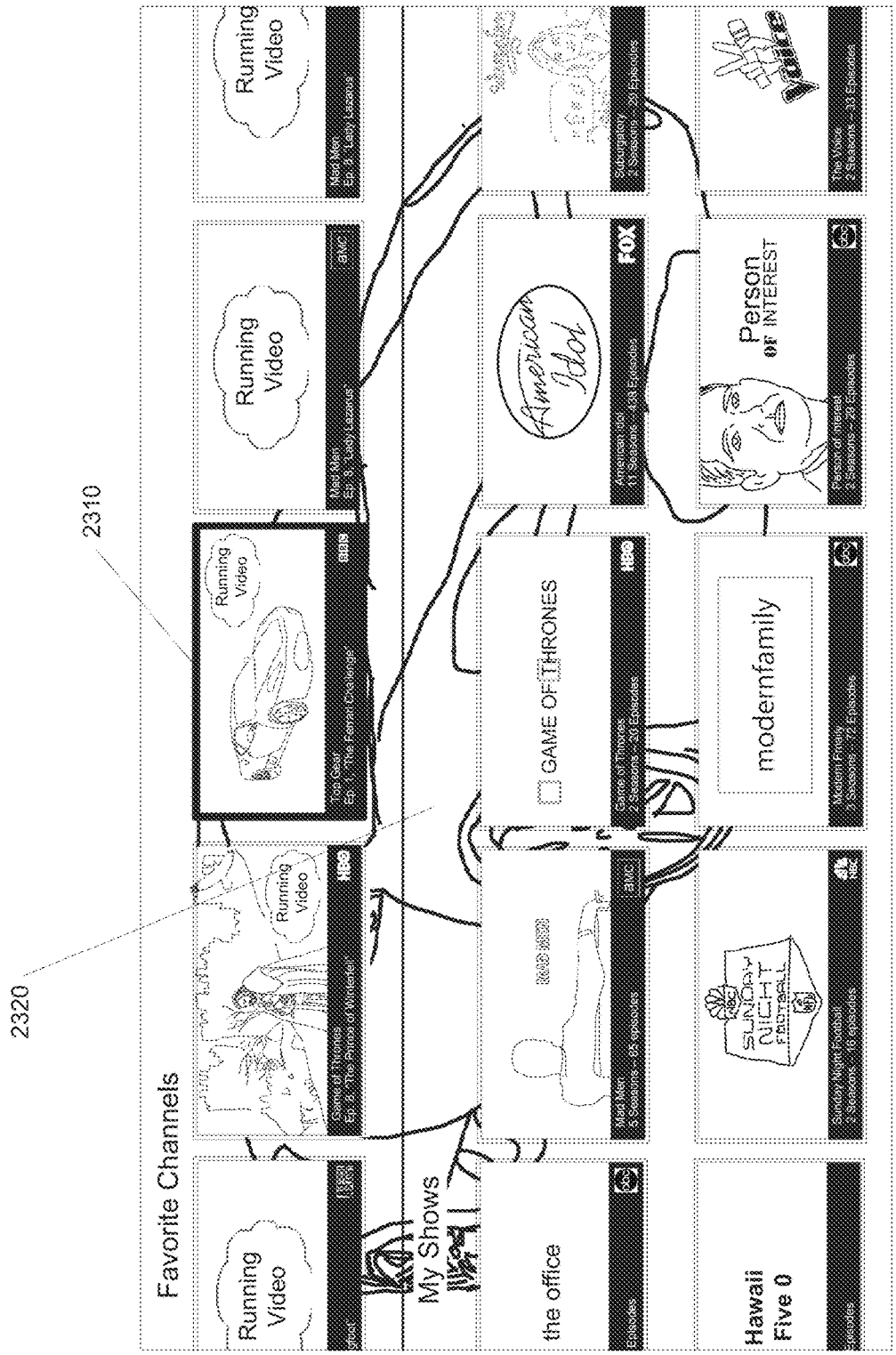
FIG. 23 depicts one embodiment of a video display and user interface.

In various embodiments, the focus may itself move and as the focus attempts to move beyond the edge of the display, new content is brought into view. For example, element 2210 is show to currently have focus as depicted by the bold border. This focus may be movable to element 2209. An effort to move to element 2208 (which is partially off of the display) may cause element 2208 to move to the right— potentially bring other content into view. Alternatively, the focus itself may be fixed in the center as shown. In such an embodiment, moving the focus actually moves the underlying content right or left. A move to the right may move element 2211 (Top Gear) into focus. FIG. 23 illustrates such an embodiment where Top Gear 2310 now has focus In various embodiments, the element with focus may have its audio presented (such a feature being enabled or disabled by the viewer). In the example shown, the item in focus also causes its content to be displayed as the underlying content 2320. However, as in the previous discussion, this may or may not be the case.

Figure 24:
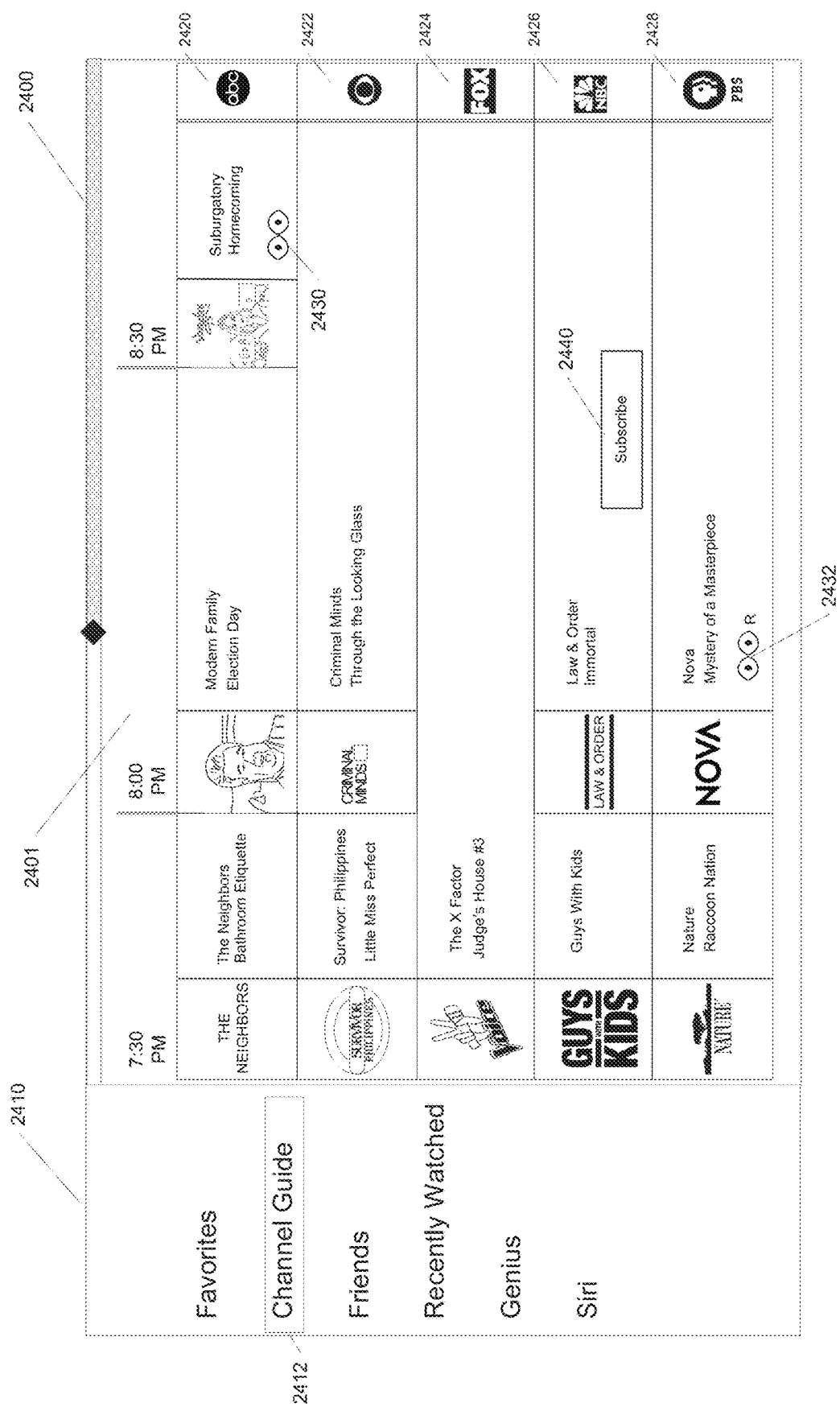
FIG. 24 depicts one embodiment of a video display and user interface.

Turning now to FIG. 24, the side bar 2410 is again depicted on a display 2400. In this example, the Channel Guide element 2412 has been highlighted/has focus/or has been selected. In the embodiment shown, selection of the Channel Guide causes display of information regarding available channels. In this example, the embodiment is an electronic program guide (EPG) type display. EPG 2400 includes a scrubber bar similar to that previously described in FIG. 18. Included is a time bar 2401 displaying time periods for the grid. A separate row is included for each of five different television channels—ABC 2420, CBS 2422, FOX 2424, NBC 2426, and PBS 2428. Each portion of the grid for a given time slot then displays an image and descriptive information such as series title, and episode title for a television program. For example, the 7:30 PM time slot for the CBS network includes an image for the Survivor Philippines series with series title and episode title Little Miss Perfect. In this example, the display corresponds to live television broadcast and the scrubber depicts an already broadcast portion (light colored) and an as yet broadcast portion (darker colored). However, a "watch now" indicator 2430 indicator appears for the show "Suburgatory" to be broadcast at 8:30 PM. As suggested, this indicator identifies content that is available for viewing immediately. Similarly, the "Nova" program includes a watch now indicator 2432 indicating it is immediately available for viewing. Having such watch now indicators in an EPG is rather strange given the television programs correspond to future broadcasts. However, given the systems, methods and mechanisms described herein, this is entirely possible.

As previously discussed, the systems described herein are generally agnostic as to a source of particular video content and as to a timing of its acquisition. Consequently, the constraints suggested by a typical EPG and television system and are no longer present. The television service provider which provides an EPG does so to inform the viewer as to the broadcast lineup and when particular content will be available for viewing. In this manner, the viewer can view or record the content for later viewing as desired. However, in the embodiment of FIG. 20, the EPG is provided by the primary provider to indicate to the viewer the programming schedule of various networks and not necessarily to indicate the availability of the video content. Consequently, while the Nova show "Mystery of a Masterpiece" is scheduled for broadcast on PBS from 8-9 PM, the primary provider does provide that content to the viewer by acquiring it from PBS during such a broadcast. Rather, the content is simply content that may or may not exist in the primary provider's data stores. If it does currently exist, then it may be available immediately. In this case, the episode in question is a repeat as indicated by the R designation next to the watch now indicator. Therefore, the episode is immediately available. That the episode appears in the EPG as being scheduled for broadcast beginning at 8:00 PM is happenstance.

While the NOVA episode is a repeat, the Suburgatory episode is not a repeat. The question may then arise as to how an episode which has not yet been broadcast can be immediately available for viewing. The answer lies in the record everything all the time design of the primary provider system. The Suburgatory episode is scheduled for broadcast beginning at 8:30 PM in a given time zone. However, in the present case, the episode has already aired in an earlier time zone. The content already resides in the primary provider's data stores and is immediately available for viewing. It is noted that in some cases agreements may be in place which prevent such "early viewing" of an episode. Such agreements may require that live broadcast episodes such as these be viewable during their "proper" time slots. Nevertheless, the systems described herein are fully capable of providing such early viewing and identifying such episodes in an EPG. Also shown in FIG. 20 is a selectable element 2440 that enables the viewer to subscribe to the Law & Order show (i.e., it is not currently subscribed). Selecting element 2440 may then present the viewer with options for subscribing to the series, purchasing a single episode, or otherwise. When selecting a particular series or episode (or any other content) for a subscription, as noted above there may be many sources available for the content. For example, numerous providers may be available for episodes of Law & Order. In such cases, the viewer may select from the available options to complete the subscription. In various embodiments, the various options may be prioritized or otherwise filtered for presentation to the viewer.

Turning now to FIG. 25, the side bar is again illustrated. In the display 2500 shown, the side bar 2510 is shown with the Friends element 2512 selected. In various embodiments, the systems and methods described herein enable viewers to identify other viewers as "friends". Such identification may use explicit input of friend identifier (IDs) to identify friends, sending and accepting of friend requests, the ability to establish one-way friendships (i.e., a first viewer identifying a second as a friend does not necessitate that the second identify the first as a friend), and so on. Associated with such friends may also be configurable levels of privacy. For example, close friends may have full access to a viewer's television viewing habits. Friends that are not so close may have more limited access to such information. In some embodiments, a viewer may be able to import friends from a social networking site. Various such embodiments are possible and are contemplated.

Figure 25:
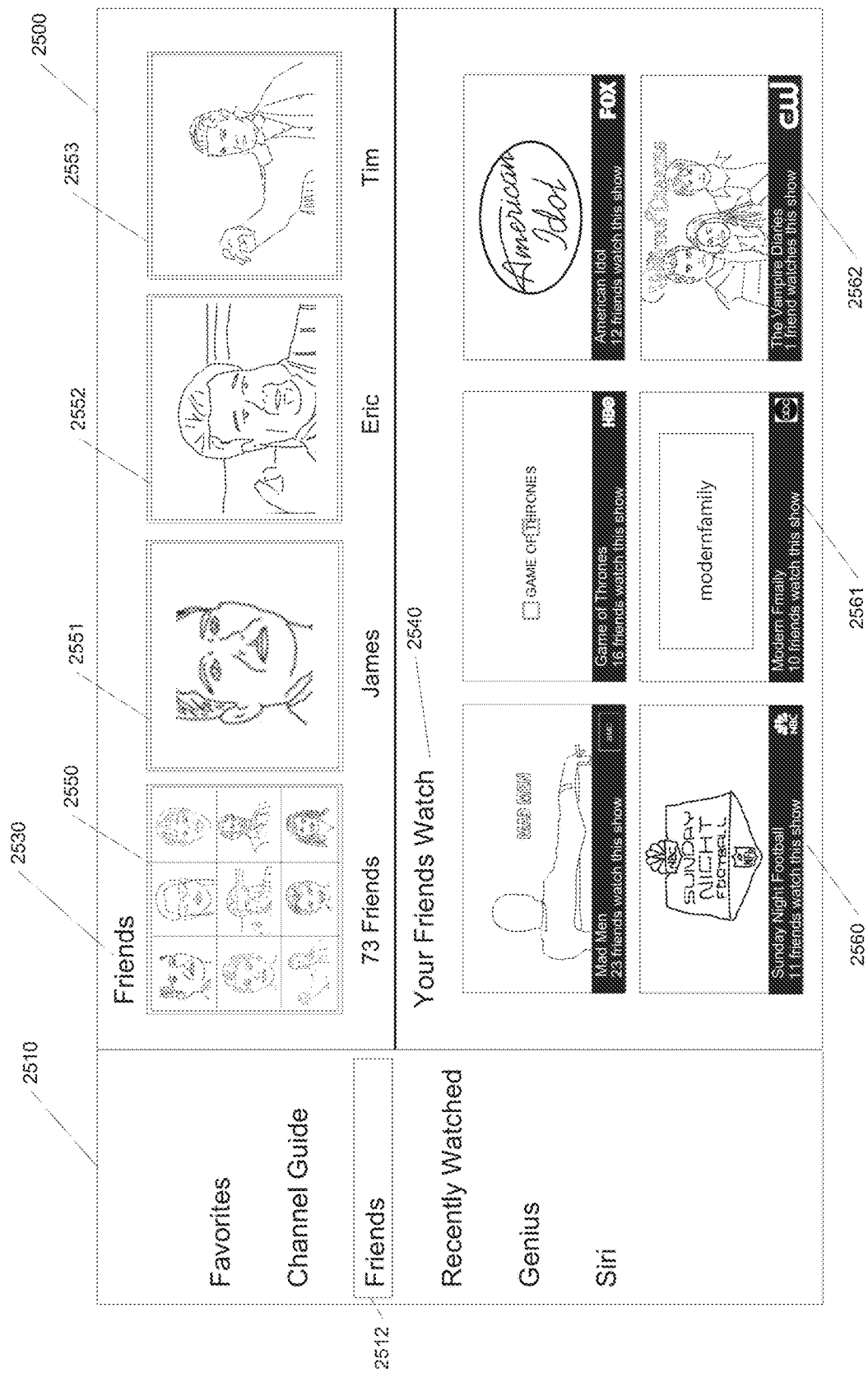
FIG. 25 depicts one embodiment of a video display and user interface.

In the embodiment shown, selection of the Friends element 2512 causes the display of a Friends 2530 category and a Your Friends Watch 2540 category. The friends category in this example includes a composite element 2550 representative of all of a viewer's friends (or some identified subset), along with selected individual friends 2551-2553 (e.g., these could be the closest friends, those most recently active in the system, those currently online, etc.). In various embodiments, friends may establish a profile within the television system that includes a picture, avatar, or other self-representation. While the Friends category 2530 depicts various friends of a viewer, the Your Friends Watch category 2540 depicts various television shows that are watched by the viewer's friends. In the example shown, artwork for each show is presented. However, other embodiments may display video (live or otherwise) for the given show. Also shown in the example of FIG. 25 is a brief description for each show in including its title an network. Additionally, each show provides an indication regarding the popularity of the show amongst friends. In the example shown, the number of friends that watch the particular show is indicated.

Figure 26:
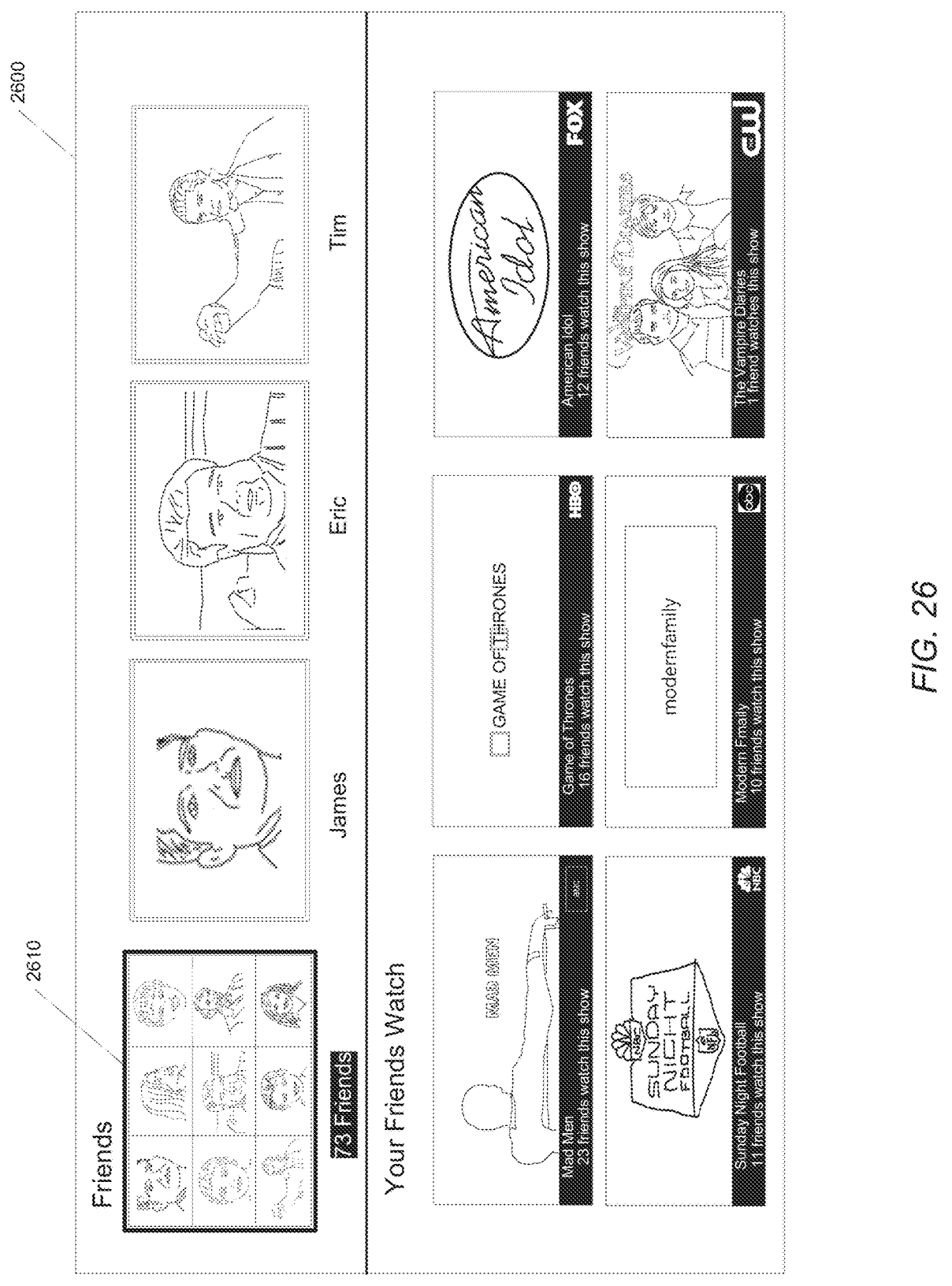

FIG. 26 illustrates the Friends content of FIG. 25 without the side bar itself which may be dismissed by a viewer. In the example shown, the display 2600 shows composite element 2610 has focus. Element 2610 includes a number of pictures corresponding to the friends represented by the composite element. Beneath the element 2610 is an indication as to how many friends ("73 Friends") are represented by the composite element 2610. In this embodiment, selection of the composite element causes the content displayed in the Your Friends Watch category to be representative of the shows watched by the collection of 73 friends represented by the composite. In some embodiments, selection of a Friends element (e.g., move focus to an element, and then provide further input to select the element) may cause further information on the friend(s) to be displayed. For example, such selection of an individual friends could lead to a landing page created by that friends. Additionally, it may be possible to chat with the friends (text, audio, and/or video), leave messages, etc. All such embodiments are possible.

Figure 27:
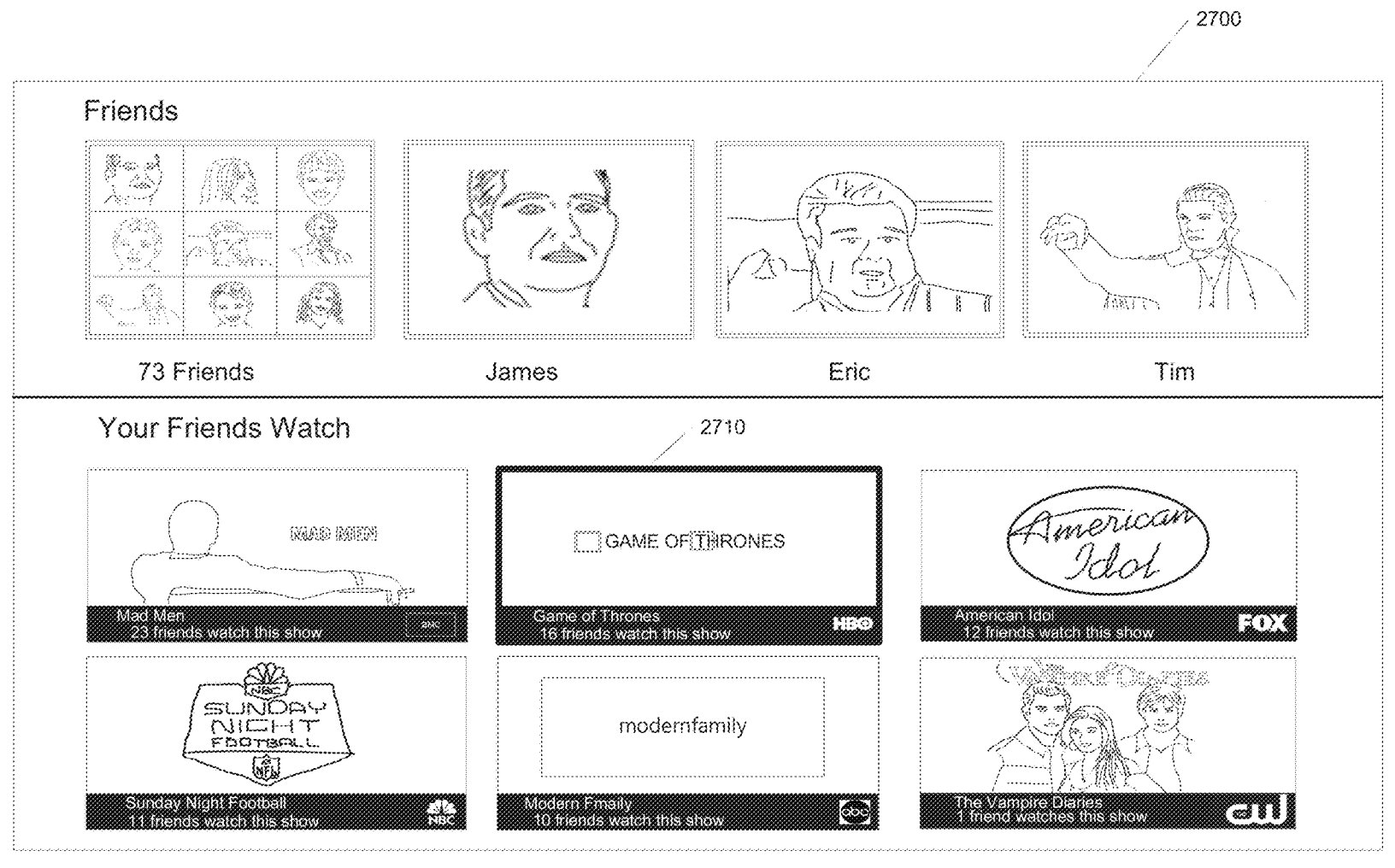
Figure 28:
FIG. 28 depicts one embodiment of a video display and user interface.

FIG. 27 illustrates that focus may be moved to each of the elements in the Your Friends Watch category. In FIG. 27, focus has been moved to element 2710 that displays the Game of Thrones television show—a show that is popular with the viewer's friends. Desiring more information regarding this show, the viewer provides additional input which in one embodiment presents a display such as that shown in FIG. 28. FIG. 28 illustrates a landing page for the Game of Thrones selection of FIG. 27. In this case, the landing page 2800 provides video content (video, still, or animation), a title of the series 2810, and a description of the series 2820. In this example, the viewer does not have a subscription to the access the content (e.g., a secondary subscription to HBO). Therefore, a banner is displayed 2830 that informs the viewer that the series is not currently available according to their current subscriptions and advises that they may sign up (subscribe) for $9.99 per month. In various embodiments, a user may select the banner and immediately subscribe to HBO. In various embodiments, the viewer makes the subscription through the primary provider which handles communications with the HBO subscription service. In some embodiments, billing for the HBO service may be included in the viewer's primary provider bill. In such embodiments, subscribing to HBO may be as simple as a couple of button presses to authorize the subscription. Following this simple subscription process, all of the HBO content held by the primary provider is immediately available to the viewer. In other embodiments, rather than subscribing through the primary provider, the viewer may be taken to an HBO subscription service site to complete the subscription process. Billing may be direct to the viewer or included with the primary provider billing as mentioned above.

Figure 29:
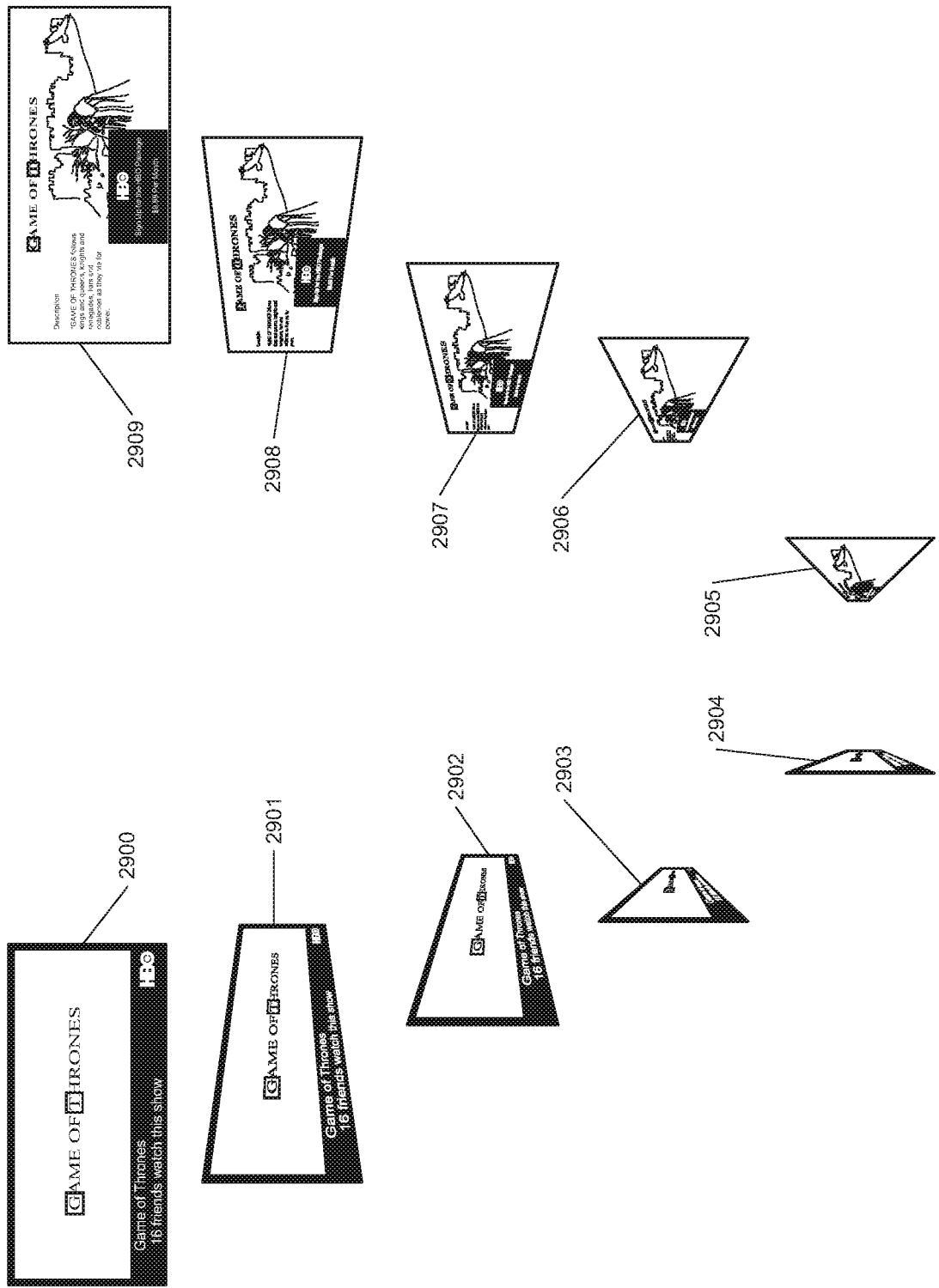
FIG. 29 depicts one embodiment of a video display and user interface.
Figure 30:
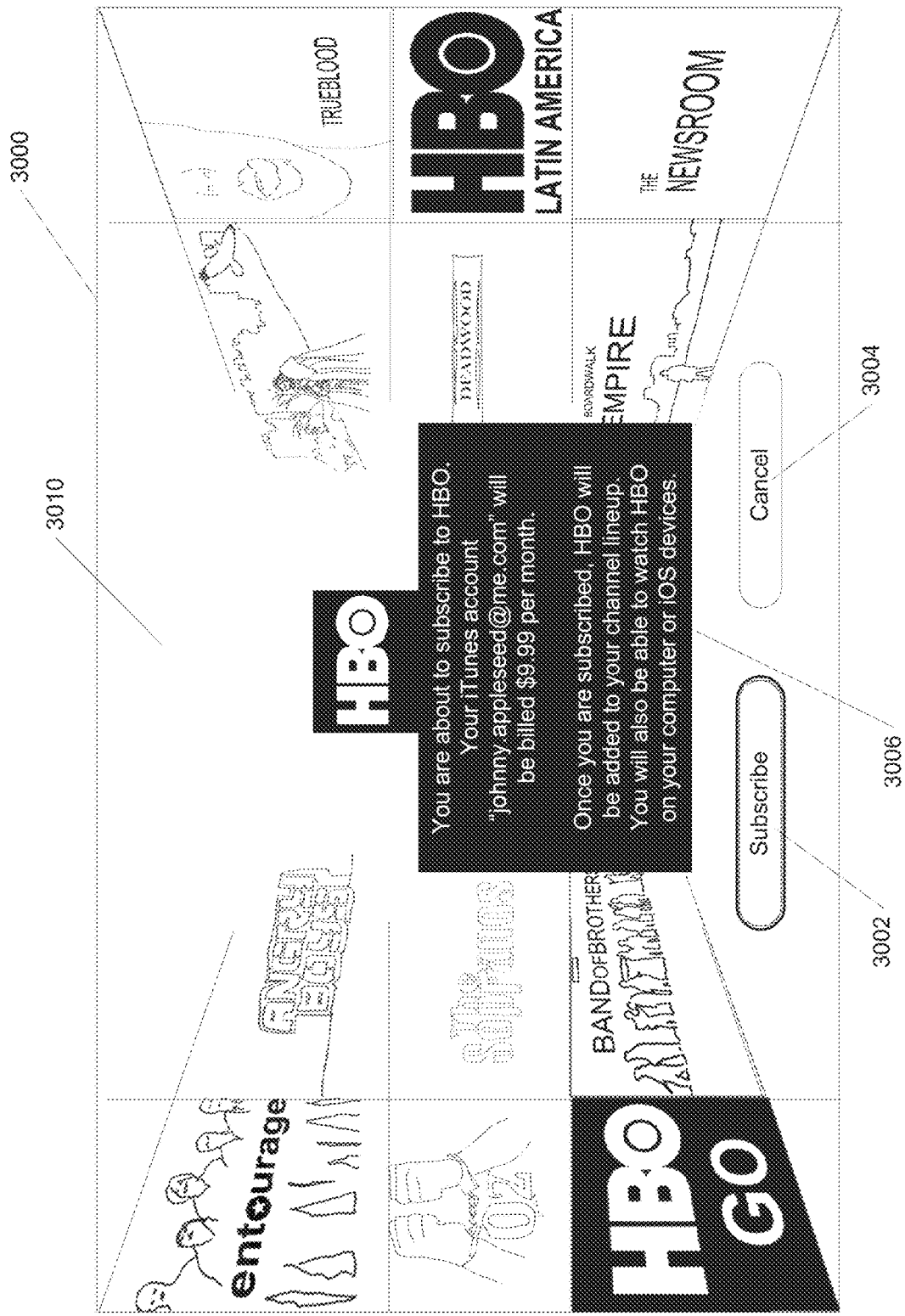
FIG. 30 depicts one embodiment of a video display and user interface.

In various embodiments, selection of an element such as the element 2710 of FIG. 27 may cause an animation when transitioning from one display to another. For example, in one embodiment as shown in FIG. 29, the element 2900 when selected causes a rotation animation 2901-2908 which gradually replaces the first display with the display 2909. Numerous such embodiments are possible and are contemplated. Assuming the viewer chooses to subscribe to HBO, FIG. 30 illustrates one embodiment of a display 3000 that may be presented. The display 3000 depicts a gallery of content that available from content provider. Additionally, information 3006 is provided that describes a subscription is about to be purchased and how billing may be effected. In this case, the viewer makes the subscription through their iTunes account. Subscribe 3002 and Cancel 3004 buttons are depicted as well. In such an embodiment, transactions between the provider HBO and Apple (the iTunes account provider) regarding the subscriber's new subscription may be handled without need for additional involvement on the part of the subscriber. Such an embodiment may be easier and less frustrating for the viewer than may otherwise be the case. In other embodiments, the viewer could be connected to the new provider, or the viewer may need to call another provider to complete the subscription process.

Figure 31:
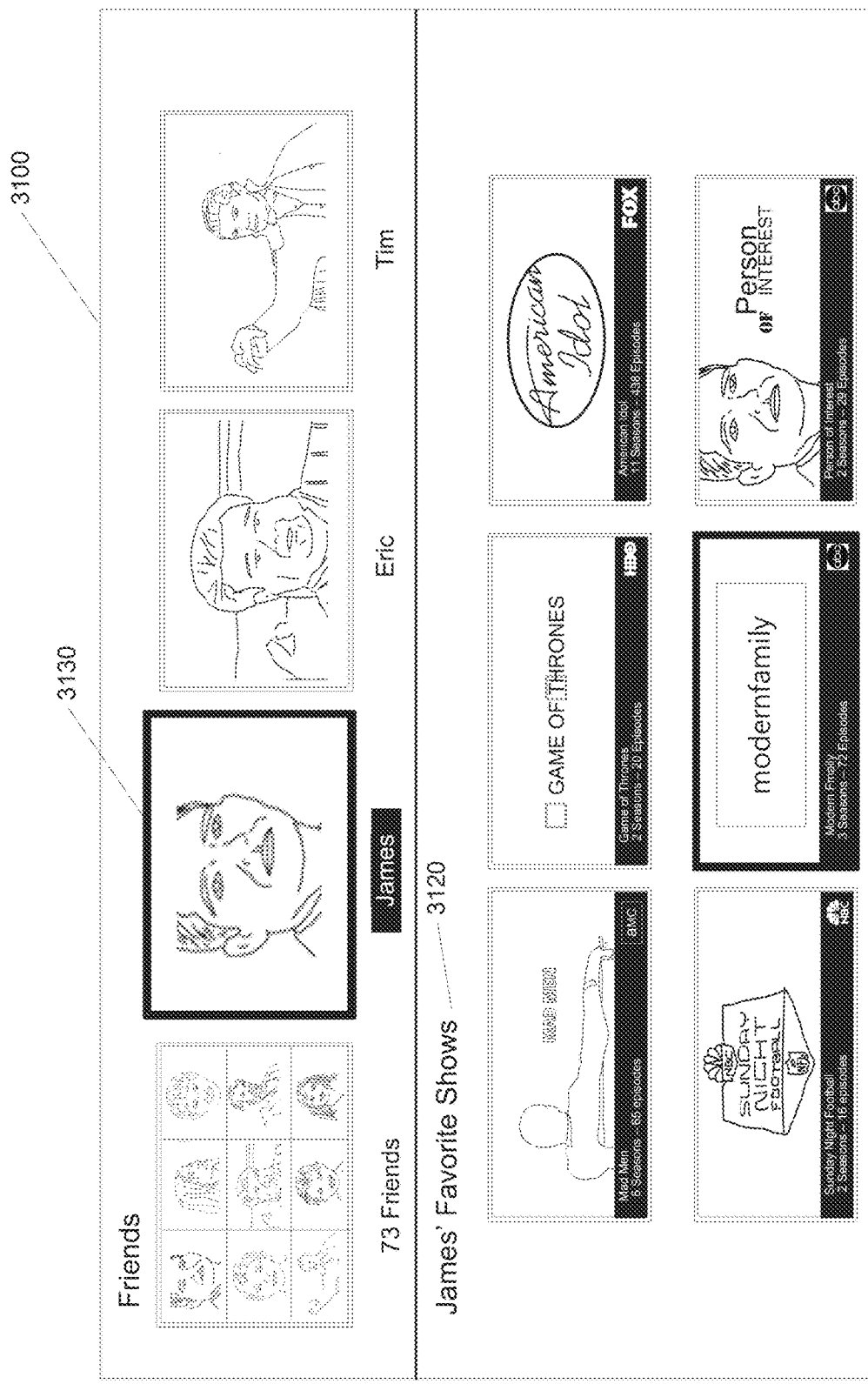
FIG. 31 depicts one embodiment of a method for scoping an interface channel bar.

Returning again to the Friends content depiction 3100, FIG. 31 illustrates an embodiment in which an individual friend 3130 has focus. In this case, the friend "James" has focus and "James Favorite Shows" 3120 are depicted. In this embodiment, each of the shows that James likes is shown with video/artwork etc., and a brief description such as the title of the show and corresponding network. In contrast to the composite friends view, there is not an indication as to how many friends like the show (though there could be). Rather, in this case the information indicates how many seasons and episodes of each show are available. As in the previous discussion, each of these elements is selectable and will be discussed shortly. For example, selection of the Mad Men or Modern Family elements may lead to landing pages for the respective shows. Examples of such will be discussed shortly.

Figure 32:
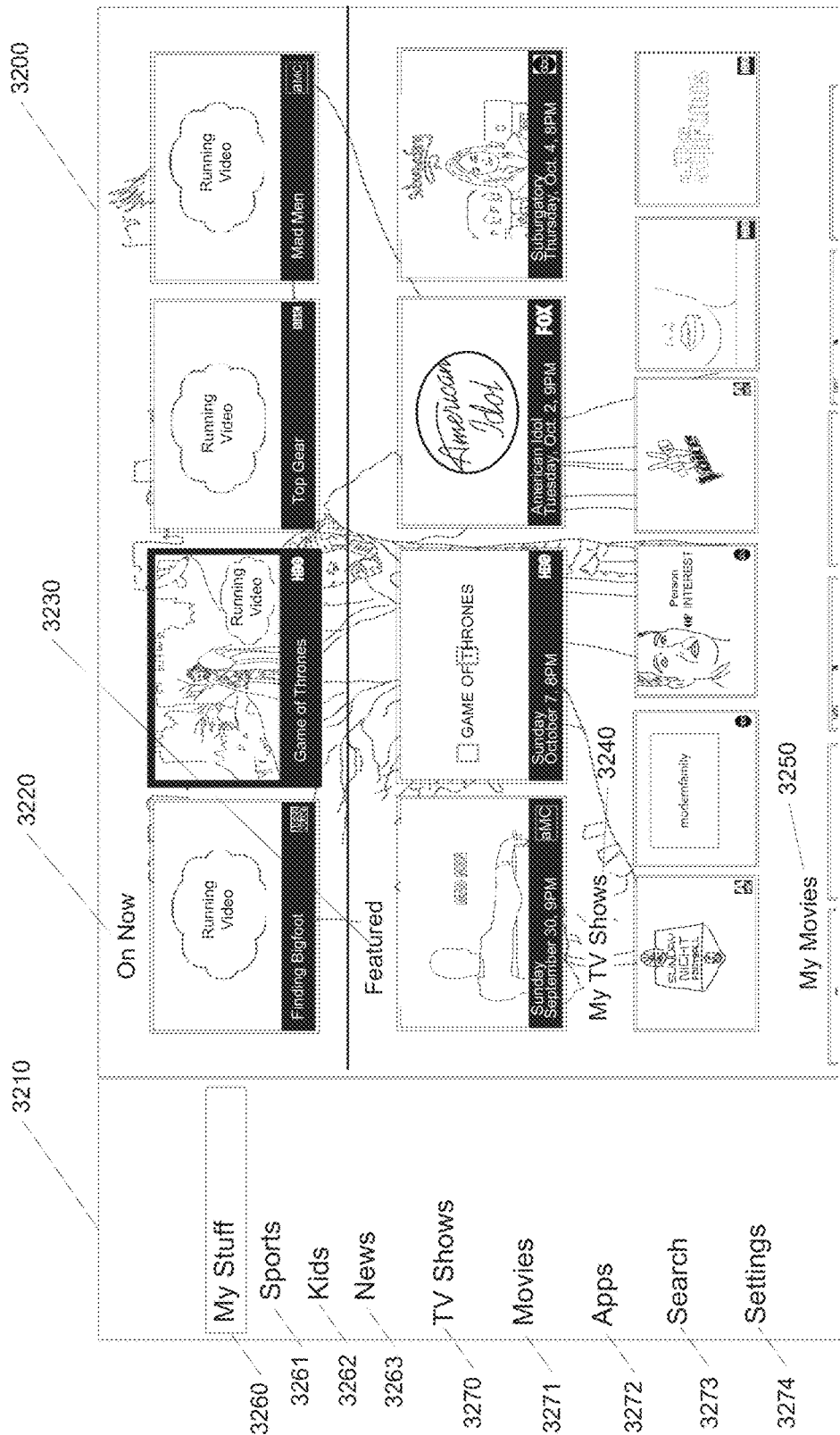
FIG. 32 depicts one embodiment of a video display and user interface.

Turning now to FIG. 32, an alternative embodiment of a side bar is shown. In the example presented, the display 3200 includes a side bar 3210 as before. In this embodiment, the content of the side bar and corresponding presentation is somewhat different. The side bar 3210 is shown to include six categories and a representative sample of three subcategories. The main categories depicted are My Stuff 3260, TV Shows 3270, Movies 3271, Apps 3272, Search 3273, and Settings 3274. Subcategories of the My Stuff category 3260 shown are Sports 3261, Kids 3262, and News 3263. As in the previous examples, side bar related content is shown overlaying the presented video content. In this case, My Stuff 3260 has focus and the side bar related content includes the categories On Now 3220, Featured 3230, My TV Shows 3240, and My Movies 3250.

Generally speaking, in various embodiments, the My Stuff category includes content that a viewer has identified as being reserved or otherwise set apart (collected) for easy access. This category may also include content rented or purchased by the viewer. In FIG. 32, shows that are currently being broadcast that are included in the viewer's My Stuff category 3260 are displayed in the On Now 3220 portion of the display (the upper portion in this embodiment). Four such shows are displayed, though in other embodiments the number may differ. Also shown is a Featured category 3230. In various embodiments, this category may be used to promote selected shows to the viewer. Such shows may be predicted to be of interest to the viewer based on the viewer's profile or history. Alternatively, the shows could be selected based on what other people have indicated as being of interest. Still further, the selections could be made based on promotional space or time purchased by advertisers. These and other embodiments are contemplated. In this example, each promotional item includes an indication as to when and on what network the show can be viewed.

Also shown is a My TV Shows category 3240. In various embodiments, these shows have been identified by the viewer as being flagged or otherwise identified for inclusion as part of the viewer's My Stuff. For example, these could represent favorite shows of the viewer. In various embodiments, artwork, video (live or otherwise), is shown for each show element. In some embodiments, particular video highlight clips may run. Finally, a My Movies category 3250 is shown. In the example shown, the corresponding elements extend beyond the bottom of the display. Accordingly, the viewer will scroll or page down to view the content. In this case, the content represents movies the viewer has identified for inclusion.

As noted in the side bar 3210, various subcategories are available under the My Stuff category 3260. In some embodiments, providing focus to one of these subcategories will cause the corresponding content displayed to the right to be filtered accordingly. For example, selection of the Sport subcategory 3261 will cause the On Now category 3220 to display sports that are currently being broadcast. Likewise, the Featured 3230, My TV Shows 3240, and My Movies 3250 categories will likewise be filtered to show sports related feature content, TV shows, and movies. In a similar manner, the subcategories Kids 3262 and News 3263 may be selected to cause the related content to be filtered for kids and news subject matter, respectively. These and other subcategories are possible and are contemplated. In various embodiments, these categories may be created by the viewer based on predefined selections. For example, numerous provider created subcategories may be chosen from for inclusion in the side bar by the viewer. In other embodiments, viewers may create, name, and define their own subcategories. Such viewer created subcategories may be made available to other viewers for inclusion in their own side bar user interfaces. All such embodiments are contemplated.

Figure 33:
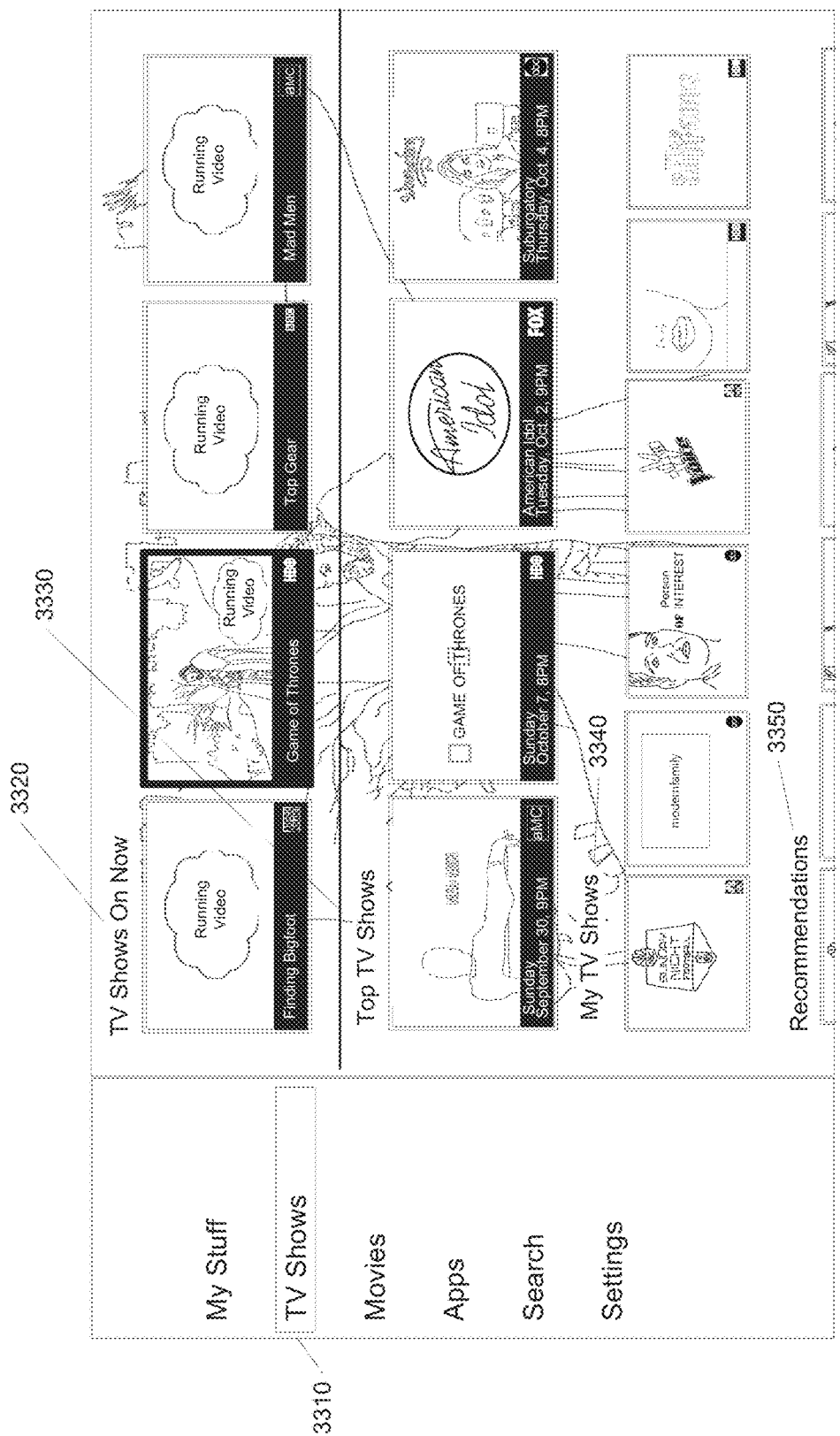
FIG. 33 depicts one embodiment of a video display and user interface.

FIG. 33 illustrates the side bar of FIG. 32 when the TV Shows category is highlighted or selected. In response to this selection, the related content which is displayed is changed to reflect this newly selected category. In this case, the related content which is displayed is related to television shows. In the exemplary embodiment of FIG. 33, there is included a TV Shows On Now category 3320, a Top TV Shows category 3330, a My TV Shows category 3340, and a Recommendations category 3350. In this case, the TV Shows On Now category 3320 may include a random selection of shows currently being broadcast or a particular selection of shows being broadcast. Each of the displayed elements in this category may display video of the live broadcast. The Top TV Shows 3330 may, for example, represent shows which are highly rated in general. The My TV Shows category 3340 may include depiction of television shows which the viewer has previously included as part of My Stuff. Finally, Recommendations 3350 may include television shows which are recommended to the viewer on the basis of the viewer's profile, history, friend's likes, critics reviews, current likes of the broader viewing audience, or otherwise. In other embodiments, recommendations could be based simply on the number of people watching them.

In various embodiments, the Recommendations category (described here and elsewhere) may be context sensitive based on the particular viewer identified as currently watching. For example, in various embodiments the system may account for multiple viewers in a single household. Identification of a particular viewer could be based on input received from the viewer, biometric data (e.g., thumbprint on a remote control device, voice recognition, face recognition, and so on. Additionally, the context may include the time of day. For example, more mature content may not be recommended earlier in the day when kids are more likely to be present. Various such embodiments are possible and are contemplated.

Figure 34:
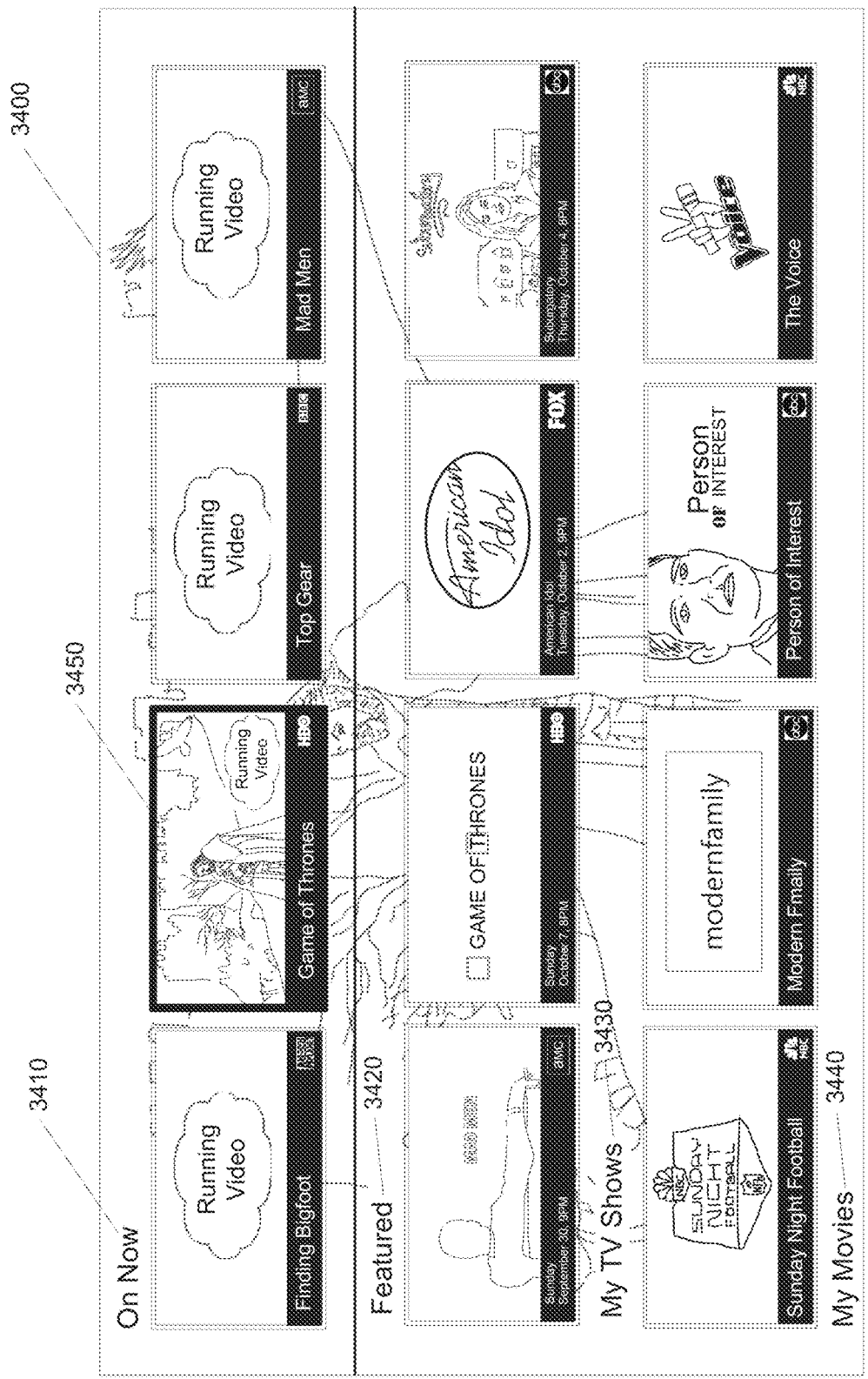
FIG. 34 depicts one embodiment of a video display and user interface.
Figure 35:
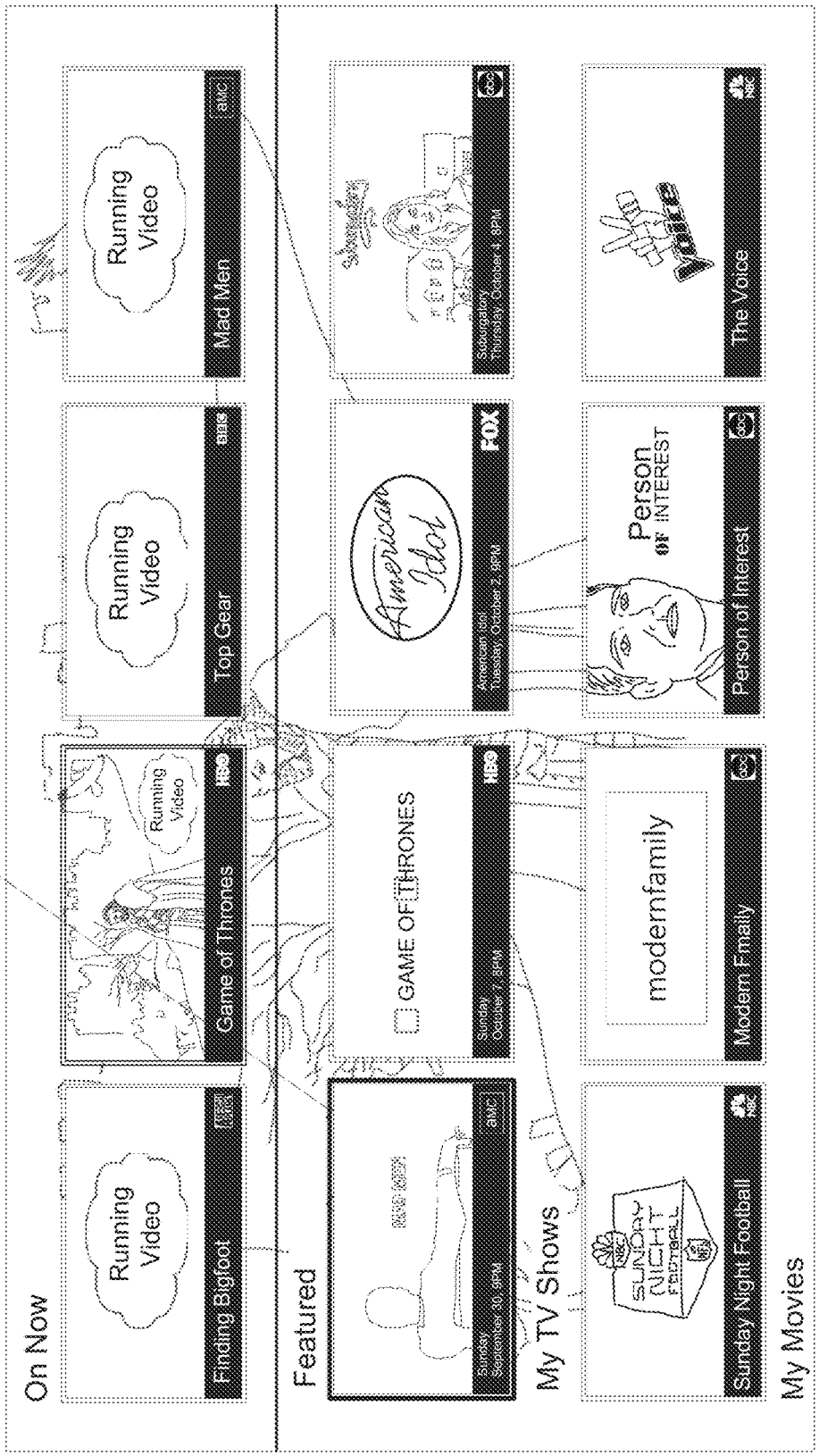
FIG. 35 depicts one embodiment of a video display and user interface.

FIG. 34 illustrates the content of FIG. 33 on a display 3400 without the side bar itself. In this example, element 3450 (Game of Thrones) currently has focus. FIG. 35 illustrates an embodiment where the viewer has now moved the focus to element 3500. As previously noted, each of the elements is further selectable by a viewer. Assuming the viewer now selects element 3500, further information regarding the selected content is displayed.

Figure 36:
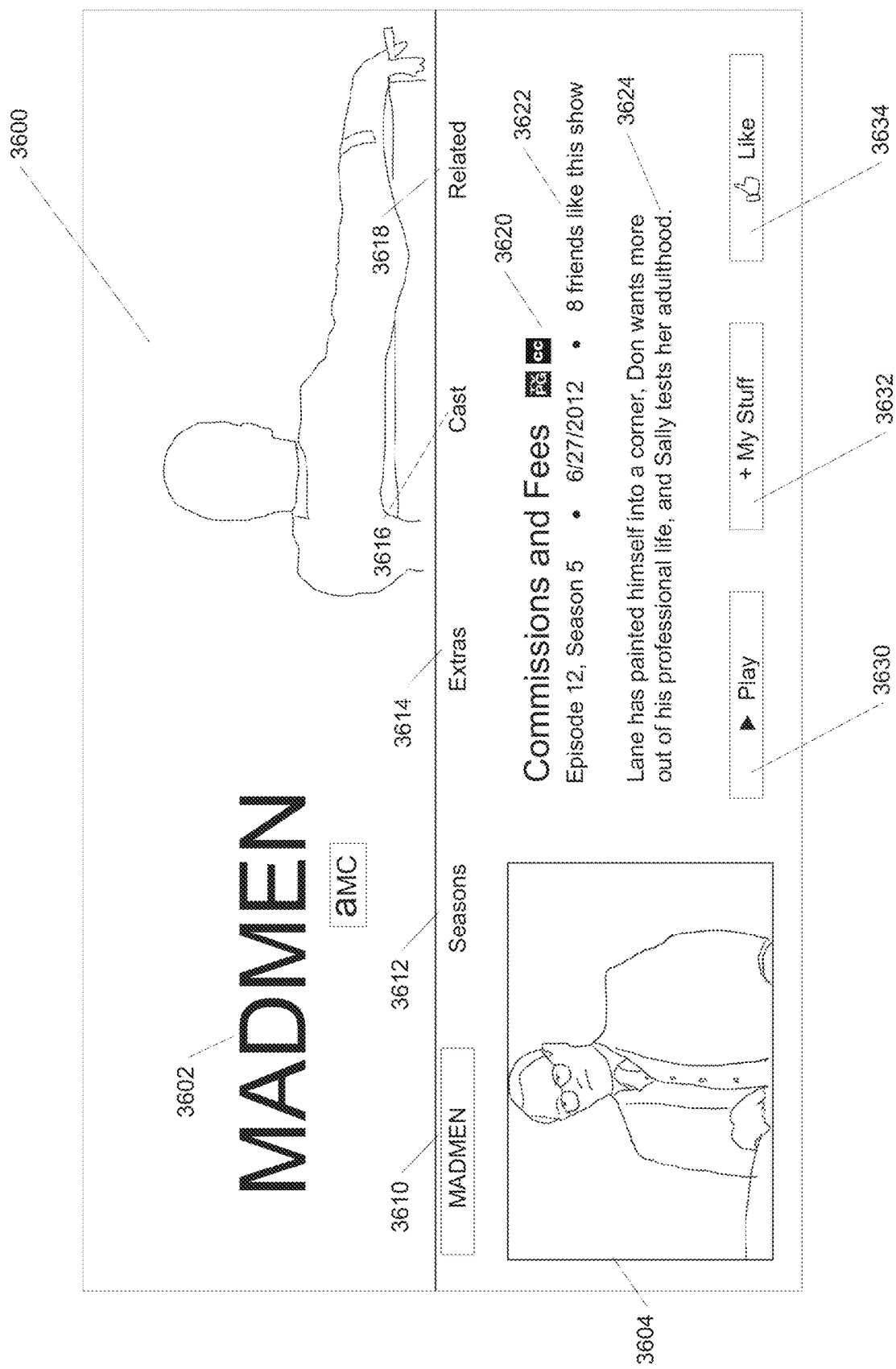
FIG. 36 depicts one embodiment of a channel bar animation.

In various embodiments, selection of the element 3500 causes the display of a landing page for the Mad Men television show as shown in FIG. 36. This landing page, as well as others described herein, generally provides a centralized location from which further information and media related to the show may be obtained. Such landing pages may provide access to content derived from a subscription provider, the Internet, proprietary sources, social media, or otherwise. In the example shown, the landing page generally includes an upper portion with artwork 3600, video, or other content. Additionally, a title 3602 for the landing page show is provided, and perhaps an indication of the corresponding network.

Approximately along the middle of the landing page are a number of categories selectable by a viewer to access additional information. In the example shown is a Madmen 3610 category that in this case may be selected/highlighted to display additional information regarding a current episode of the television show. Other categories to be discussed further below include Seasons 3612, Extras 3614, Cast 3616, and Related 3618. As shown, the MadMen category is currently highlighted and causes the display of information regarding an episode entitled "Commissions and Fees" 3620. Further information 3622 indicates this is episode 12 of season 5 of the series, and has an air date of Jun. 27, 2012. Also noted is 8 friends have indicated that they like this show. A brief description 3624 is provided along with video/picture/artwork 3604 for the series or episode as well. Also provided are graphic elements 3630, 3632 and 3634 which may be selected by the viewer. Selection of the Play element 3630 may cause the depicted episode to be presented. Selection of the My Stuff element 3632 may be selected to add the series and/or episode to the viewer's My Stuff category (as previously discussed). Finally, the Like element 3634 may be selected to indicate to viewer's likes the series and/or episode.

Figure 37:
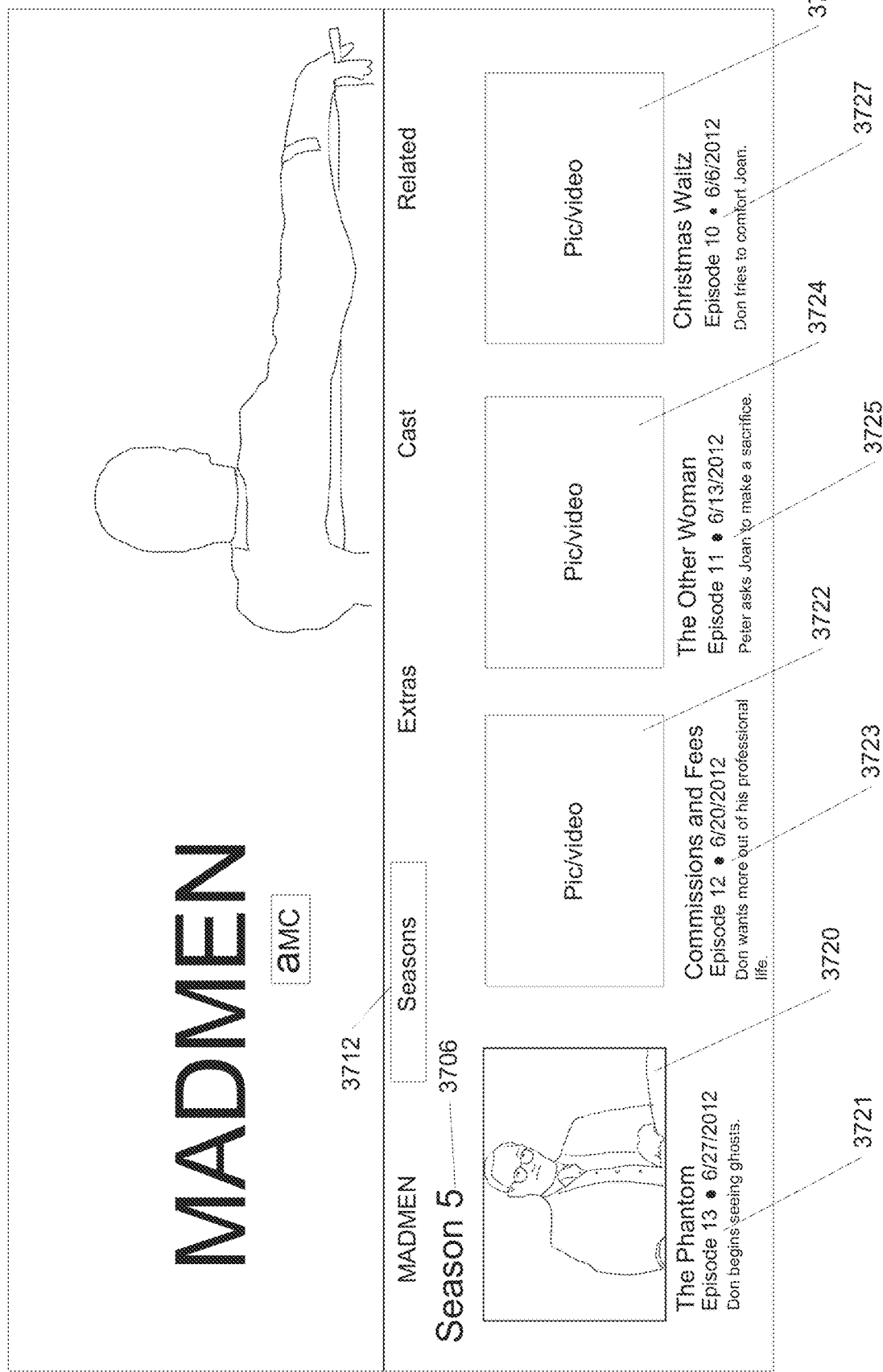
FIG. 37 depicts one embodiment of a channel bar animation.

FIG. 37 illustrates the same landing page where the viewer has now selected the category Seasons 3712. In the embodiment shown, selection of this category causes the display of information regarding seasons and episodes of the television series. In this example, episodes for Season 5 3706 are displayed. Using a remote control or other input, a viewer may scroll (or page) through these and other episodes and seasons not currently displayed. In this embodiment, four episodes are shown, each of the episodes includes a video/picture/artwork element (3720, 3722, 3724, 3726), and a corresponding description of the episode (3721, 3723, 3735, 3727). Each of the descriptions in this case includes a title for the episode, identification of the number of the episode, original air date for the episode, and a brief description of the storyline for the episode. Of course, other content may be presented as an alternative, or in addition, to the content depicted. In various embodiments, a viewer may select a depicted episode to either begin immediate presentation of the episode, or provide other information regarding the episode.

Turning now to FIG. 38, the same landing page is depicted. However, in this example the Extras category 3812 is selected which causes the display of additional information related to the show. In various embodiments, such extras may represent content about the making of the television show, interesting trivia, gossip, or otherwise. In the example shown, selected videos 3820-3823 are presented that include cast and supporting staff discussing their roles or other aspects of the making of the show. A brief description 3830-3833 is included for each of the elements as well. As in other cases, a viewer may scroll/page through other Extras elements not currently displayed.

Figure 39:
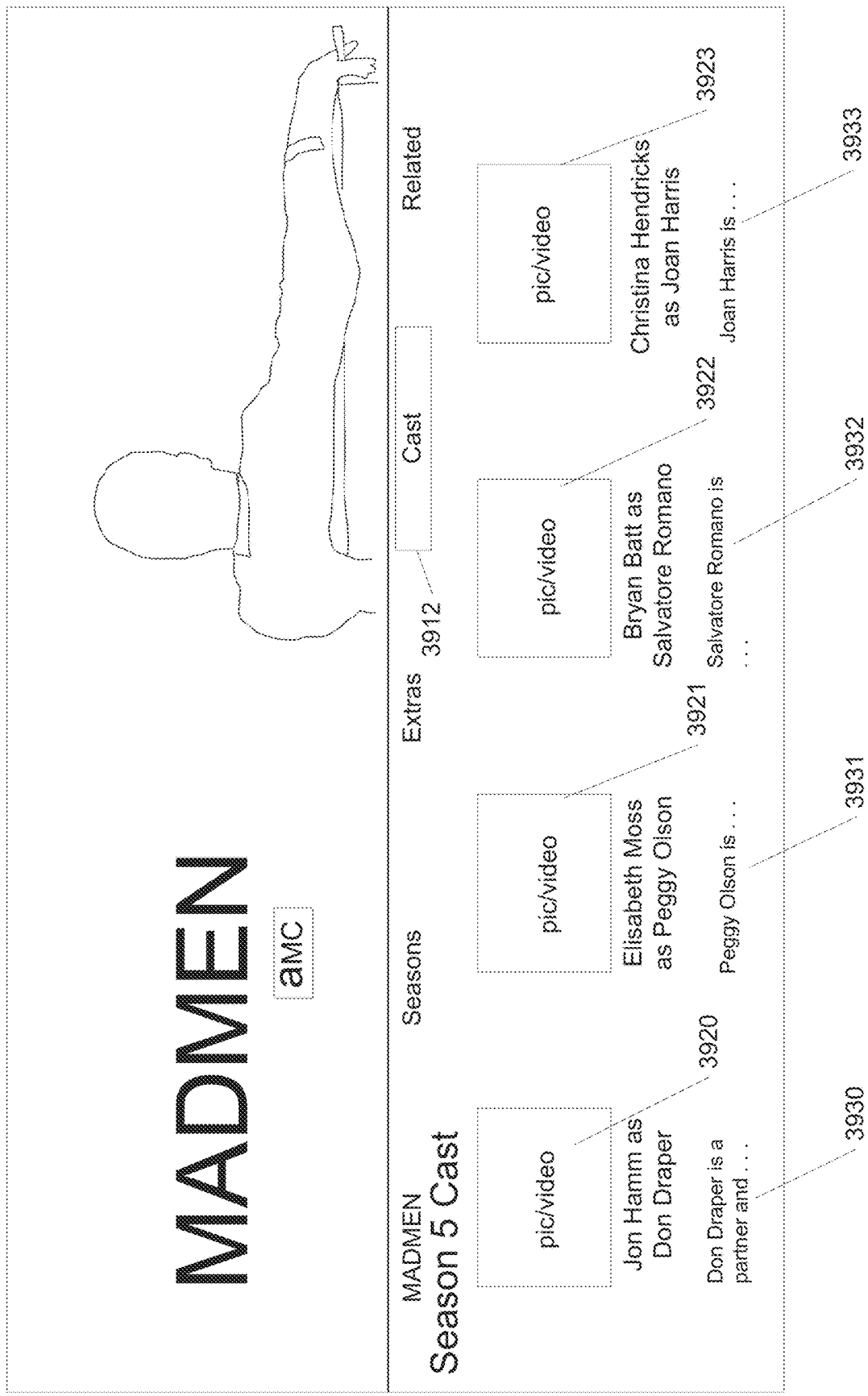
FIG. 39 depicts one embodiment of a video display and user interface.

FIG. 39 continues the depiction of the landing page with the Cast category 3912 selected. Such a selection in this case causes the display of additional information regarding cast members of the television series. Video/pictures 3920-3923 are provided for cast members, along with a description of the actor and character 3930-3933. Selection of a particular cast member element may cause a full screen display of video related to the actor. Alternatively, a landing page dedicated to the actor may be displayed which serves as a launching point for more details regarding the actor. In some embodiments, the actors themselves may provide content for such landing pages. For example, actors may be able to provide daily commentary on any of a variety of topics as desired. Viewers may be able to identify a particular actor as a friend to gain access to the actor's viewing likes/dislikes, and so on. Numerous such embodiments are possible and are contemplated.

Figure 40:
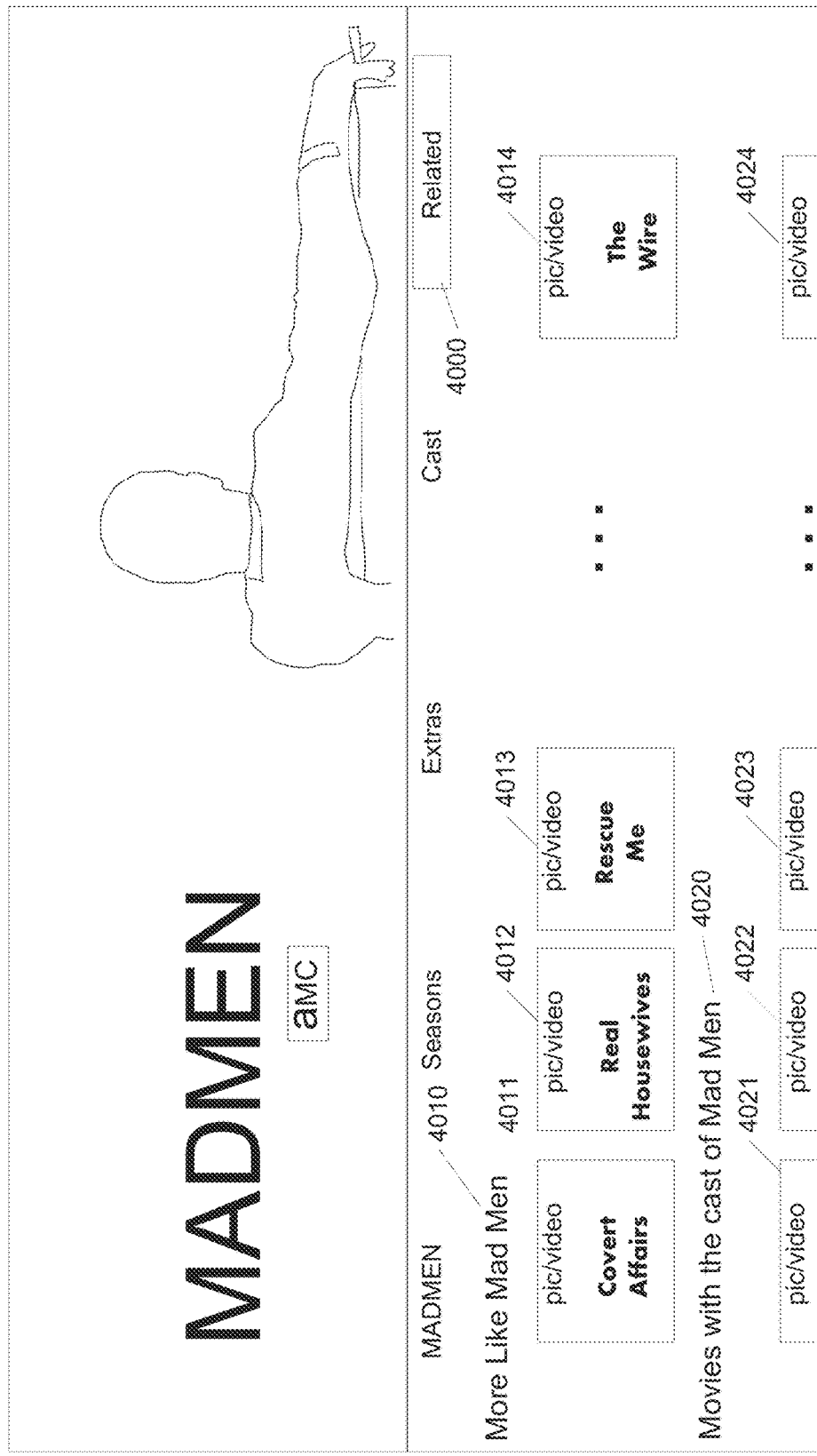
FIG. 40 depicts one embodiment of a video display and user interface.

Finally, FIG. 40 depicts the landing page with the Related category 4000 selected. Selection of Related 4000 in this example causes display of a More Like Mad Men category 4010 and a Movies with the cast of Mad Men category 4020. The first category 4010 may include the depiction of other television shows 4011-4014 which are deemed to be similar to the Mad Men show in some way. The second category 402 includes the depiction of movies 4021-4024 which include at least one of the Mad Men cast members. Other related content may be displayed as well by scrolling or paging as desired.

Figure 41:
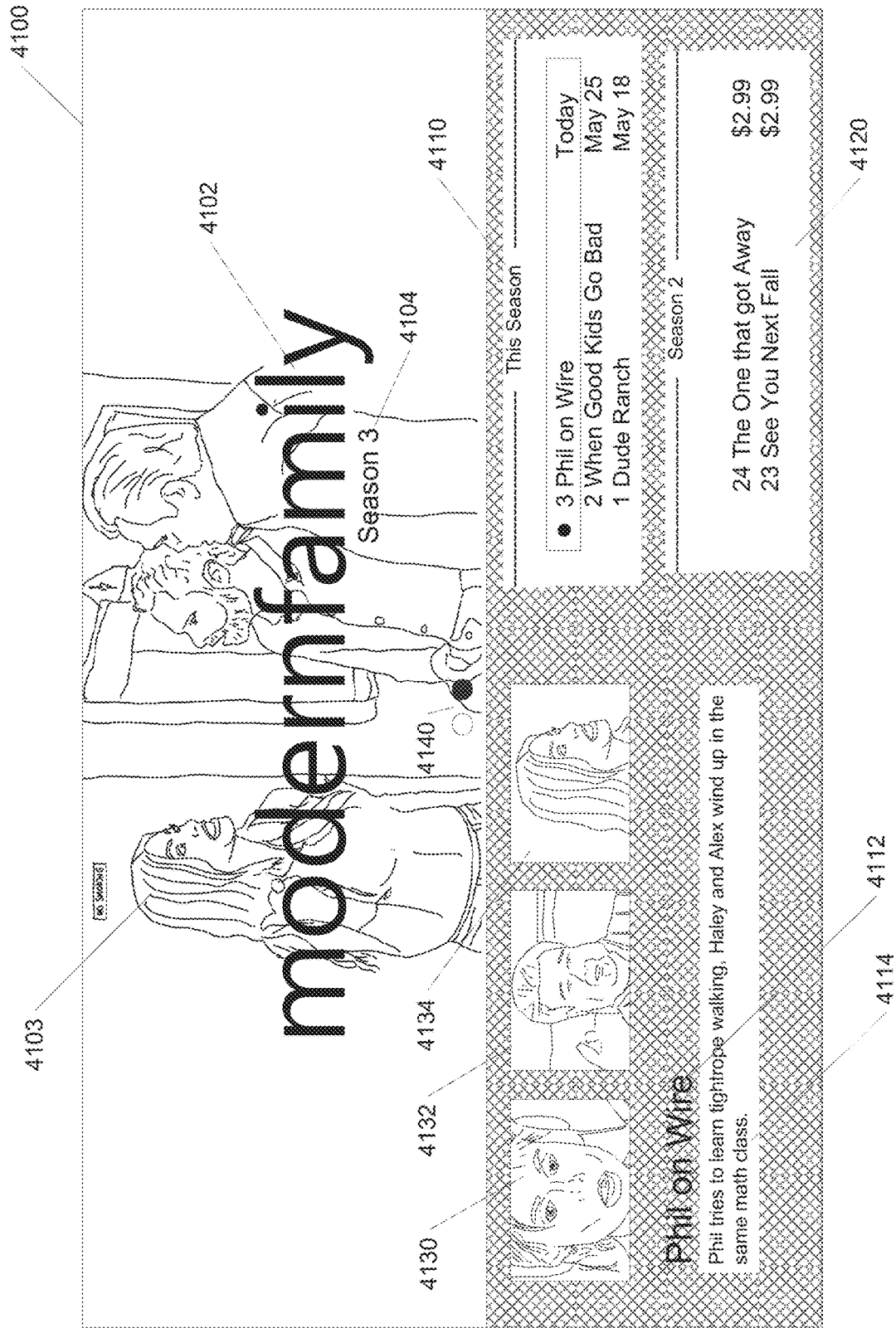
FIG. 41 depicts one embodiment of a video display and user interface.

FIG. 41 illustrates an alternative embodiment for a television show landing page. In the embodiment shown, the upper portion of the display includes the described artwork and title information. The lower portion of the display includes particular regarding seasons and episodes of the series. For example, the lower right portion of the display lists a number of current season episodes 4110 for the season. Also shown are previous season episodes 4120. In this example, episode 3 of the current season ("Phil on Wire") has focus. Focus is depicted here by a box around the entry and a bullet at the beginning of the entry. As may be appreciated, numerous different methods for indicating focus are possible and are contemplated. In various embodiments, information related to the items which has focus is shown in the left portion of the lower display. Here, the title 4112 of the highlighted episode is shown along with a brief description 4114 of the episode. In addition, one or more pictures 4130, 4132, 4134 from the episode are shown. In various embodiments, the pictures 4130, 4132, 4134, may be still images, video content from the episode, animations, or other content related to the series. In some embodiments, pictures of friends who like the episode or television series could be shown, of comments from people regarding the show (e.g., Twitter or Facebook comments). Numerous such embodiments are possible and are contemplated.

Also shown in FIG. 41 for the previous season 4120 is an indication as to cost for viewing rights to the content. Here, for example, each of the two episodes 23-24 of Season 2 are shown to have a cost of $2.99. Selecting one of these episodes may the present a display which enables to viewer to authorize purchase of the content. For example, payment may simply be authorized with or through a primary subscription (e.g., an iTunes account), or the viewer may be connected to a secondary provider to effect payment for the content which then gives the necessary viewing rights. In contrast, selection of one of the current season 4110 episodes may immediately being presentation of the selected episode or bring the viewer to a page with more information regarding the episodes. In some embodiments, whether the selected episode is immediately presented or a page of further information is displayed may depend on the input provided by the viewer. For example, a viewer with a remote control may be able to provide a first indication (e.g. an upward swipe on a touch pad) to indicate immediate play of the episode is desired. Alternatively, the viewer may provide a second, different, input (e.g., a rightward swipe) to indicate presentation of further information is desired. Various such alternatives are possible and are contemplated.

Figure 42:
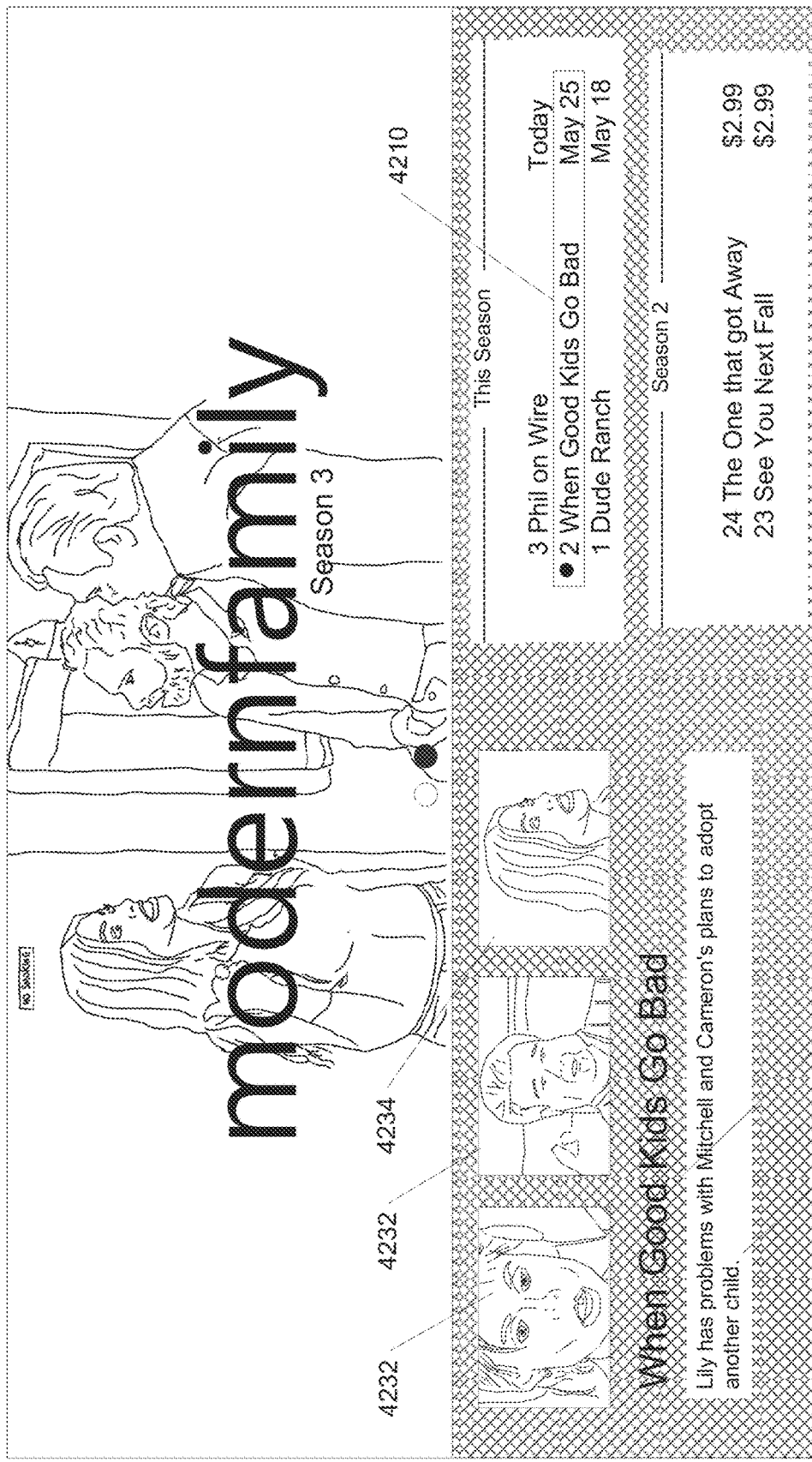
FIG. 42 depicts one embodiment of a video display and user interface.
Figure 43:
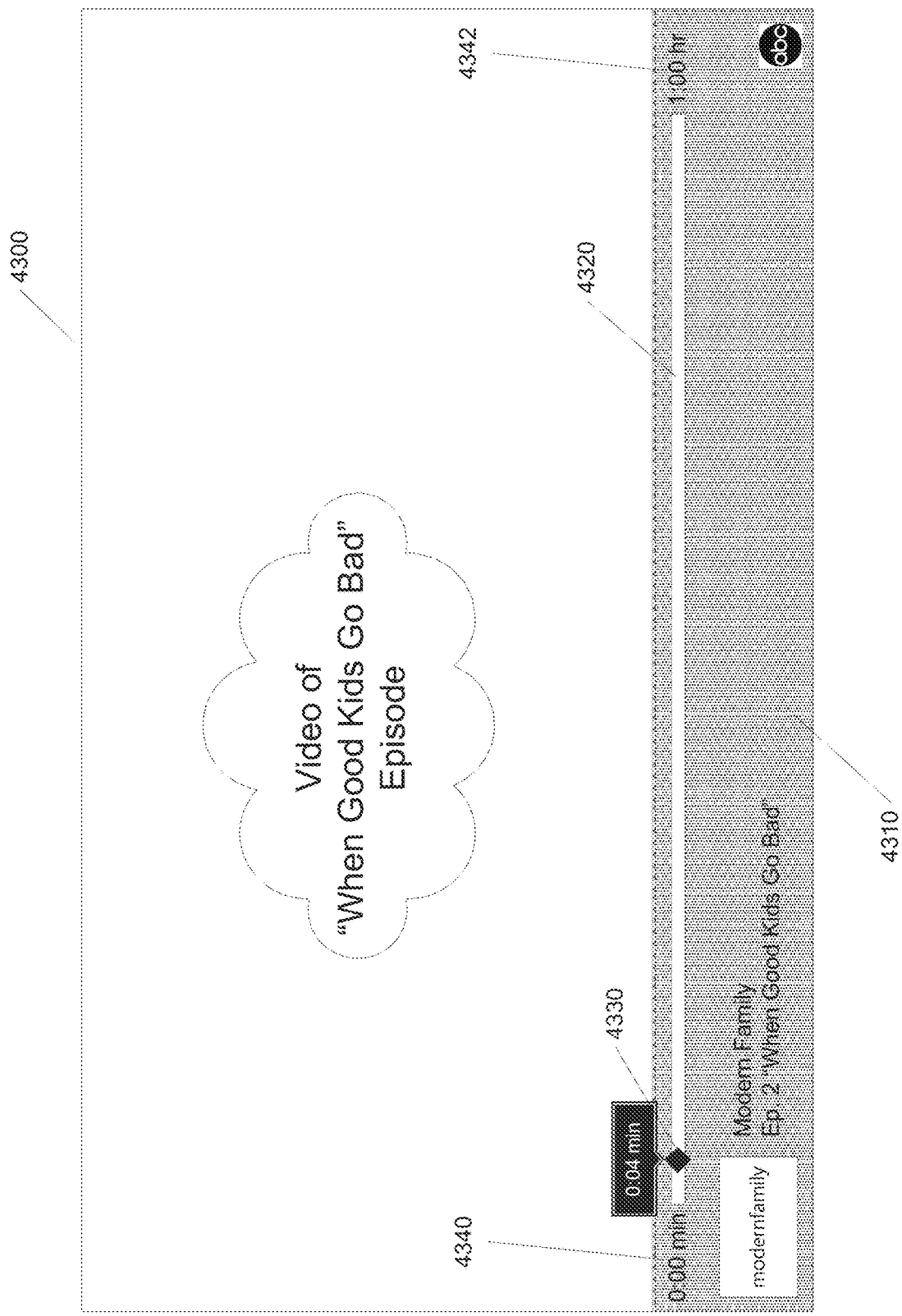
FIG. 43 depicts one embodiment of a video display and user interface.

FIG. 42 illustrates the landing page of FIG. 23 after focus has been moved to episode 2 4210 of the current season ("When Good Kids Go Bad"). Here information regarding the episode is provided in the left lower portion of the display (e.g., title 4212, description 4214, and pictures 4232, 4232, 4234). As discussed, in one embodiment, selection of episode 4210 may being immediate presentation of the selected episode as shown in FIG. 43. FIG. 43 shows display 4300 has begun presenting the selected episode. In the lower portion of the display, a scrubber bar 4320 and program information banner 4310 is displayed. In this embodiment, time information for the single episode is provided adjacent to the scrubber bar 4320. In this example, the episode is one hour in length and the bounding time indicators are 0:00 min 4340 and 1:00 hr 4342. The current position indicator 4330 depicts the current play position and time. In various embodiments, such a banner may be displayed when presentation of the video content begins, and may time out after a brief interval. A viewer may cause the scrubber/banner to reappear using a remote control device.

Figure 44:
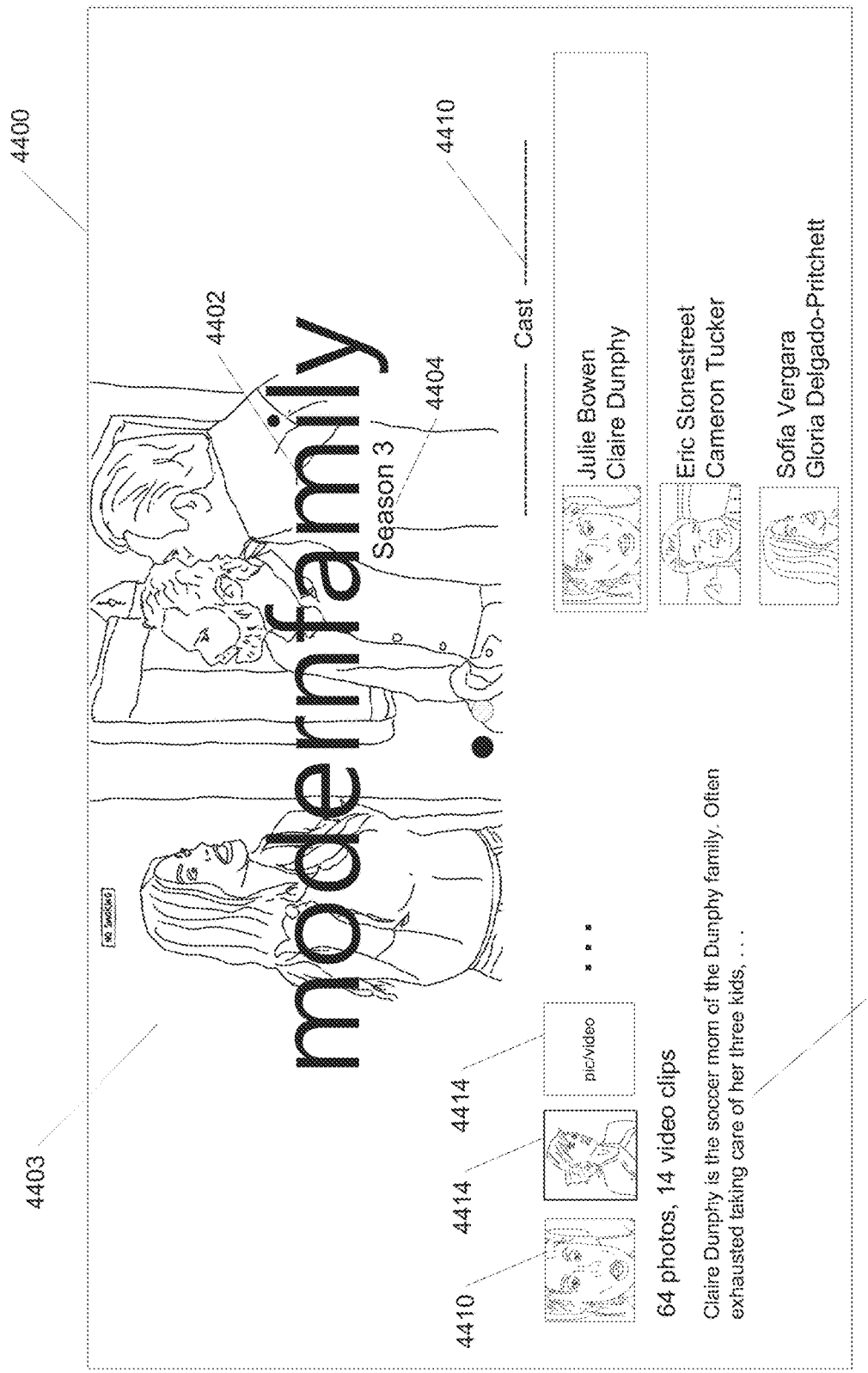
FIG. 44 depicts one embodiment of a video display and user interface.

Turning now to FIG. 44, an embodiment of a landing page is illustrated for the television series Modern Family. FIG. 44 may represent, for example, a second page of information for the landing page depicted in FIG. 41. Here the lower portion of the landing page provides information related to the cast for the television series. In the lower right portion, a listing of cast members 4410 is provided in a manner similar to episodes of FIG. 41. In this example, the first cast member (Julie Bowen) has focus which causes display of related information in the left lower portion of the display. In this example, pictures 4410, 4414, 4414 of the highlighted cast member are provided. Also shown is an indication of a number of media elements available for viewing (64 photos, 14 video clips). A description 4420 of the cast member and/or character is also provided. Further selection of the cast member element 4410 may then cause another page of information related to the selected cast member to be provided. Such additional information may include the additional media elements indicated as being available, and any other suitable content. In various embodiments, the information provided related to cast members, television episodes, movies, series, and so on, may be provided by the primary (subscription) provider, the Internet, proprietary sources, user/viewer provided or generated content, or any combination of the foregoing.

Figure 45:
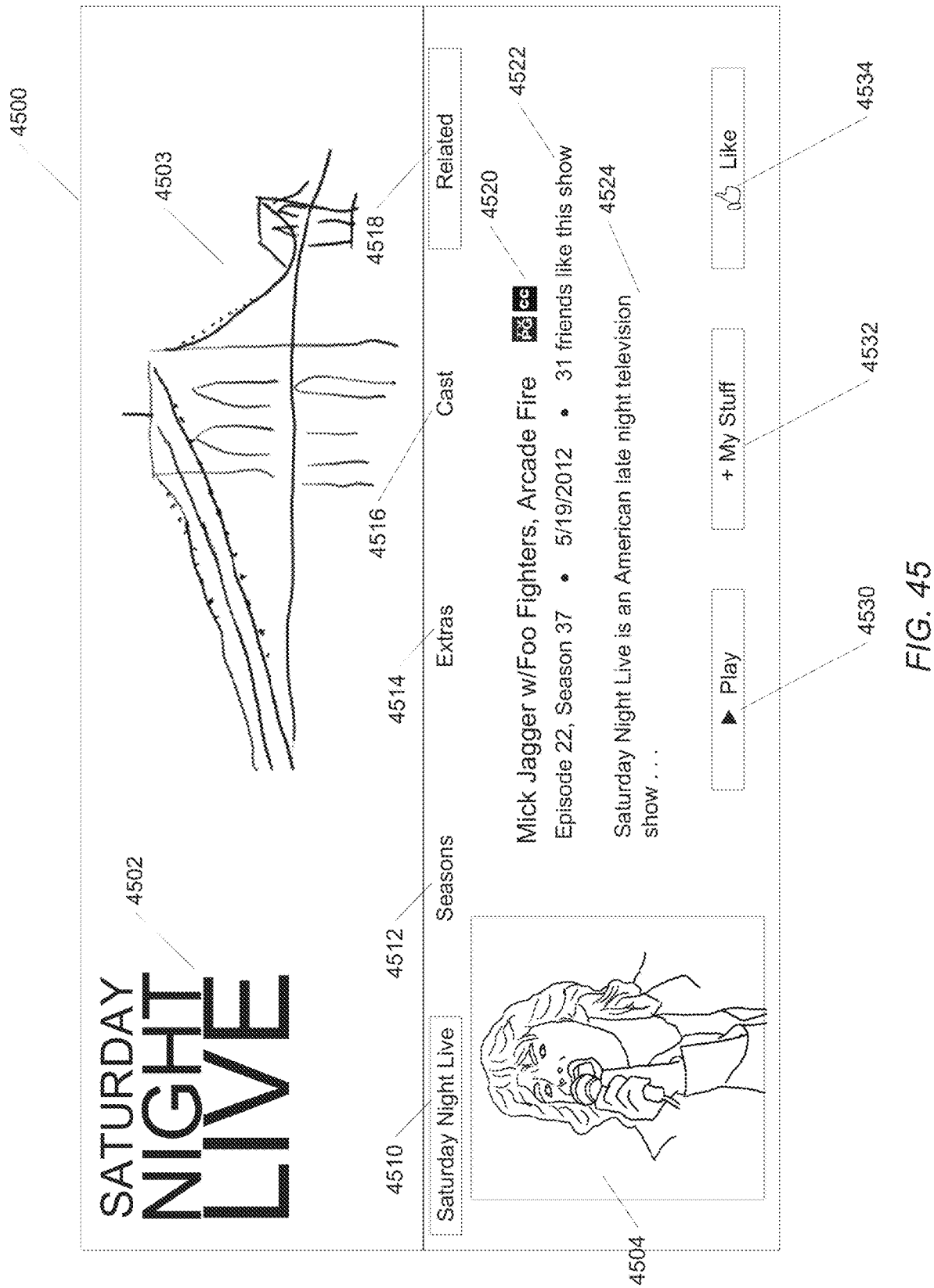
FIG. 45 depicts one embodiment of a video display and user interface.

FIG. 45 illustrates one embodiment if a landing page for a variety television show. Here the display 4500 includes video/picture/artwork 4503 for the show, a title 4502, and selectable categories 4510-4518. As shown the first element 4510 is selected and information regarding a particular episode is presented. A brief title 4520 for the episode is provided, along with descriptive information 4522 (e.g., episode number, season, air date, number of friends that like the show, etc.), and a brief description of the episode 4524. Also included is video/picture/artwork 4504 related to the show or episode. As in the previous examples, selectable elements 4530, 4532, and 4534 are provided which permit a viewer to immediately begin watching the episode, add the episode the their My Stuff collection, or indicate they like the show/episode.

Figure 47:
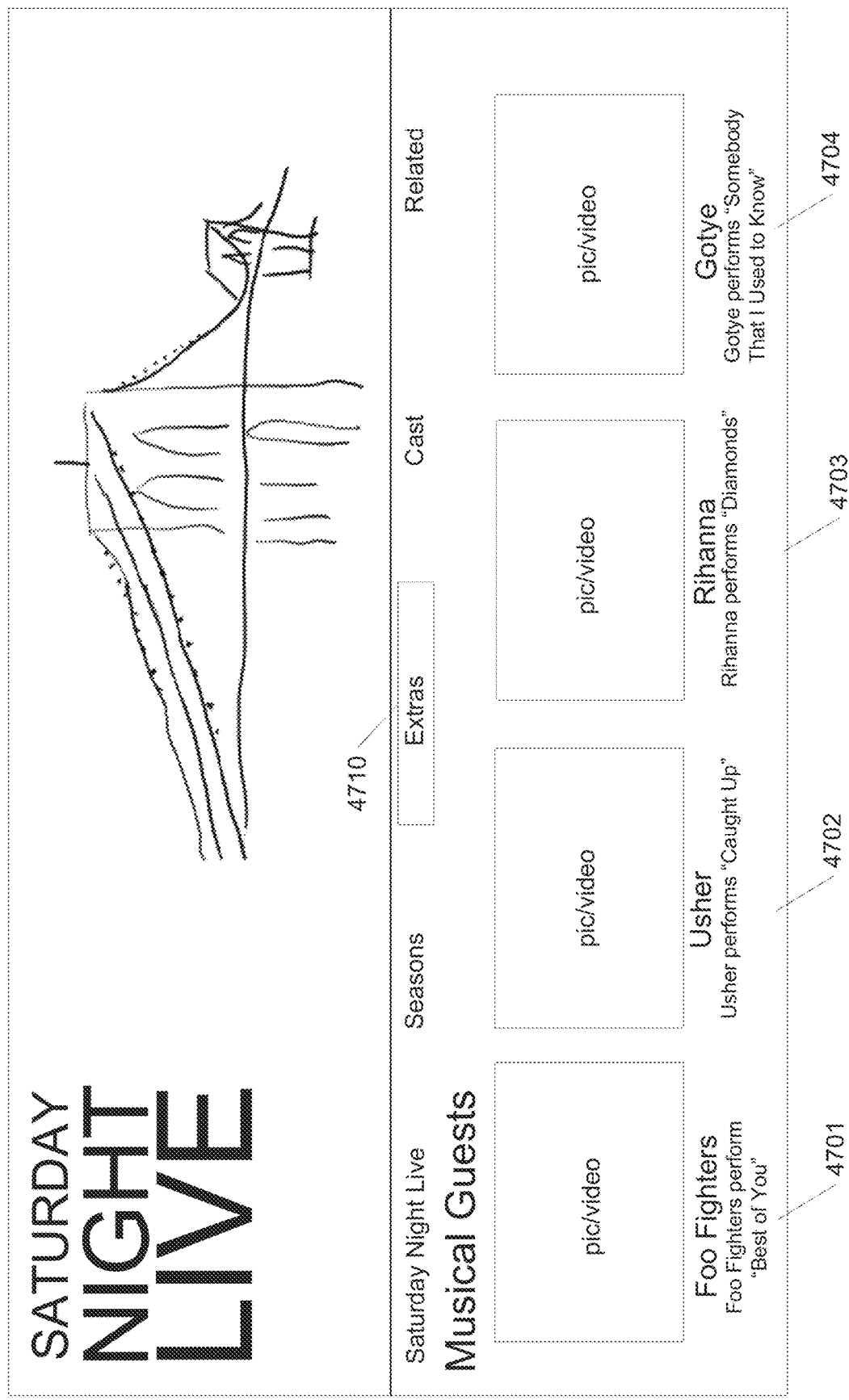
FIG. 47 depicts one embodiment of a video display and user interface.
Figure 48:
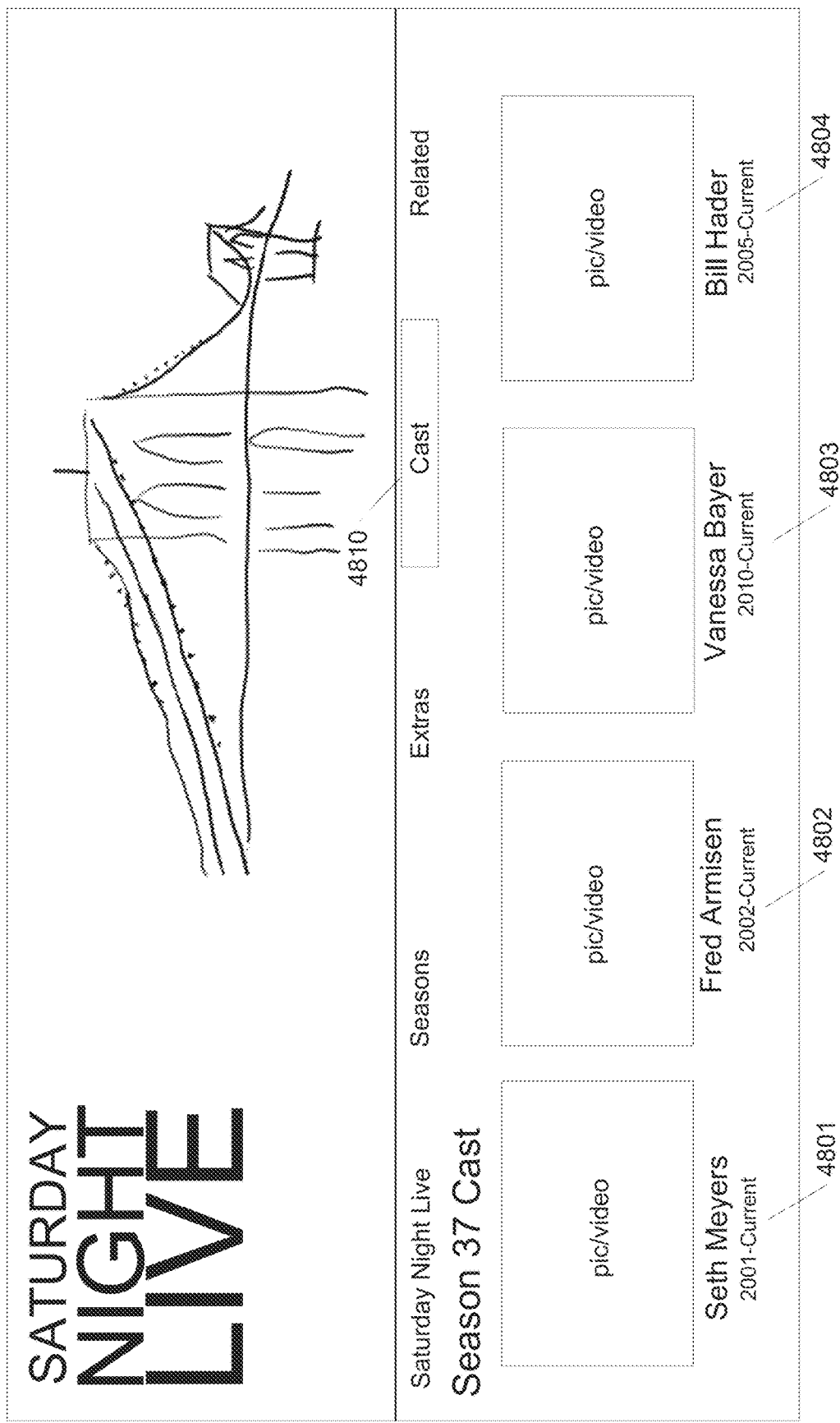
FIG. 48 depicts one embodiment of a video display and user interface.

FIG. 46 depicts the variety show landing page where the Seasons category 4610 is selected. Currently displayed are episodes for Season 37. Each episode element 4601-4604 includes video/picture/artwork for the particular episode along with a brief description which identifies the host of the episode, episode number, and musical guests. FIG. 47 depicts the same landing page with the Extras category 4710 selected. Displayed content in this example includes Musical Guests 4701-4702 which have appeared on the show. Scrolling/paging may permit a viewer to access further information not currently displayed. FIG. 48 provides an example presentation for the Cast category 4810. In this example, various cast members 4801-4804 are presented with information including their name and years as a cast member on the show.

It is noted that while content provided via landing pages such as this may be content deliberately prepared for consumption (e.g., such as extras found on a DVD), in various embodiments content may be provided that has been extracted or otherwise generated and/or compiled by the provider or other sources. For example, by processing the video content and associated metadata, particular elements of video content may be identified which may not already be identifiable via original metadata. Examples include identifying a funny sketch in a television show and generating new metadata that identifies this particular content. Other examples include identifying highlights in sporting events, etc. Other examples for identifying particular content may be based on viewer activity. For example, if it is observed that many viewers are rewinding and repeatedly watching a particular segment of some video content, metadata may be generated which identifies this particular segment. The segment could then be included as available content for viewers generally. In such an embodiment, the particular segment could be said to be identified via crowdsourcing. All such embodiments are contemplated.

Figure 49:
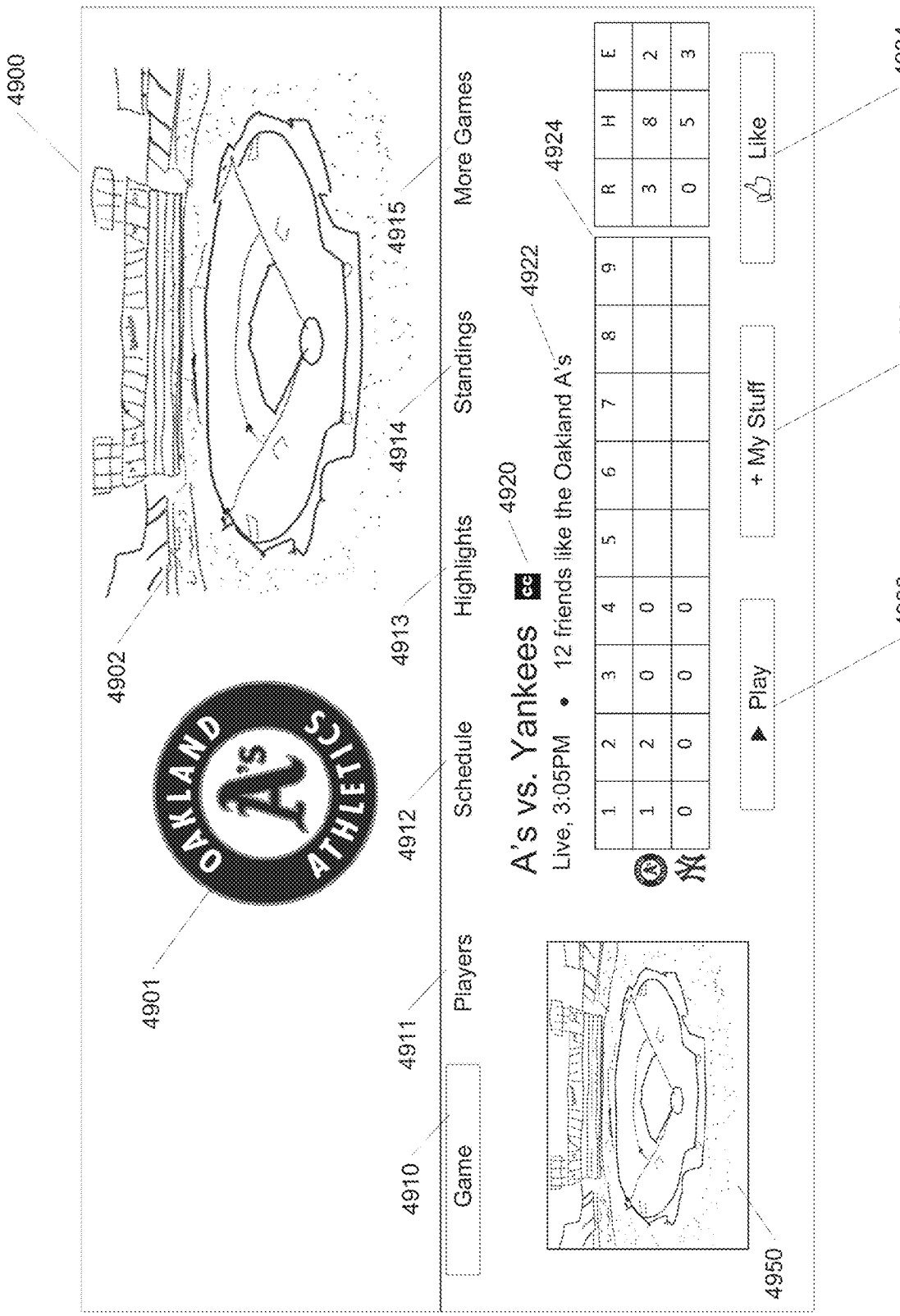
FIG. 49 depicts one embodiment of a video display and user interface.

Turning to FIG. 49, one embodiment of a landing page for a sports team is illustrated. Here the display 4900 includes video/pictures/artwork 4902 related to the sport and/or team, and an identification of the team 4901. A Game category 4910 is currently selected which causes the display of content related to a current game (in this example). An identification of the teams playing 4920 is provided, along with a description 4922 as to air time (Live, 3:05 PM), and a number of friends that like the team that corresponds to the landing page. Also included is a box score 4924 for the game and video/picture/artwork 4950 related to the game.

As previously discussed, there are situations where a viewer does not want to know the current score of a game. Accordingly, in various embodiments the system may be configurable to blackout the box score 4924. In addition, the content 4950 may likewise be prevented from providing video of the game which may include an indication of the score. As shown, an element 4930 is provided to permit the viewer to begin viewing the game. In various embodiments, selecting the element 4930 may immediately "tune to" presentation of the game in progress. Embodiments are also contemplated which permit play from the beginning of the game as well.

Embodiments are further contemplated which permit a viewer to also prevent incoming comments (e.g., in various embodiments the systems described herein may include the ability for friends to provide text messages or other comments to one another, see social media comments, etc.) which might otherwise spoil the outcome of a game. For example, a do not disturb or other setting may be available to control such content. Also shown are elements 4932 which permit the viewer to add the content to their My Stuff collection, and an element 4934 to permit a viewer to indicate they like the content.

Figure 50:
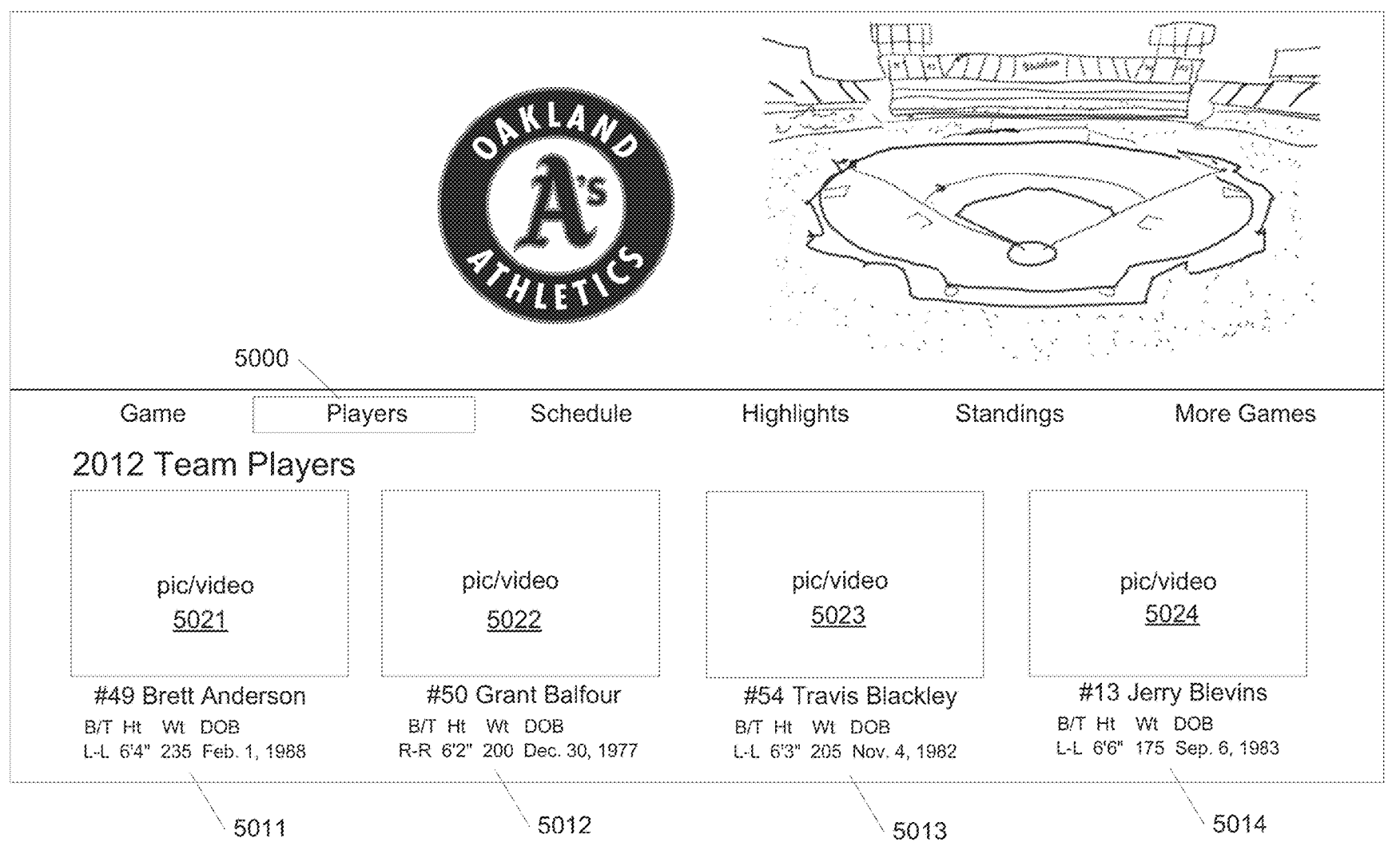

FIG. 50 depicts the landing page with the Players category 5000 selected. Here, the current roster for the 2012 Team is displayed (in part). As shown, four members 5011-5014 are currently displayed with video/picture 5021-5024, player number, name, and various statistics. Selecting one of the players may cause the display of other information related to the player, such as interviews, highlights, history, and so on. A player landing page similar to the actor landing discussed above may be available as well. Additional players may be viewed by scrolling/paging to new content. Additionally, the viewer may zoom in/zoom out to change the number of players displayed at a time. A variety of such embodiments are possible and are contemplated.

FIG. 51 depicts the landing page with the Schedule category 5100 selected. Here an identification of the month and year 5102 are displayed along with a calendar 5110. The calendar includes games played to date and scores for those games. Other games that are scheduled may also be displayed. Additional weeks/months/years of the calendar may be displayed by scrolling/paging as desired. Similar to the above, the number of days displayed at a time may likewise be varied.

Figure 52:
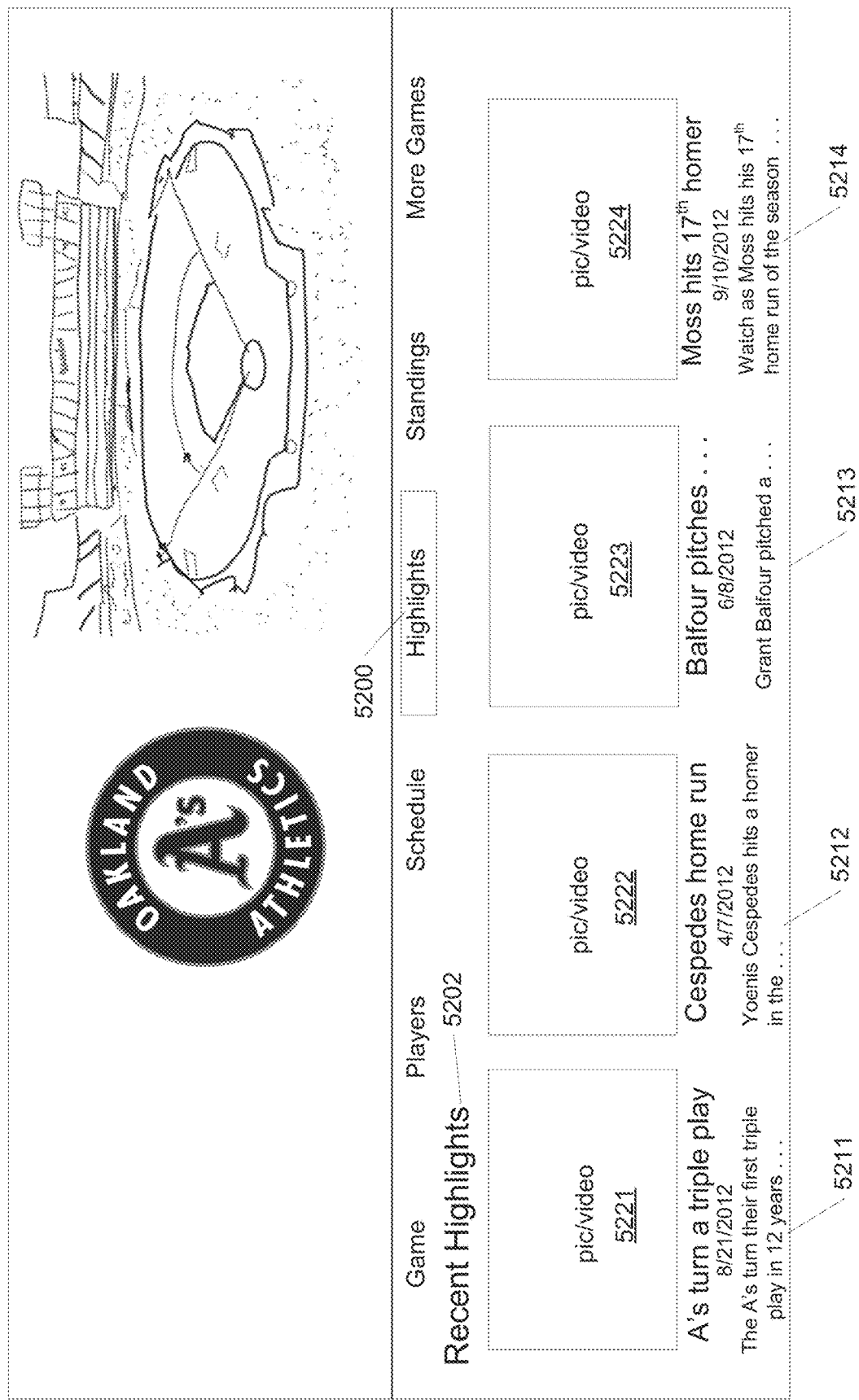
FIG. 52 depicts one embodiment of a video display and user interface.

FIG. 52 depicts the landing page with the Highlights category 5200 selected. In this embodiments, selection of this category causes display of Recent Highlights 5202. In this example, four highlights 5211-5214 are shown. Media content such as video/pictures/artwork, etc., 5221-5224 is provided for each highlighted. Also, a brief description of the highlight is provided with title, date, and so on. Selection of the content 5221-5224 may cause presentation of the corresponding highlights in a larger (e.g., full screen) mode. In various embodiments, the content 5221-5224 itself provides video of the highlight content. In such embodiments, the viewer may move the focus to a particular element to cause presentation of the corresponding audio.

Figure 53:
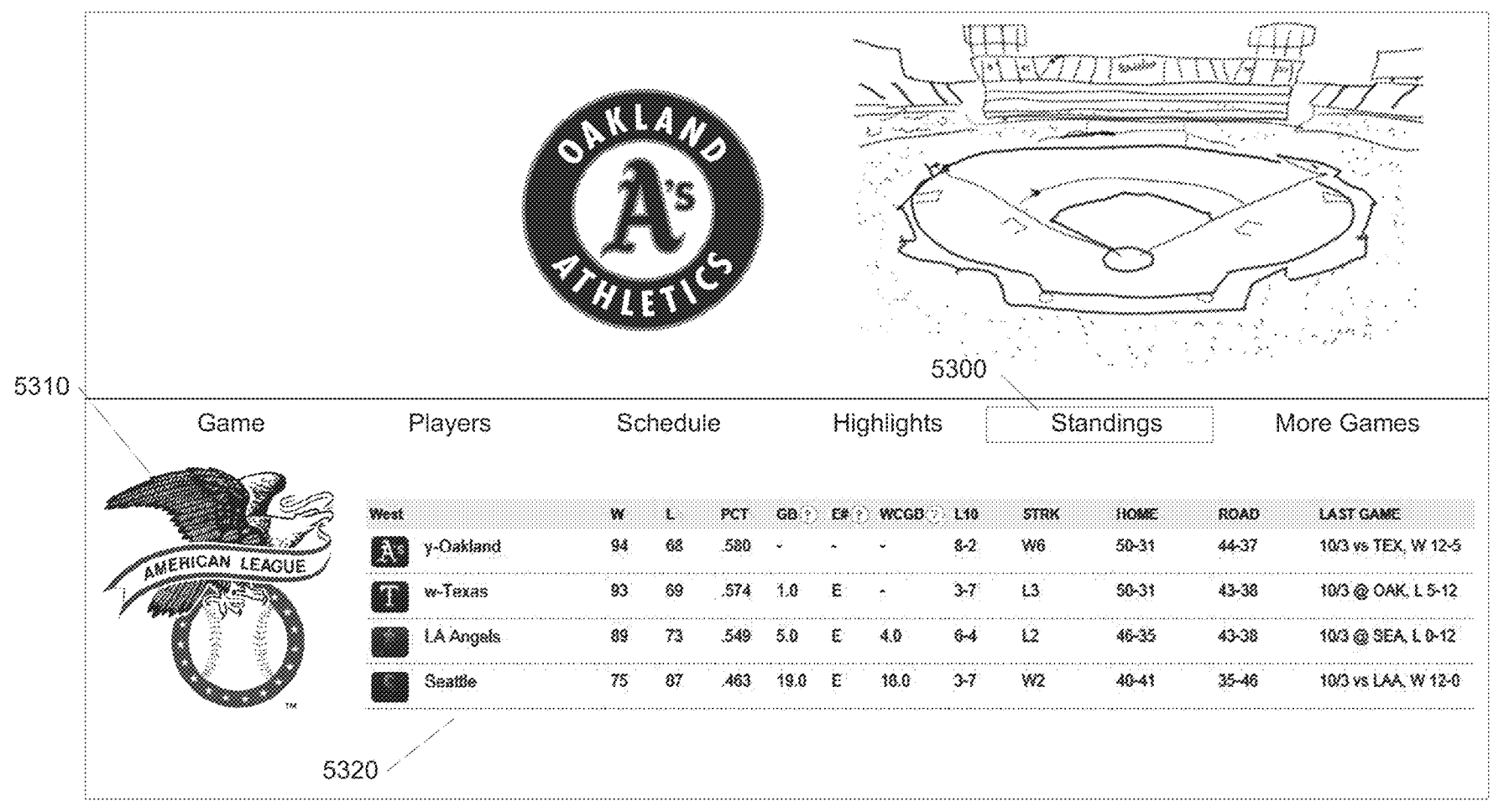
Figure 54:
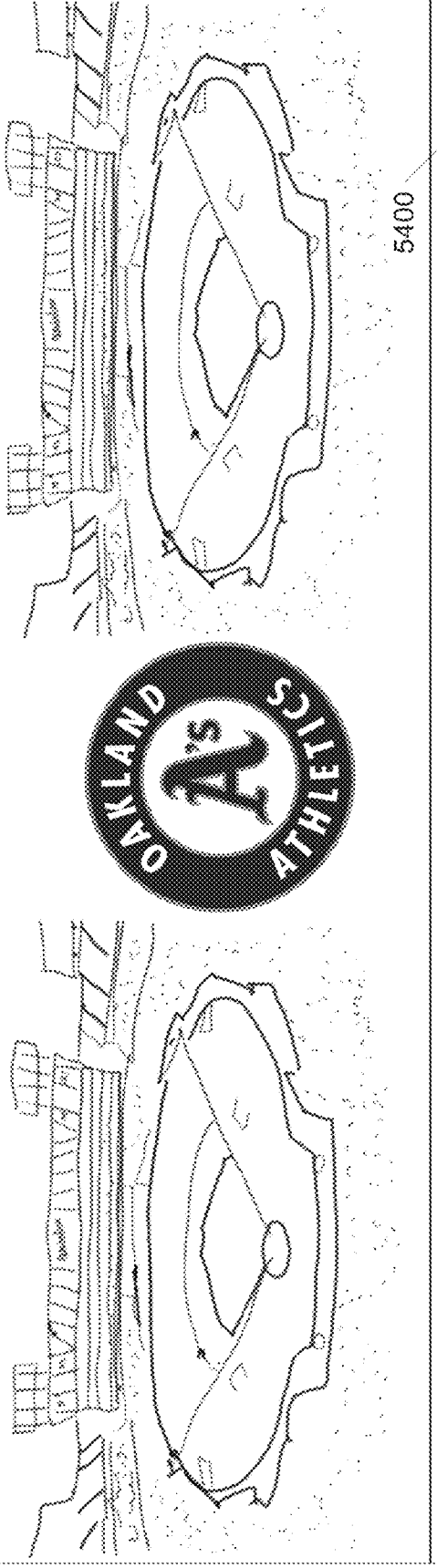
FIG. 54 depicts one embodiment of a video display and user interface.

FIG. 53 provides an illustration of one embodiment of content displayed by selection of the Standings category 5300. In this example, a number of teams along with their standings are provided in the box 5320. Also included may be artwork such as the league symbol 5310. Selecting a given row in the box 5320 may lead to a landing page for the selected team. Finally, FIG. 54 illustrates an embodiment in which the More Games category 5400 is selected. Selection of element 5400 in this examples presents other games that are currently on or soon to be on. Scrolling/paging may display further games in the future or the past. Past games may be immediately selectable for viewing. In this example, live video may be displayed for each of the elements 5411-5414 which represent live broadcasts. Alternative content may be highlights or otherwise.

As noted above, in some cases the viewer may restrict such content so that the outcome of a game is not spoiled. In various embodiments, selection of a future event such as a sporting event 5414, television show, movie, or otherwise, may present an option for the viewer to receive a reminder when the content airs. Such reminders could be provided via the television display, smartphone (email, text message), or any other mode desired.

Figure 55:
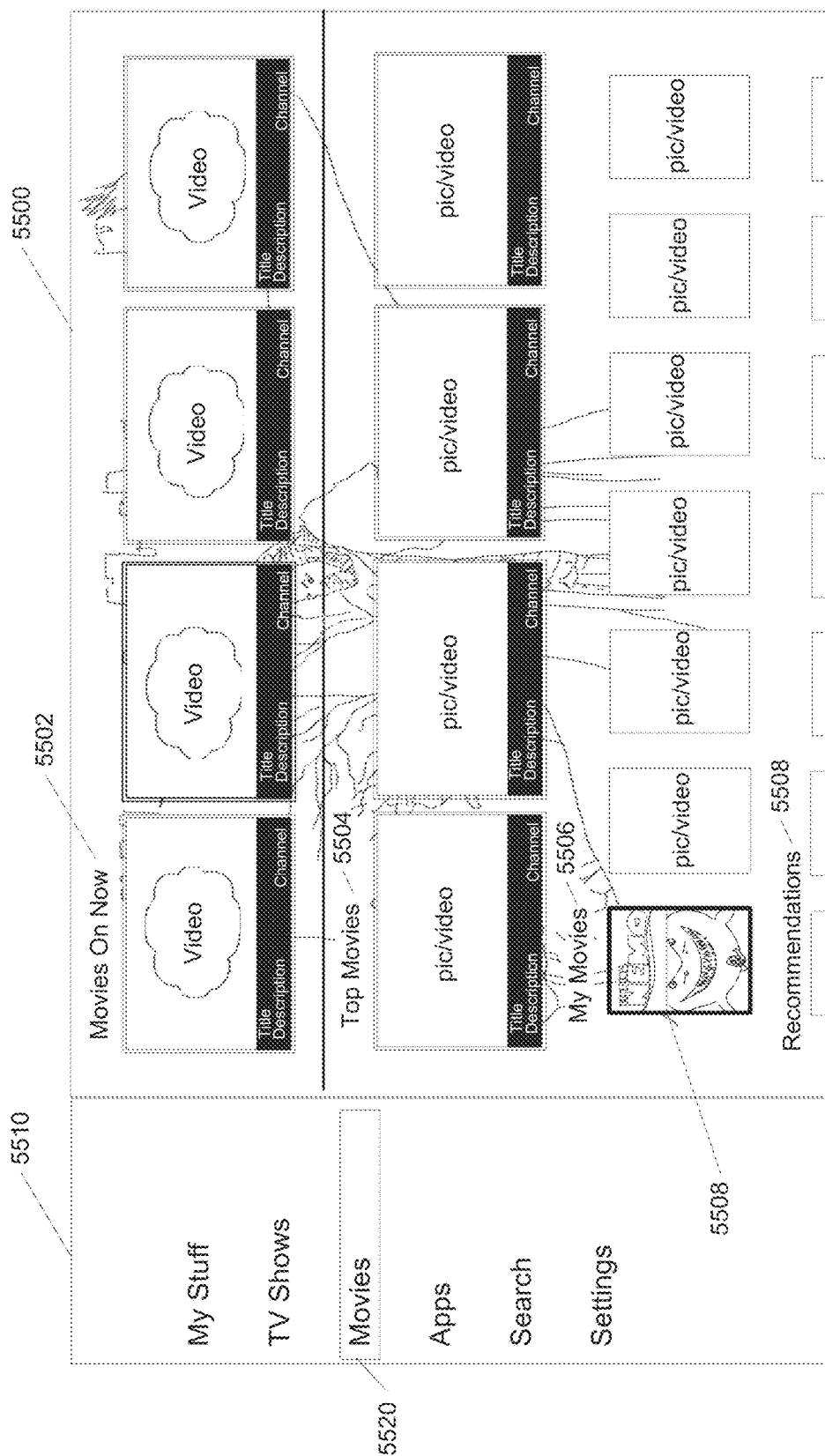
FIG. 55 depicts one embodiment of a video display and user interface.

Turning now to FIG. 55, one embodiment of a display 550 with the side bar 5510 is shown. In this example, the Movies category 5520 is selected which causes display of movie related content. Movies on Now 5502, Top Movies 5504, My Movies 5506, and Recommendations 5508 are shown. As may be appreciated, Movies on Now 5502 includes the display of multiple movies that are currently being broadcast. Video of each may be simultaneously displayed as per the previous examples. Each movie element may also include an indication of title, brief description, and title. Focus, as before, may provide for presentation of the corresponding audio.

The Top Movies 5504 category includes display of movies which are highly rated, being promoted, or otherwise. My Movies 5506 represents a collection of movies which the viewer has added to their My Stuff collection. Finally, the Recommendations category 5508 provides recommended movies to the viewer. Such movies may be recommended based on the viewer's profile, history, friend's likes, or otherwise. As before, each of the elements may be selectable to cause the display of further content. In this example, element 5508 has focus and is selected by the viewer which causes the display shown in FIG. 56.

Figure 56:
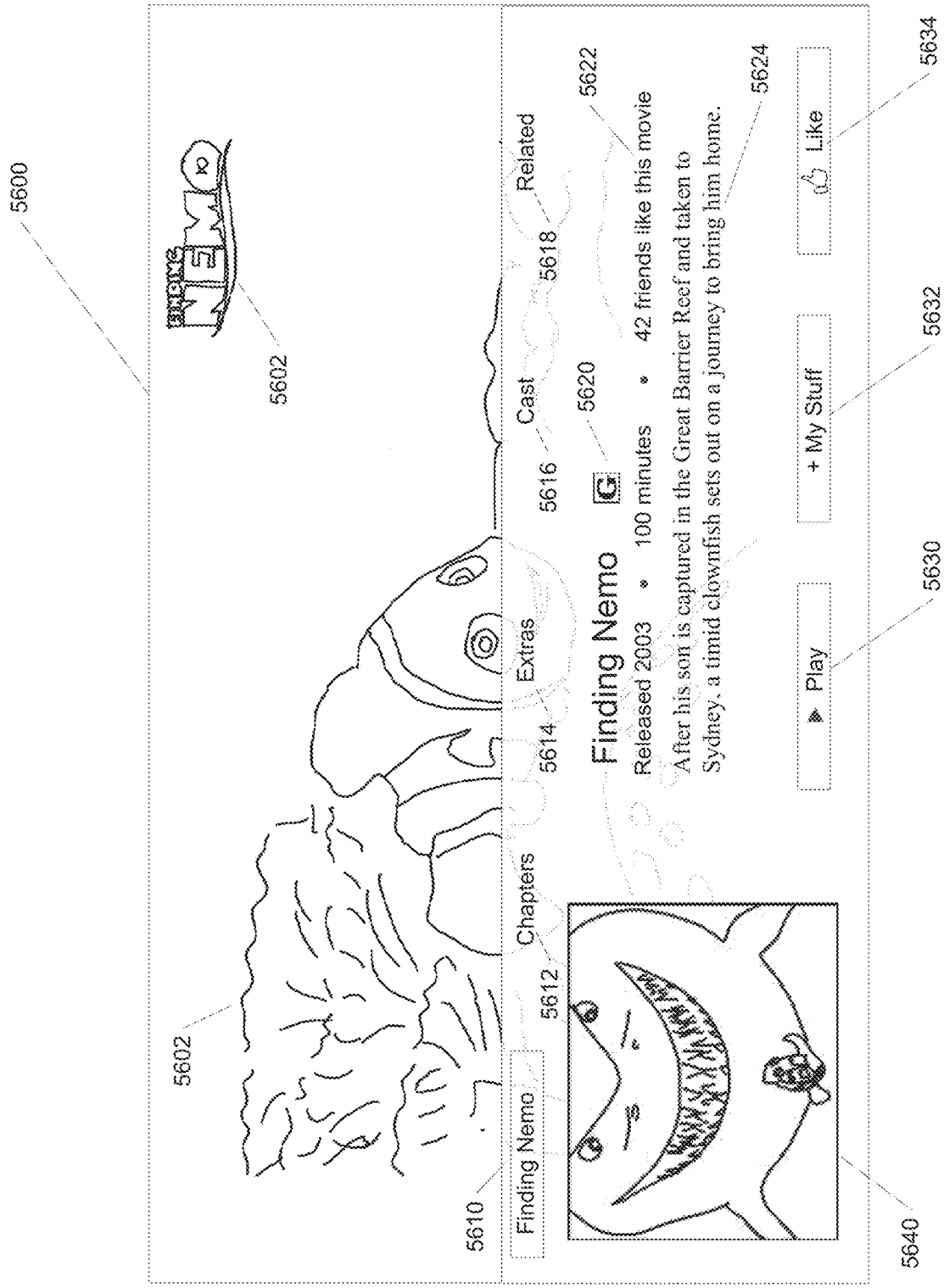
FIG. 56 depicts one embodiment of a video display and user interface.

FIG. 56 represents one embodiment of a landing page for a movie. Similar to the previous examples, artwork 5602, 5602 is provided for the movie. In addition, categories such as Finding Nemo 5610, Chapters 5612, Extras 5614, Cast 5616, and Related 5622 are shown. Selection of each of the categories causes the display of related content. In the example shown, the Finding Nemo category 5610 is selected and general information related to the movie is provided. Provided here is a title with rating 5620, release date, run time, and number of friends that like the movie 5622, and synopsis 5624. Further elements are also provided to begin immediate viewing of the movie 5630, add the movie to the viewer's My Stuff collection (as shown in FIG. 55), and indicate the viewer likes the movie 5634. Similar to a DVD, Chapters 5612 may provide direct access to various chapters of the movie. Extras 5614, Cast, 5616, and Related 5618 may include extra material found on a DVD as well as other content not found on DVDs. For example, provider created content may be provided, Internet based content, content created by other viewers, and so on, may all be available.

Figure 57:
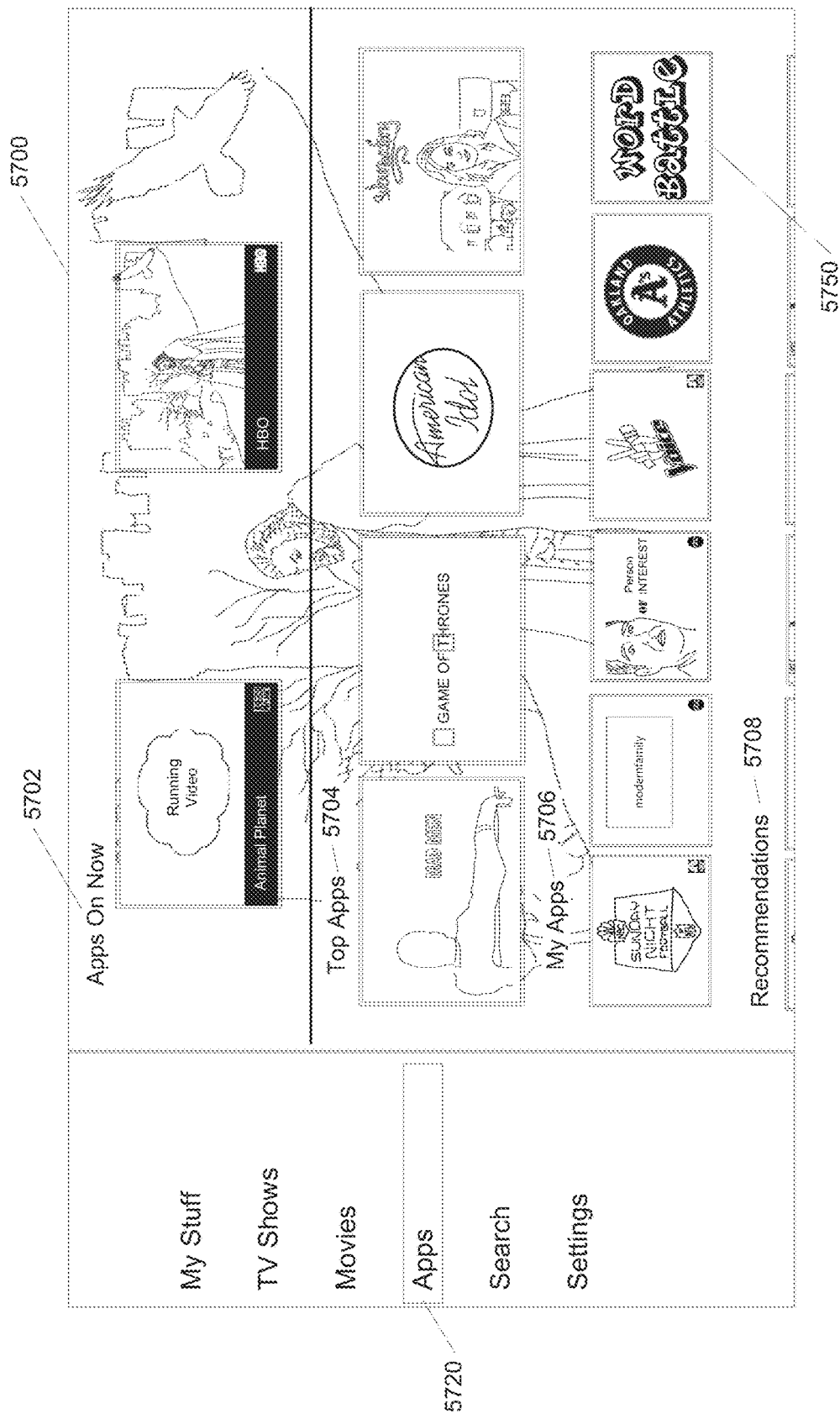
FIG. 57 depicts one embodiment of a video display and user interface.

FIG. 57 depicts the side bar with the APPS category 5720 selected. In various embodiments, various executable applications (similar to the apps available from Apple's iTunes) are available. These apps may provide additional content related to television viewing and/or may otherwise enhance the viewing of television related content. Some apps may be executable by a set-top box. Others may be executable on a smart phone or tablet computer to provide a second screen for use while viewing television content. In the example shown, an Apps On Now category 5702 provides an indication of apps which are currently running or otherwise memory resident (e.g., in the set top box). A Top Apps category 5704 depicts various apps which are popular (for example), highly rated, etc. My Apps 5706 shows a collection of apps which are included as part of the viewer's My Stuff collection. Finally, Recommendations 5708 provides recommended apps to the viewer. It is noted that the apps needn't be strictly television viewing related. For example a game app 5750 is shown in the embodiment. Such game apps may be playable by a single person, may be playable with other viewer's, may be playable with other's via an Internet connection, or otherwise. In some embodiments, particular apps may be promoted to the side bar for easy access. All such embodiments are contemplated.

Figure 58:
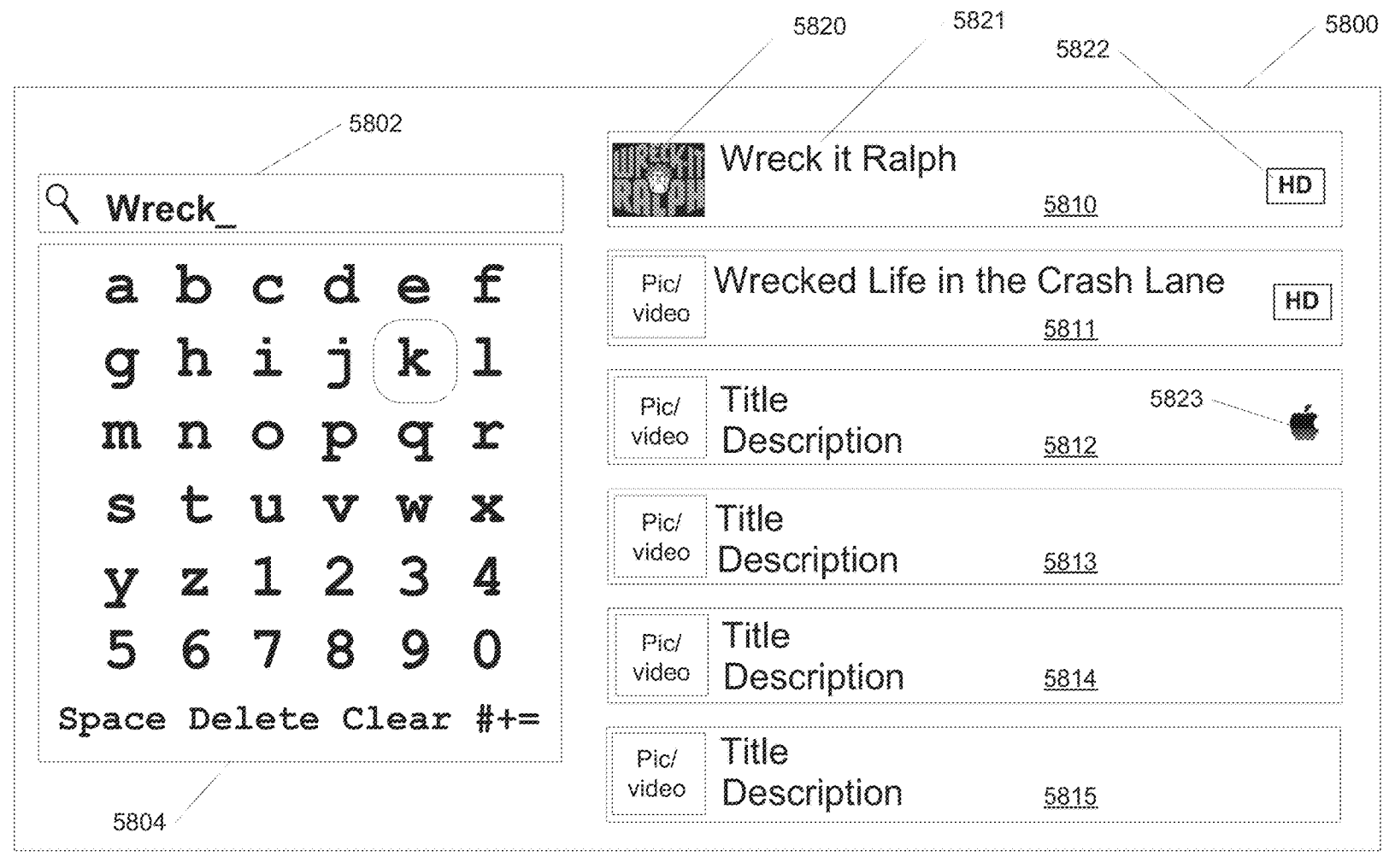

Finally, FIG. 58 depicts one embodiment of a search screen that may be displayed by selecting the Search category from the side bar. In this example, an input bar 5802 displays characters which have been selected from the selection box 5804. Matching entries 5810-5815 are displayed to the right with video/picture/artwork 5820 and title 5821. Other suitable information may be displayed as desired, such as quality/resolution indicator 5822. Other indications, such as indicator 5823, may be included which identify content available for purchase. Numerous alternative embodiments for presentation of search screen and results are possible and are contemplated.

Figure 59:
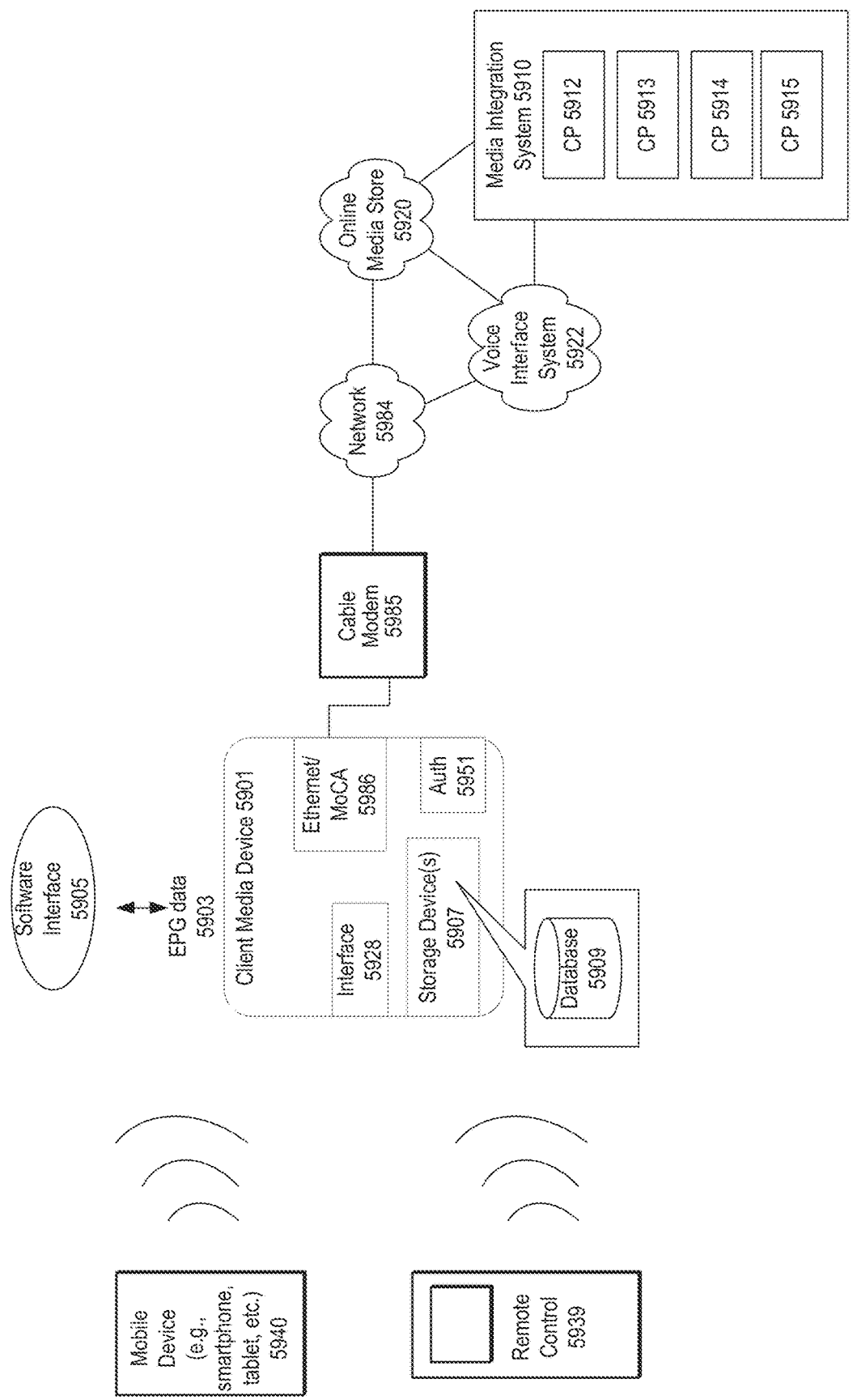
FIG. 59 depicts one embodiment of a media content delivery system.

FIG. 59 illustrates a system including a client media device 5901 configured to receive media content via a network 5984. The client media device may provide the media content to one or more display devices, audio devices, or other devices enabling a user of the client device to view, hear, or otherwise use the media content.

The client media device 5901 may communicate with an online media store 5920 through the network 5984 to receive information for displaying a user interface showing various media content available for delivery to the client media device. Each piece of media content may be referred to as a "media production." Examples of media productions include various kinds of movies and films, television programs, music videos, albums/songs, etc. In general, a given media production may include any kind of content that includes video and/or audio information.

In some embodiments the online media store may be coupled to or may include a media integration system 5910 which integrates media productions from a plurality of third-party content provider systems, such as the content providers CP 5912-5915. Each of the content provider systems may be managed by or affiliated with any kind of company or organization, such as cable or satellite television providers, television networks or channels, movie studios, sporting leagues, news organizations, music labels, online media services, etc. Thus, the user interface displayed by the client media device may aggregate the media productions available from many different content providers or sources, and may provide a convenient way for the user to see the content from different providers in an integrated view.

In various embodiments the client media device may communicate with the online media store 5920 through any kind of network 5984. The network 5984 may include any type of network or combination of networks. For example, the network 5984 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks.

In the illustrated embodiment the client media device is coupled to the network 5984 via Ethernet hardware or Multimedia over Coax Alliance (MoCA) hardware 5986, which in turn couples to a cable modem 5985. In other embodiments the client media device may be coupled to the network 5984 via any other type of wired or wireless connection medium or device. For example, wired mediums may include Ethernet, fiber channel, a modem, etc. Wireless connection mediums may include a wireless connection using a wireless communication protocol such as IEEE 802.11 (wireless Ethernet), a modem link through a cellular service, a satellite link, etc.

The client media device may include one or more storage devices 5907 configured to store data. At least one of the storage devices 5907 may include non-volatile memory configured to persistently store data. In various embodiments the storage device(s) may include one or more disk drives, solid state drives, flash memory devices, optical storage devices, or any other kinds of devices for storing data. In some embodiments the storage device(s) may also include various kinds of volatile memory, such as random access memory (RAM), e.g., synchronous dynamic RAM (SDRAM), static RAM (SRAM), etc.

Electronic Programming Guide (EPG) data 5903 may be periodically delivered to the client media device 5901 via a software interface 5905. The software interface 5905 may include any kind of programming interface or messaging interface that enables the client media device to communicate with an external system to receive the EPG data 5903 or other data. As one example, the software interface 5905 may include a JavaScript Object Notation (JSON) interface. As another example, the software interface 5905 may include a URL-based interface that enables the client media device to perform various functions or exchange information by referencing uniform resource locators (URLs) with particular parameters embedded in them.

The client media device may store the EPG data 5903 on the storage device(s) 5907. For example, one or more databases 5909 may be stored on the storage device 5907, and the EPG data 5903 may be stored in one or more of the databases. The EPG data 5903 may include information about television programming, such as the listing of programs, their scheduled times, the channel lineup, images associated with the programs, etc. The EPG data 5903 may be customized for the particular user of the client media device 5901. For example, if the user subscribes to some subscription-based content providers, but not others, then the EPG data 5903 may include information for only the programs or media productions offered by the providers to which the user subscribes.

The database(s) 5909 may also store other information, such as personalization information for the user(s) of the client media device 5901. The personalization information may include the user's favorite programs or channels, list of recently viewed content, stored play positions for various media content, watch lists, bookmarks, etc.

The client media device may be configured to receive user input from a remote control device 5939 via an interface 5928. The remote control device may use infrared communication, Bluetooth communication, or any of various other kinds of wireless or wired communication techniques to transmit signals to the client media device indicating the user input.

In some embodiments the client media device may be configured to communicate with the media integration system 5910 and/or the online media store 5920 through a voice interface system 5922. For example, in some embodiments the remote control device or the client media device may include a microphone device 5924 that receives speech from the user, e.g., where the speech includes commands, requests, questions, etc. The client media device may convert the speech into digital packets for transmission over the network 84 to the voice interface system 5922. The voice interface system may perform speech recognition to recognize the user's commands or questions. The voice interface system may communicate with the online media store 5920 and/or the media integration system 5910 to pass the user's commands or questions on to them via an interface. The online media store 5920 and/or the media integration system 5910 may then generate information in response to the user's commands or questions and return it to the client media device (or return it to the voice interface system, which may then forward it to the client media device). For example, the user may request to lookup a television program having a certain title or actor, and the system may return information that the client media device uses to display a list of programs matching the title or actor.

In various embodiments the information transmitted from the online media store or voice interface system to the client media device may include any kind of information useable by the client media device to display information regarding the media content available for delivery to the client media device. For example, in some embodiments the system may utilize Extensible Markup Language (XML) code or other markup language code which describes the information to be displayed. The client media device may parse the XML code and display a user interface based on the described information. In some embodiments the system may also transmit graphics files or video feeds which the client media device may incorporate into the user interface.

In some embodiments the client media device may also communicate with a mobile computing device 5940, e.g., where the user may hold the mobile device. For example, the mobile device 5940 may be a handheld computing device, wearable computing device, or other portable computing device. Examples of mobile devices include smartphones, tablet computers, personal digital assistants, portable music players, handheld game devices, wearable computers (e.g., glasses watches), etc. In some embodiments the user may control the client media device 5901 using the mobile device 5940, e.g., using the mobile device 5940 as a remote control. In some embodiments the client media device may also forward the media content received from the online media store 5920 or media integration system 5910 to the mobile device 5940, e.g., so that it can be displayed on a display device included in the mobile device 5940. In other embodiments the mobile device 5940 may communicate directly with the online media store 5920 and/or the media integration system 5910, e.g., without going through the client media device 5901 as an intermediate. The client media device may also be included as a component within the mobile device in some embodiments, and/or the mobile device may be configured to perform the functions described with reference to the client media device.

The client media device may be configured to utilize digital rights management (DRM) techniques to ensure that the user is authorized to receive and view selected media content. For example, the client media device may include an authorization module 5951 configured to communicate with one or more remote servers to implement the digital rights management for the media content. In various embodiments the client media device may communicate with servers associated with any of various systems or organizations in order to implement the digital rights management, such as one or more servers in the online media store 5920 or the content provider systems whose media productions are integrated by the media integration system 5910.

In the above discussion, various embodiments have been described. It is noted that these embodiments may be combined in any manner desired. In various embodiments, program instructions of a software application may be used to implement the methods and/or mechanisms previously described. The program instructions may be stored on a computer readable storage medium. Numerous types of storage media are available. The storage medium may be accessible by a computer or other processing device during use to provide the program instructions and accompanying data to the computer or device for program execution.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
at an electronic device:
receiving, via one or more input devices, an input corresponding to a request to view information about a plurality of content items available for viewing on the electronic device; and
in response to receiving the input corresponding to the request to view information about the plurality of content items available for viewing on the electronic device, displaying, on a display, a user interface including:
in a first region of the user interface, a first plurality of representations corresponding to channels available for viewing on the electronic device, including:
a first representation of a first channel, wherein the first representation of the first channel displays live broadcast video from a first content item that is currently being broadcasted live on the first channel; and
a second representation of a second channel, different than the first channel, wherein the second representation of the second channel displays live broadcast video from a second content item that is currently being broadcasted live on the second channel; and
in a second region of the user interface, different than the first region of the user interface, one or more representations corresponding to one or more collections of episodic content available for viewing on the electronic device, including a respective representation of the one or more representations associated with a first collection of episodic content and a second respective representation of the one or more representations associated with a second collection of episodic content, different from the first collection of episodic content;
while displaying the user interface including the respective representation and the second respective representation, receiving, via the one or more input devices, a first input corresponding to selection of the respective representation associated with the first collection of episodic content;
in response to receiving the first input, displaying, on the display, a first landing page associated with the first collection of episodic content, and not associated with the second collection of episodic content, the first landing page different from the user interface, and the first landing page including a second plurality of representations of a plurality of episodes from a first season of the first collection of episodic content, including a given episode not currently being broadcast live, that are selectable to display respective episodes of the first collection of episodic content;
while displaying the first landing page, receiving, via the one or more input devices, a respective user input;
in response to receiving the respective user input, displaying, in the first landing page, a third plurality of representations of a plurality of episodes from a second season of the first collection of episodic content that are selectable to display a respective episode from the second season of the first collection of episodic content;
while displaying the user interface including the respective representation and the second respective representation, receiving, via the one or more input devices, a second input corresponding to selection of the second respective representation associated with the second collection of episodic content; and
in response to receiving the second input, displaying, on the display, a second landing page associated with the second collection of episodic content, and not associated with the first collection of episodic content, the second landing page different from the user interface, and the second landing page including a fourth plurality of representations of a plurality of episodes from a first season of the second collection of episodic content, including a given episode not currently being broadcast live, that are selectable to display respective episodes of the second collection of episodic content.

2. The method of claim 1, wherein:
the input corresponding to the request to view information about a plurality of content items available for viewing on the electronic device was received while the electronic device was playing video content on the display, and
displaying the user interface comprises displaying the user interface overlaid on the video content while the video content continues playing.

3. The method of claim 2, wherein the video content is visible on the display through at least a portion of the user interface.

4. The method of claim 1, wherein the electronic device comprises an electronic device that includes the display.

5. The method of claim 1, wherein the electronic device is a separate device from a display device that includes the display.

6. The method of claim 1, wherein the first plurality of representations corresponding to channels and the one or more representations corresponding to one or more collections of episodic content include at least one representation that is at least partially not displayed on the display.

7. The method of claim 1, wherein the user interface includes a plurality of rows of representations, including:
a first row of representations, including the first plurality of representations corresponding to channels,
a second row of representations, including the one or more representations corresponding to one or more collections of episodic content, corresponding to a collection of episodic content category of content, and
a third row of representations corresponding to a second category of content, different than the collection of episodic content category of content.

8. The method of claim 7, wherein the second category of content corresponds to a movies category of content, and the collection of episodic content category of content corresponds to a television shows category of content.

9. The method of claim 1, further comprising:
while displaying the user interface, receiving, via the one or more input devices, a sequence of one or more inputs directed at a representation, in the user interface, corresponding to content; and in response to receiving the sequence of one or more inputs directed at the representation corresponding to content:
in accordance with a determination that the representation corresponding to content is a respective representation of the first plurality of representations corresponding to a respective channel available for viewing on the electronic device, displaying, on the display, live broadcast video from a respective content item that is currently being broadcasted live on the respective channel; and
in accordance with a determination that the representation corresponding to content is a respective representation of the one or more representations corresponding to a respective collection of episodic content available for viewing on the electronic device, displaying, on the display, a landing page corresponding to the respective collection of episodic content.

10. The method of claim 9, wherein displaying, on the display, the landing page corresponding to the respective collection of episodic content includes displaying, on the display, a representation of a current episode from a current season of the respective collection of episodic content, without displaying a representation of another episode of the respective collection of episodic content.

11. The method of claim 10, wherein the other episode of the respective collection of episodic content is from another season, different than the current season, of the respective collection of episodic content.

12. The method of claim 10, wherein the other episode of the respective collection of episodic content is from the current season of the respective collection of epi sodic content.

13. The method of claim 10, further comprising:
while displaying, on the display, the landing page, receiving, via the one or more input devices, an input corresponding to a request to play the current episode from the current season of the respective collection of episodic content; and
in response to receiving the input corresponding to the request to play the current episode, playing the current episode.

14. The method of claim 10, further comprising:
while displaying, on the display, the landing page including displaying, on the display, the representation of the current episode from the current season of the respective collection of episodic content, without displaying the representation of the other episode of the respective collection of episodic content, receiving, via the one or more input devices, a sequence of one or more inputs corresponding to a request to display additional representations of additional episodes of the respective collection of episodic content; and
in response to receiving the sequence of one or more inputs corresponding to the request to display additional representations of additional episodes of the respective collection of episodic content, displaying, on the display, a representation of the other episode of the respective collection of episodic content.

15. The method of claim 14, further comprising:
while displaying the representation of the other episode of the respective collection of episodic content, receiving, via the one or more input devices, an input corresponding to a request to play the other episode of the respective collection of episodic content; and in response to receiving the input corresponding to the request to play the other episode, playing the other episode.

16. The method of claim 1, wherein before receiving the respective user input, the user interface does not include the third plurality of representations of the plurality of episodes from the second season of the first collection of episodic content.

17. The method of claim 1, wherein the first landing page associated with the first collection of episodic content does not include representations of content not associated with the first collection of episodic content.

18. An electronic device comprising:
one or more processors; and
memory storing instructions, which when executed by the one or more processors, cause the electronic device to perform a method comprising:
receiving, via one or more input devices, an input corresponding to a request to view information about a plurality of content items available for viewing on the electronic device; and
in response to receiving the input corresponding to the request to view information about the plurality of content items available for viewing on the electronic device, displaying, on a display, a user interface including:
in a first region of the user interface, a first plurality of representations corresponding to channels available for viewing on the electronic device, including:
a first representation of a first channel, wherein the first representation of the first channel displays live broadcast video from a first content item that is currently being broadcasted live on the first channel; and
a second representation of a second channel, different than the first channel, wherein the second representation of the second channel displays live broadcast video from a second content item that is currently being broadcasted live on the second channel; and
in a second region of the user interface, different than the first region of the user interface, one or more representations corresponding to one or more collections of episodic content available for viewing on the electronic device, including a respective representation of the one or more representations associated with a first collection of episodic content and a second respective representation of the one or more representations associated with a second collection of episodic content, different from the first collection of episodic content;
while displaying the user interface including the respective representation and the second respective representation, receiving, via the one or more input devices, a first input corresponding to selection of the respective representation associated with the first collection of episodic content;
in response to receiving the first input, displaying, on the display, a first landing page associated with the first collection of episodic content, and not associated with the second collection of episodic content, the first landing page different from the user interface, and the first landing page including a second plurality of representations of a plurality of episodes from a first season of the first collection of episodic content, including a given episode not currently being broadcast live, that are selectable to display respective episodes of the first collection of episodic content;
while displaying the first landing page, receiving, via the one or more input devices, a respective user input;
in response to receiving the respective user input, displaying, in the first landing page, a third plurality of representations of a plurality of episodes from a second season of the first collection of episodic content that are selectable to display a respective episode from the second season of the first collection of episodic content;
while displaying the user interface including the respective representation and the second respective representation, receiving, via the one or more input devices, a second input corresponding to selection of the second respective representation associated with the second collection of episodic content; and
in response to receiving the second input, displaying, on the display, a second landing page associated with the second collection of episodic content, and not associated with the first collection of episodic content, the second landing page different from the user interface, and the second landing page including a fourth plurality of representations of a plurality of episodes from a first season of the second collection of episodic content, including a given episode not currently being broadcast live, that are selectable to display respective episodes of the second collection of episodic content.

19. The electronic device of claim 18, wherein
the input corresponding to the request to view information about a plurality of content items available for viewing on the electronic device was received while the electronic device was playing video content on the display, and
displaying the user interface comprises displaying the user interface overlaid on the video content while the video content continues playing.

20. The electronic device of claim 19, wherein the video content is visible on the display through at least a portion of the user interface.

21. The electronic device of claim 18, wherein the electronic device comprises an electronic device that includes the display.

22. The electronic device of claim 18, wherein the electronic device is a separate device from a display device that includes the display.

23. The electronic device of claim 18, wherein the first plurality of representations corresponding to channels and the one or more representations corresponding to one or more collections of episodic content include at least one representation that is at least partially not displayed on the display.

24. The electronic device of claim 18, wherein the user interface includes a plurality of rows of representations, including:
a first row of representations, including the first plurality of representations corresponding to channels,
a second row of representations, including the one or more representations corresponding to one or more collections of episodic content, corresponding to a collection of episodic content category of content, and
a third row of representations corresponding to a second category of content, different than the collection of episodic content category of content.

25. The electronic device of claim 18, wherein the second category of content corresponds to a movies category of content, and the collection of episodic content category of content corresponds to a television shows category of content.

26. The electronic device of claim 18, wherein the memory further includes instructions for:
while displaying the user interface, receiving, via the one or more input devices, a sequence of one or more inputs directed at a representation, in the user interface, corresponding to content; and
in response to receiving the sequence of one or more inputs directed at the representation corresponding to content:
in accordance with a determination that the representation corresponding to content is a respective representation of the first plurality of representations corresponding to a respective channel available for viewing on the electronic device, displaying, on the display, live broadcast video from a respective content item that is currently being broadcasted live on the respective channel; and
in accordance with a determination that the representation corresponding to content is a respective representation of the one or more representations corresponding to a respective collection of episodic content available for viewing on the electronic device, displaying, on the display, a landing page corresponding to the respective collection of episodic content.

27. The electronic device of claim 26, wherein displaying, on the display, the landing page corresponding to the respective collection of episodic content includes displaying, on the display, a representation of a current episode from a current season of the respective collection of episodic content, without displaying a representation of another episode of the respective collection of episodic content.

28. The electronic device of claim 27, wherein the other episode of the respective collection of episodic content is from another season, different than the current season, of the respective collection of episodic content.

29. The electronic device of claim 27, wherein the other episode of the respective collection of episodic content is from the current season of the respective collection of episodic content.

30. The electronic device of claim 27, wherein the memory further includes instructions for:
while displaying, on the display, the landing page, receiving, via the one or more input devices, an input corresponding to a request to play the current episode from the current season of the respective collection of episodic content; and
in response to receiving the input corresponding to the request to play the current episode, playing the current episode.

31. The electronic device of claim 27, wherein the memory further includes instructions for:
while displaying, on the display, the landing page including displaying, on the display, the representation of the current episode from the current season of the respective collection of episodic content, without displaying the representation of the other episode of the respective collection of episodic content, receiving, via the one or more input devices, a sequence of one or more inputs corresponding to a request to display additional representations of additional episodes of the respective collection of episodic content; and
in response to receiving the sequence of one or more inputs corresponding to the request to display additional representations of additional episodes of the respective collection of episodic content, displaying, on the display, a representation of the other episode of the respective collection of episodic content.

32. The electronic device of claim 31, wherein the memory further includes instructions for:
while displaying the representation of the other episode of the respective collection of episodic content, receiving, via the one or more input devices, an input corresponding to a request to play the other episode of the collection of episodic content; and
in response to receiving the input corresponding to the request to play the other episode, playing the other episode.

33. The electronic device of claim 18, wherein before receiving the respective user input, the user interface does not include the third plurality of representations of the plurality of episodes from the second season of the first collection of episodic content.

34. The electronic device of claim 18, wherein the first landing page associated with the first collection of episodic content does not include representations of content not associated with the first collection of episodic content.

35. A non-transitory computer-readable storage medium storing instructions, which when executed by one or more processors of an electronic device, cause the electronic device to perform a method comprising:
receiving, via one or more input devices, an input corresponding to a request to view information about a plurality of content items available for viewing on the electronic device; and
in response to receiving the input corresponding to the request to view information about the plurality of content items available for viewing on the electronic device, displaying, on a display, a user interface including:
in a first region of the user interface, a first plurality of representations corresponding to channels available for viewing on the electronic device, including:
a first representation of a first channel, wherein the first representation of the first channel displays live broadcast video from a first content item that is currently being broadcasted live on the first channel; and
a second representation of a second channel, different than the first channel, wherein the second representation of the second channel displays live broadcast video from a second content item that is currently being broadcasted live on the second channel; and
in a second region of the user interface, different than the first region of the user interface, one or more representations corresponding to one or more collections of episodic content available for viewing on the electronic device, including a respective representation of the one or more representations associated with a first collection of episodic content and a second respective representation of the one or more representations associated with a second collection of episodic content, different from the first collection of episodic content;
while displaying the user interface including the respective representation and the second respective representation, receiving, via the one or more input devices, a first input corresponding to selection of the respective representation associated with the first collection of episodic content;

in response to receiving the first input, displaying, on the display, a first landing page associated with the first collection of episodic content, and not associated with the second collection of episodic content, the first landing page different from the user interface, and the first landing page including a second plurality of representations of a plurality of episodes from a first season of the first collection of episodic content, including a given episode not currently being broadcast live, that are selectable to display respective episodes of the first collection of episodic content;

while displaying the first landing page, receiving, via the one or more input devices, a respective user input;

in response to receiving the respective user input, displaying, in the first landing page, a third plurality of representations of a plurality of episodes from a second season of the first collection of episodic content that are selectable to display a respective episode from the second season of the first collection of episodic content;

while displaying the user interface including the respective representation and the second respective representation, receiving, via the one or more input devices, a second input corresponding to selection of the second respective representation associated with the second collection of episodic content; and in response to receiving the second input, displaying, on the display, a second landing page associated with the second collection of episodic content, and not associated with the first collection of episodic content, the second landing page different from the user interface, and the second landing page including a fourth plurality of representations of a plurality of episodes from a first season of the second collection of episodic content, including a given episode not currently being broadcast live, that are selectable to display respective episodes of the second collection of episodic content.

36. The non-transitory computer-readable storage medium of claim 35, wherein:

the input corresponding to the request to view information about a plurality of content items available for viewing on the electronic device was received while the electronic device was playing video content on the display, and displaying the user interface comprises displaying the user interface overlaid on the video content while the video content continues playing.

37. The non-transitory computer-readable storage medium of claim 36, wherein the video content is visible on the display through at least a portion of the user interface.

38. The non-transitory computer-readable storage medium of claim 35, wherein the electronic device comprises an electronic device that includes the display.

39. The non-transitory computer-readable storage medium of claim 35, wherein the electronic device is a separate device from a display device that includes the display.

40. The non-transitory computer-readable storage medium of claim 35, wherein the first plurality of representations corresponding to channels and the one or more representations corresponding to one or more collections of episodic content include at least one representation that is at least partially not displayed on the display.

41. The non-transitory computer-readable storage medium of claim 35, wherein the user interface includes a plurality of rows of representations, including:

a first row of representations, including the first plurality of representations corresponding to channels, a second row of representations, including the one or more representations corresponding to one or more collections of episodic content, corresponding to a collection of episodic content category of content, and a third row of representations corresponding to a second category of content, different than the collection of episodic content category of content.

42. The non-transitory computer-readable storage medium of claim 41, wherein the second category of content corresponds to a movies category of content, and the collection of episodic content category of content corresponds to a television shows category of content.

43. The non-transitory computer-readable storage medium of claim 35, further including instructions for:

while displaying the user interface, receiving, via the one or more input devices, a sequence of one or more inputs directed at a representation, in the user interface, corresponding to content; and in response to receiving the sequence of one or more inputs directed at the representation corresponding to content:

in accordance with a determination that the representation corresponding to content is a respective representation of the first plurality of representations corresponding to a respective channel available for viewing on the electronic device, displaying, on the display, live broadcast video from a respective content item that is currently being broadcasted live on the respective channel; and in accordance with a determination that the representation corresponding to content is a respective representation of the one or more representations corresponding to a respective collection of episodic content available for viewing on the electronic device, displaying, on the display, a landing page corresponding to the respective collection of episodic content.

44. The non-transitory computer-readable storage medium of claim 43, wherein displaying, on the display, the landing page corresponding to the respective collection of episodic content includes displaying, on the display, a representation of a current episode from a current season of the respective collection of episodic content, without displaying a representation of another episode of the respective collection of episodic content.

45. The non-transitory computer-readable storage medium of claim 44, wherein the other episode of the respective collection of episodic content is from another season, different than the current season, of the respective collection of episodic content.

46. The non-transitory computer-readable storage medium of claim 44, wherein the other episode of the respective collection of episodic content is from the current season of the respective collection of episodic content.

47. The non-transitory computer-readable storage medium of claim 44, further including instructions for:

while displaying, on the display, the landing page, receiving, via the one or more input devices, an input corresponding to a request to play the current episode from the current season of the respective collection of episodic content; and in response to receiving the input corresponding to the request to play the current episode, playing the current episode.

48. The non-transitory computer-readable storage medium of claim 44, further including instructions for:

while displaying, on the display, the landing page including displaying, on the display, the representation of the current episode from the current season of the respective collection of episodic content, without displaying the representation of the other episode of the respective collection of episodic content, receiving, via the one or more input devices, a sequence of one or more inputs corresponding to a request to display additional representations of additional episodes of the respective collection of episodic content; and in response to receiving the sequence of one or more inputs corresponding to the request to display additional representations of additional episodes of the respective collection of episodic content, displaying, on the display, a representation of the other episode of the respective collection of episodic content.

49. The non-transitory computer-readable storage medium of claim 48, further including instructions for:

while displaying the representation of the other episode of the respective collection of episodic content, receiving, via the one or more input devices, an input corresponding to a request to play the other episode of the respective collection of episodic content; and in response to receiving the input corresponding to the request to play the other episode, playing the other episode.

50. The non-transitory computer-readable storage medium of claim 35, wherein before receiving the respective user input, the user interface does not include the third plurality of representations of the plurality of episodes from the second season of the first collection of episodic content.

51. The non-transitory computer-readable storage medium of claim 35, wherein the first landing page associated with the first collection of episodic content does not include representations of content not associated with the first collection of episodic content.

* * * * *

UNITED STATES PATENT AND TRADEMARK OFFICE
CERTIFICATE OF CORRECTION

PATENT NO. : 11,245,967 B2  
APPLICATION NO. : 16/108519  
DATED : February 8, 2022  
INVENTOR(S) : Gregory N. Christie et al.

It is certified that error appears in the above-identified patent and that said Letters Patent is hereby corrected as shown below:

In the Claims

In Column 38, Line 33, in Claim 12, delete "epi sodic" and insert --episodic--.

In Column 40, Line 28, in Claim 19, delete "wherein" and insert --wherein:--.

In Column 40, Line 64, in Claim 25, delete "claim 18," and insert --claim 24,--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*